United States Patent
Park et al.

(10) Patent No.: US 12,244,799 B2
(45) Date of Patent: Mar. 4, 2025

(54) IMAGE ENCODING METHOD AND APPARATUS AND IMAGE DECODING METHOD AND APPARATUS

(71) Applicant: SAMSUNG ELECTRONICS CO., LTD., Suwon-si (KR)

(72) Inventors: Minsoo Park, Suwon-si (KR); Woongil Choi, Suwon-si (KR); Minwoo Park, Suwon-si (KR); Seungsoo Jeong, Suwon-si (KR); Kiho Choi, Suwon-si (KR); Narae Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 180 days.

(21) Appl. No.: 17/527,770

(22) Filed: Nov. 16, 2021

(65) Prior Publication Data

US 2022/0078422 A1 Mar. 10, 2022

Related U.S. Application Data

(63) Continuation of application No. PCT/KR2020/008378, filed on Jun. 26, 2020.

(Continued)

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/186* (2014.11); *H04N 19/46* (2014.11); *H04N 19/96* (2014.11)

(58) Field of Classification Search
None
See application file for complete search history.

(56) References Cited

U.S. PATENT DOCUMENTS

| 8,787,453 B2 | 7/2014 | Kondo |
|---|---|---|
| 8,964,834 B2 | 2/2015 | Sim et al. |

(Continued)

FOREIGN PATENT DOCUMENTS

| CN | 103096070 A | 5/2013 |
|---|---|---|
| CN | 103329536 A | 9/2013 |

(Continued)

OTHER PUBLICATIONS

Communication issued by the Korean Patent Office in counterpart Korean Application No. 10-2022-0078348, dated Aug. 9, 2022.

(Continued)

*Primary Examiner* — Kaitlin A Retallick
(74) *Attorney, Agent, or Firm* — Sughrue Mion, PLLC

(57) ABSTRACT

An image encoding and decoding method and apparatus are provided. The image decoding method includes obtaining a difference quantization parameter for a current coding unit from a bitstream, based on an area of a predefined difference quantization parameter signaling unit; obtaining a quantization parameter for the current coding unit by using a predicted quantization parameter for the current coding unit and the difference quantization parameter for the current coding unit; obtaining at least one inverse-quantized coefficient by performing inverse-quantization on at least one coefficient obtained based on residual information of the current coding unit included in the bitstream, based on the quantization parameter for the current coding unit; obtaining a residual block of the current coding unit, based on the (Continued)

inverse-quantized coefficient; and obtaining a reconstructed block of the current coding unit, based on the residual block of the current coding unit.

10 Claims, 28 Drawing Sheets

Related U.S. Application Data

(60) Provisional application No. 62/904,108, filed on Sep. 23, 2019, provisional application No. 62/867,375, filed on Jun. 27, 2019.

(51) Int. Cl.
  *H04N 19/186* (2014.01)
  *H04N 19/46* (2014.01)
  *H04N 19/96* (2014.01)

(56) References Cited

U.S. PATENT DOCUMENTS

| | | | |
|---|---|---|---|
| 9,681,139 | B2 | 6/2017 | Kwon et al. |
| 10,694,184 | B2 | 6/2020 | Ahn et al. |
| 2014/0254670 | A1 | 9/2014 | Kwon et al. |
| 2015/0117523 | A1 | 4/2015 | Oh et al. |
| 2017/0264904 | A1 | 9/2017 | Koval et al. |
| 2017/0272745 | A1* | 9/2017 | Liu .................... H04N 19/157 |
| 2020/0296374 | A1* | 9/2020 | Lim .................... H04N 19/119 |
| 2021/0321098 | A1* | 10/2021 | Chuang ............... H04N 19/196 |

FOREIGN PATENT DOCUMENTS

| | | |
|---|---|---|
| KR | 1020140111139 A | 9/2014 |
| KR | 1020170023893 A | 3/2017 |
| KR | 1020170106592 A | 9/2017 |
| KR | 10-2019-0054047 A | 5/2019 |
| WO | 2017/219342 A1 | 12/2017 |
| WO | 2018/143289 A1 | 8/2018 |
| WO | 2019/050300 A1 | 3/2019 |

OTHER PUBLICATIONS

Communication dated Feb. 10, 2023, issued by the European Patent Office in counterpart European Application No. 20832103.4.
Choi et al., "Text of ISO/IEC DIS 23094-1, Essential Video Coding," ISO/IEC JTC1/SC29/WG11 N18774, Oct. 2019, XP030224784, Total 308 pages.
Communication dated Aug. 20, 2020 issued by the Korean Intellectual Property Office in application No. 10-2020-0078820.
Communication dated Oct. 18, 2021 issued by the Korean Intellectual Property Office in application No. 10-2021-0025135.
International Search Report (PCT/ISA/210) and Written Opinion (PCT/ISA/237) dated Sep. 21, 2020 issued by the International Searching Authority in International Application No. PCT/KR2020/008378.
Communication issued May 28, 2024 by the Taiwan Patent Office in Taiwanese Patent Application No. 109121919.
Communication dated Feb. 7, 2024, issued by the Ministry of Law and Human Rights of the Republic of Indonesia in Indonesian Application No. P00202200059.
Office Action dated Feb. 22, 2024, issued by Intellectual Property India in Indian Application No. 202127059353.
Communication dated Sep. 13, 2024, issued by the National Intellectual Property Administration, PRC in counterpart Chinese Application No. 202080047055.1.

* cited by examiner

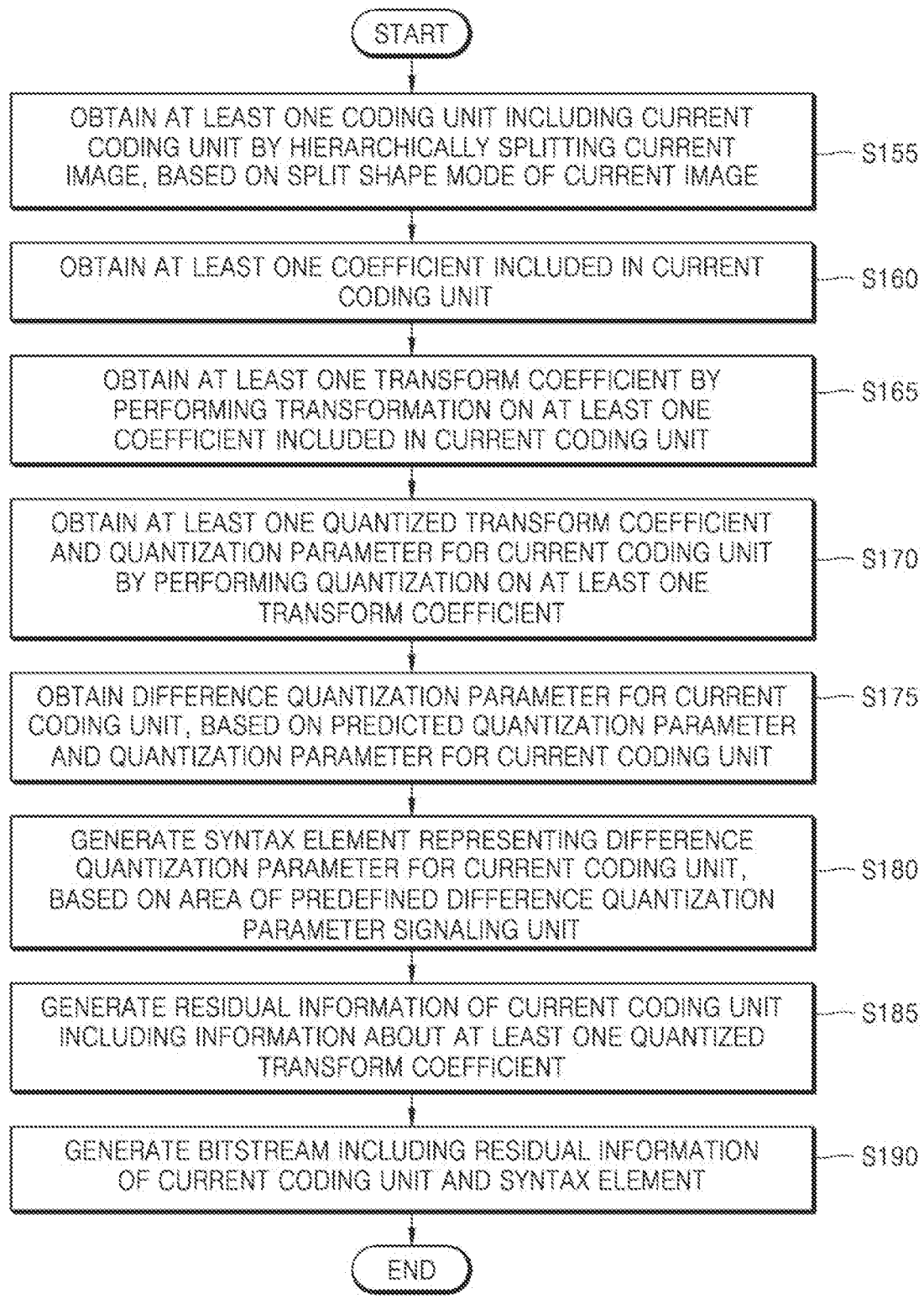

FIG. 3A

| | Descriptor |
|---|---|
| split_unit( x0, y0, log2CbWidth, log2CbHeight, ctDepth, splitUnitOrder) { | |
| ... | |
|   else if( sps_btt_flag == 1 ) { | |
|     if( log2CbWidth > 2 \|\| log2CbHeight > 2  && <br>      x0 + ( 1 << log2CbWidth ) <= pic_width_in_luma_samples  && <br>      y0 + ( 1 << log2CbHeight ) <= pic_height_in_luma_samples ) { | |
|       if( allowSplitBtVer \|\| allowSplitBtHor \|\| allowSplitTtVer \|\| allowSplitTtHor ) | |
|         btt_split_flag[ x0 ][ y0 ] | ae(v) |
|       if( btt_split_flag[ x0 ][ y0 ] ) { | |
|         if( ( allowSplitBtVer \|\| allowSplitTtVer ) && <br>          ( allowSplitBtHor \|\| allowSplitTtHor ) ) | |
|           btt_split_dir[ x0 ][ y0 ] | ae(v) |
|         if( ( !btt_split_dir[ x0 ][ y0 ] && allowSplitBtVer && allowSplitTtVer ) \|\| <br>          ( btt_split_dir[ x0 ][ y0 ] && allowSplitBtHor && allowSplitTtHor ) ) | |
|           btt_split_type[ x0 ][ y0 ] | ae(v) |
|       } | |
|       if (cu_qp_delta_enabled_flag && sps_dquant_flag ){ | |
|         if( btt_split_flag[ x0 ][ y0 ] == 0 && <br>          log2CbWidth + log2CbHeight >= cuQpDeltaArea ) | |
|           cu_qp_delta | |
|         else if( (log2CbWidth + log2CbHeight + 1 == cuQpDeltaArea && <br>          btt_split_type[ x0 ][ y0 ] == 1)\|\|(log2CbWidth + log2CbHeight == cuQpDeltaArea) ) | |
|           cu_qp_delta | |
|       } | |
|     } | |
|   } | |

| | Descriptor |
|---|---|
| split_unit( x0, y0, log2CbWidth, log2CbHeight, ctDepth, splitUnitOrder, cuQpDeltaCode ) { | |
| ... | |
|   else if( sps_btt_flag = = 1 ) { | |
|     if( log2CbWidth > 2 \|\| log2CbHeight > 2 &&<br>      x0 + ( 1 << log2CbWidth ) <= pic_width_in_luma_samples &&<br>      y0 + ( 1 << log2CbHeight ) <= pic_height_in_luma_samples ) { | |
|       if( allowSplitBtVer \|\| allowSplitBtHor \|\| allowSplitTtVer \|\| allowSplitTtHor ) | |
|         btt_split_flag[ x0 ][ y0 ] | ae(v) |
|       if( btt_split_flag[ x0 ][ y0 ] ) { | |
|         if( ( allowSplitBtVer \|\| allowSplitTtVer ) &&<br>          ( allowSplitBtHor \|\| allowSplitTtHor ) ) | |
|           btt_split_dir[ x0 ][ y0 ] | ae(v) |
|         if( ( !btt_split_dir[ x0 ][ y0 ] && allowSplitBtVer && allowSplitTtVer ) \|\|<br>          ( btt_split_dir[ x0 ][ y0 ] && allowSplitBtHor && allowSplitTtHor ) ) | |
|           btt_split_type[ x0 ][ y0 ] | ae(v) |
|       } | |
|       if (cu_qp_delta_enabled_flag && sps_dquant_flag ){ | |
|         if( btt_split_flag[ x0 ][ y0 ] = = 0 &&<br>          log2CbWidth + log2CbHeight >= cuQpDeltaArea ) | |
|           cuQpDeltaCode = 1 | |
|         else if( (log2CbWidth + log2CbHeight + 1 = = cuQpDeltaArea &&<br>          btt_split_type[ x0 ][ y0 ] = = 1)\|\|(log2CbWidth + log2CbHeight = = cuQpDeltaArea) ) | |
|           cuQpDeltaCode = 2 | |
|         } | |
|       } | |
|     } | |
|   } | |

FIG. 3C

| transform_unit( x0, y0, log2TbWidth, log2TbHeight, isSplit ) { | Descriptor |
|---|---|
| cbf_cb | ae(v) |
| cbf_cr | ae(v) |
| if( isSplit || CuPredMode[ x0 ][ y0 ] != MODE_INTRA || cbf_cb || cbf_cr ) | |
| cbf_luma | ae(v) |
| if(cu_qp_delta_enabled_flag && ( ( ( !sps_dquant_flag || cuQpDeltaCode == 1) && <br> ( cbf_luma || cbf_cb || cbf_cr ) ) || cuQpDeltaCode == 2 ) ) | |
| cu_qp_delta | ae(v) |

| | Descriptor |
|---|---|
| split_unit( x0, y0, log2CbWidth, log2CbHeight, ctDepth, splitUnitOrder, cuQpDeltaCode ) { | |
| ... | |
|   if (cu_qp_delta_enabled_flag && sps_dquant_flag ){ | |
|     if( bt_split_flag[ x0 ][ y0 ] == 0 && cuQpDeltaCode != 2<br>      log2CbWidth + log2CbHeight >= cuQpDeltaArea ){ | |
|       if( log2CbWidth > 6 || log2CbHeight > 6 ) | |
|         cuQpDeltaCode = 2 | |
|       else | |
|         cuQpDeltaCode = 1 | |
|       isCuQpDeltaCoded = 0 | |
|     } | |
|     else if( ( log2CbWidth + log2CbHeight  == cuQpDeltaArea + 1 &&<br>        bt_split_type[ x0 ][ y0 ] == 1 ) ||<br>      ( log2CbWidth + log2CbHeight  == cuQpDeltaArea &&<br>        cuQpDeltaCode != 2 ) ){ | |
|       cuQpDeltaCode = 2 | |
|       isCuQpDeltaCoded = 0 | |
|     } | |
| ... | |
|   else if( SplitMode[ x0 ][ y0 ] == SPLIT_TT_HOR ) { | |
|     y1 = y0 + ( 1 << (log2CbHeight – 2 ) ) | |
|     y2 = y1 + ( 1 << (log2CbHeight – 1 ) ) | |
|     split_unit( x0, y0, log2CbWidth, log2CbHeight – 2, ctDepth + 2, splitUnitOrder,<br>      cuQpDeltaCode ) | |
|     split_unit( x0, y1, log2CbWidth, log2CbHeight – 1, ctDepth + 1, splitUnitOrder,<br>      cuQpDeltaCode ) | |
|     split_unit( x0, y2, log2CbWidth, log2CbHeight – 2, ctDepth + 2, splitUnitOrder,<br>      cuQpDeltaCode ) | |
|   } | |
|   else | |
|     coding_unit( x0, y0, log2CbWidth, log2CbHeight, ctDepth, cuQpDeltaCode ) | |
| } | |

FIG. 4B

| coding_unit( x0, y0, log2CbWidth, log2CbHeight, ctDepth, cuQpDeltaCode ) { | Descriptor |
|---|---|
| ... | |
|    if( cbf_all ) { | |
|      isSplit = log2CbWidth > 6 \|\| log2CbHeight > 6 | |
|      log2TbWidth = log2CbWidth > 6 ? 6 : log2CbWidth | |
|      log2TbHeight = log2CbHeight > 6 ? 6 : log2CbHeight | |
|      transform_unit( x0, y0, log2TbWidth, log2TbHeight, isSplit, cuQpDeltaCode ) | |
|      if( log2CbWidth > 6 ) | |
|         transform_unit( x0 + ( 1 << log2TbWidth ), y0, <br>            log2TbWidth, log2TbHeight, isSplit, cuQpDeltaCode ) | |
|      if( log2CbHeight > 6 ) | |
|         transform_unit( x0, y0 + ( 1 << log2TbHeight ), <br>            log2TbWidth, log2TbHeight, isSplit, cuQpDeltaCode ) | |
|      if( log2CbWidth > 6 && log2CbHeight > 6 ) | |
|         transform_unit( x0 + ( 1 << log2TbWidth ), y0 + ( 1 << log2TbHeight ), <br>            log2TbWidth, log2TbHeight, isSplit, cuQpDeltaCode ) | |
|    } | |
| ... | |

| transform_unit( x0, y0, log2TbWidth, log2TbHeight, isSplit, cuQpDeltaCode ) { | Descriptor |
|---|---|
| ... | |
|     if( cu_qp_delta_enabled_flag && ( ( ( !sps_dquant_flag || (cuQpDeltaCode = = 1 && <br>       isCuQpDeltaCoded = = 0 ) ) && ( cbf_luma || cbf_cb || cbf_cr ) ) || <br>       ( cuQpDeltaCode = = 2 && isCuQpDeltaCoded = = 0 ) ) ) | |
|     cu_qp_delta | ae(v) |
| ... | |

250

IMAGE ENCODING METHOD AND APPARATUS AND IMAGE DECODING METHOD AND APPARATUS

CROSS-REFERENCE TO RELATED APPLICATION(S)

This application is a bypass continuation application of International PCT Application PCT/KR2020/008378 filed on Jun. 26, 2020, which is based on and claims priority to U.S. Provisional Applications Nos. 62/867,375 filed Jun. 27, 2019 and 62/904,108 filed Sep. 23, 2019, the disclosures of which are incorporated by reference herein in their entireties.

BACKGROUND

1. Field

A method and apparatus according to an embodiment may encode or decode an image by using various types of coding units included in the image. A method and apparatus according to an embodiment may effectively signal a difference quantization parameter of a coding unit according to a size of the coding unit.

2. Description of Related Art

With development and supply of hardware capable of reproducing and storing high-resolution or high-definition image content, there is an increasing need for a codec for effectively encoding or decoding high-resolution or high-definition image content. Encoded image content is reproduced by being decoded. Recently, methods for effectively compressing such high-resolution or high-definition image content are being performed. For example, methods for effectively implementing image compression through a process of splitting images to be encoded by an arbitrary method or rendering data are being proposed.

Various data units may be used to compress images, and there may be an inclusion relation between such data units. In order to determine a size of a data unit to be used for image compression, a data unit may be split by using various methods, and the image may be encoded or decoded by optimizing a data unit based on characteristics of an image.

SUMMARY

According to an embodiment, there is provided an image decoding method including: obtaining at least one coding unit including a current coding unit by hierarchically splitting a current image based on a split shape mode of the current image; obtaining a difference quantization parameter for the current coding unit from a bitstream, based on an area of a predefined difference quantization parameter signaling unit; obtaining a quantization parameter for the current coding unit by using a predicted quantization parameter for the current coding unit and the difference quantization parameter for the current coding unit; obtaining at least one inverse-quantized coefficient by inverse-quantizing at least one coefficient included in the current coding unit that is not 0, the at least one coefficient being obtained based on residual information of the current coding unit included in the bitstream, the quantization parameter for the current coding unit and whether the at least one coefficient that is not 0 exists in a transform unit included in the current coding unit; obtaining a residual block of the current coding unit, based on the at least one inverse-quantized coefficient; and obtaining a reconstructed block of the current coding unit, based on the obtained residual block of the current coding unit. The obtaining the difference quantization parameter for the current coding unit from the bitstream based on the area of the predefined difference quantization parameter signaling unit includes: obtaining, when an area of the current coding unit is larger than or equal to the area of the predefined difference quantization parameter signaling unit, and a size of the current coding unit is larger than a maximum size of a transform unit, the difference quantization parameter for the current coding unit from information about a transform unit first decoded from among a plurality of transform units split from the current coding unit, and obtaining, when the area of the current coding unit is smaller than the area of the predefined difference quantization parameter signaling unit, the difference quantization parameter for a predefined coding unit including the current coding unit from the information about the transform unit first decoded from the coding unit first decoded from among the plurality of coding units included in the predefined coding unit including the current coding unit, wherein the split shape mode is a mode based on a split type including at least one from among a binary split type and a ternary split type, and wherein the area of the predefined coding unit is equal to the area of the predefined difference quantization parameter signaling unit or is two times the area of the predefined difference quantization parameter signaling unit, and wherein, when the area of the predefined coding unit is the two times the area of the predefined difference quantization parameter signaling unit, the split type of the predefined coding unit is the ternary split type.

When the difference quantization parameter for the current coding unit is obtained from the information about the transform unit first decoded from among the plurality of transform units split from the current coding unit, the difference quantization parameter for the current coding unit is obtained regardless of a value of a coding block flag indicating whether at least one transform coefficient that is not 0 is included in at least one transform unit included in the current coding unit, and when the area of the current coding unit is smaller than the area of the predefined difference quantization parameter signaling unit, and the difference quantization parameter for the predefined coding unit including the current coding unit is obtained from the information about the transform unit first decoded from the coding unit first decoded from among the plurality of coding units included in the predefined coding unit, a difference quantization parameter for the predefined coding unit including the current coding unit is obtained regardless of a value of a coding block flag indicating whether at least one transform coefficient that is not 0 is included in the transform unit first decoded.

The obtaining the difference quantization parameter for the current coding unit from the bitstream based on the area of the predefined difference quantization parameter signaling unit further includes: when the area of the current coding unit is larger than or equal to the area of the predefined difference quantization parameter signaling unit, and the size of the current coding unit is smaller than or equal to the maximum size of the transform unit, obtaining the difference quantization parameter for the current coding unit based on a value of a coding block flag indicating whether at least one transform coefficient that is not 0 is included in a transform unit having a same size as the current coding unit.

The obtaining the difference quantization parameter for the current coding unit based on the value of the coding block flag includes, when the current coding unit corresponds to coding units of at least one luma component and chroma components Cb and Cr, obtaining the difference quantization parameter for the current coding unit, based on at least one from among the first coding block flag value indicating whether the at least one transform coefficient that is not 0 is included in the transform unit having the same size as a coding unit of the luma component corresponding to the current coding unit, a second coding block flag value indicating whether the at least one transform coefficient that is not 0 is included in a transform unit having the same size as a coding unit of the chroma component Cb corresponding to the current coding unit, and a third coding block flag value indicating whether the at least one transform coefficient that is not 0 is included in the transform unit having the same size as a coding unit of the chroma component Cr corresponding to the current coding unit.

The obtaining the difference quantization parameter for the current coding unit from the bitstream based on the area of the predefined difference quantization parameter signaling unit includes: when a flag indicating whether signaling for the difference quantization parameter is to be enabled and a flag indicating whether a signaling scheme of the predefined difference quantization parameter is to be used indicates that the signaling scheme of the predefined difference quantization parameter is used, when a split flag indicating whether or not to split the current coding unit represents that the current coding unit is to not be split, and when a sum of a value resulting from applying log 2 to a width of the current coding unit and a value resulting from applying log 2 to a height of the current coding unit are larger than or equal to a value resulting from applying log 2 to the area of the predefined difference quantization parameter signaling unit, determining a value of cuQPDeltaCode of the current coding unit as a predefined first value, when the value resulting from applying log 2 to the height or width of the current coding unit is larger than a value resulting from applying log 2 to the maximum size of the transform unit; determining the value of cuQPDeltaCode of the current coding unit as a predefined second value, when the value resulting from applying log 2 to the height or the width of the current coding unit is smaller than or equal to the value resulting from applying log 2 to the maximum size of the transform unit; and identifying the value of cuQPDeltaCode and a value of a coding block flag value of the transform unit included in the coding unit to obtain the difference quantization parameter for the current coding unit.

The obtaining the difference quantization parameter for the current coding unit from the bitstream based on the area of the predefined difference quantization parameter signaling unit includes: when a flag indicating whether signaling for the difference quantization parameter is to be enabled and a flag indicating whether a signaling scheme of the predefined difference quantization parameter is to be used indicates that the signaling scheme of the predefined difference quantization parameter is used, when a split flag indicating whether or not to split the predefined coding unit including the current coding unit represents that the predefined coding unit is to be split, when a split type of the predefined coding unit is the ternary split type and a sum of a value resulting from applying log 2 to a width of the predefined coding unit and a value resulting from applying log 2 to a height of the predefined coding unit are equal to a value resulting from adding 1 to a value resulting from applying log 2 to the area of the predefined difference quantization parameter signaling unit, or when the sum of the value resulting from applying log 2 to the width of the predefined coding unit and the value resulting from applying log 2 to the height of the predefined coding unit is equal to the value resulting from applying log 2 to the area of the predefined difference quantization parameter signaling unit, determining a value of cuQpDeltaCode of the predefined coding unit as a predefined first value; identifying the value of cuQpDeltaCode of the plurality of coding units split from the predefined coding unit and including the current coding unit as the predefined first value; and obtaining the difference quantization parameter for the current coding unit by identifying a value of cuQpDeltaCode of the current coding unit.

The area of the predefined difference quantization parameter signaling unit is determined based on information about a difference between a predefined value and a value resulting from applying log 2 to the area of the predefined coding unit, the difference being obtained from a Picture Parameter Set (PPS) of the bitstream.

According to an embodiment, there is provided an image decoding apparatus including: at least one processor configured to obtain at least one coding unit including a current coding unit by hierarchically splitting a current image based on a split shape mode of the current image; obtain a difference quantization parameter for the current coding unit from a bitstream, based on an area of a predefined difference quantization parameter signaling unit; obtain a quantization parameter for the current coding unit by using a predicted quantization parameter for the current coding unit and the difference quantization parameter for the current coding unit; obtain at least one inverse-quantized coefficient by inverse-quantizing at least one coefficient included in the current coding unit that is not 0, the at least one coefficient being obtained based on residual information of the current coding unit included in the bitstream, based on the quantization parameter for the current coding unit and whether the at least one coefficient that is not 0 exists in a transform unit included in the current coding unit, and obtain a residual block of the current coding unit, based on the inverse-quantized coefficient; and obtain a reconstructed block of the current coding unit, based on the obtained residual block of the current coding unit. The at least one processor is further configured to, when the difference quantization parameter for the current coding unit from the bitstream is obtained based on the area of the predefined difference quantization parameter signaling unit, obtain, when an area of the current coding unit is larger than or equal to the area of the predefined difference quantization parameter signaling unit, and a size of the current coding unit is larger than a maximum size of a transform unit, the difference quantization parameter for the current coding unit from information about a transform unit first decoded from among a plurality of transform units split from the current coding unit, and obtain, when the area of the current coding unit is smaller than the area of the predefined difference quantization parameter signaling unit, the difference quantization parameter for a predefined coding unit including the current coding unit from the information about the transform unit first decoded from the coding unit first decoded from among the plurality of coding units included in the predefined coding unit including the current coding unit, wherein the split shape mode is a mode based on a split type including at least one from among a binary split type and a ternary split type, and an area of the predefined coding unit is equal to the area of the predefined difference quantization parameter signaling unit or is two times the area of the predefined difference quantization parameter signaling unit, and wherein, when the area of the predefined coding unit is the two times the area of the predefined difference quantization parameter signaling unit, the split type of the predefined coding unit is the ternary split type.

The at least one processor is further configured to obtain, when the difference quantization parameter for the current coding unit is obtained from the information about the transform unit first decoded from among the plurality of transform units split from the current coding unit, the difference quantization parameter for the current coding unit regardless of a value of a flag indicating whether at least one transform coefficient that is not 0 is included in at least one transform unit included in the current coding unit, and obtain, when the difference quantization parameter for the current coding unit is obtained from the information about the transform unit first decoded from the coding unit first decoded from among the plurality of coding units included in the predefined coding unit including the current coding unit, the difference quantization parameter for the predefined coding unit including the current coding unit regardless of a value of a flag indicating whether the at least one transform coefficient that is not 0 is included in the transform unit first decoded.

The at least one processor is further configured to obtain, when the area of the current coding unit is larger than or equal to the area of the predefined difference quantization parameter signaling unit, and the size of the current coding unit is smaller than or equal to the maximum size of the transform unit, the difference quantization parameter for the current coding unit, based on a value of a coding block flag indicating whether at least one transform coefficient that is not 0 is included in a transform unit having a same size as the current coding unit.

The area of the predefined difference quantization parameter signaling unit is determined based on information about a difference between a predefined value and a value resulting from applying log 2 to the area of the predefined difference quantization parameter signaling unit, the difference being obtained from a Picture Parameter Set (PPS) of the bitstream.

When the difference quantization parameter for the predefined coding unit including the current coding unit is obtained from the information about the transform unit first decoded from the coding unit first decoded from among the plurality of coding units included in the predefined coding unit including the current coding unit, the at least one processor is further configured to: identify whether the area of the predefined coding unit is equal to the area of the predefined difference quantization parameter signaling unit or whether the area of the predefined coding unit is two times the area of the predefined difference quantization parameter signaling unit, and whether the split type of the predefined coding unit is the ternary split type, and obtain the difference quantization parameter for the predefined coding unit including the current coding unit from the information about the transform unit first decoded from the coding unit first decoded from among the plurality of coding units including the current coding unit.

According to an embodiment, there is provided an image encoding method including: obtaining at least one coding unit including a current coding unit by hierarchically splitting a current image, based on a split shape mode of the current image; obtaining at least one coefficient included in the current coding unit; obtaining at least one transform coefficient by performing transformation on the at least one coefficient included in the current coding unit; obtaining at least one quantized transform coefficient and a quantization parameter for the current coding unit by performing quantization on the obtained at least one transform coefficient; obtaining a difference quantization parameter for the current coding unit, based on a predicted quantization parameter and the quantization parameter for the current coding unit; generating a syntax element representing the difference quantization parameter for the current coding unit, based on an area of a predefined difference quantization parameter signaling unit; generating residual information of the current coding unit including information about the at least one quantized transform coefficient; and generating a bitstream including the residual information of the current coding unit and the syntax element, wherein the split shape mode is a mode based on a split type including at least one from among a binary split type and a ternary split type, and wherein the generating the syntax element includes: when an area of the current coding unit is larger than or equal to the area of the predefined difference quantization parameter signaling unit, and a size of the current coding unit is larger than a maximum size of a transform unit, generating the syntax element representing the difference quantization parameter for the current coding unit, which is to be included in information about a transform unit first encoded among a plurality of transform units split from the current coding unit, and when the area of the current coding unit is smaller than the area of the predefined difference quantization parameter signaling unit, generating the syntax element representing the difference quantization parameter for the predefined coding unit including the current coding unit, which is to be included in the information about the transform unit first encoded from the coding unit first encoded among the plurality of coding units included in the predefined coding unit including the current coding unit, wherein, the area of the predefined coding unit is equal to the area of the predefined difference quantization parameter signaling unit or is two times the area of the predefined difference quantization parameter signaling unit, and when the area of the predefined coding unit is the two times the area of the predefined difference quantization parameter signaling unit, the split type of the predefined coding unit is the ternary split type.

The image encoding method further includes: generating the syntax element representing the area of the predefined difference quantization parameter signaling unit, wherein the bitstream further includes the syntax element representing the area of the predefined difference quantization parameter signaling unit, and the syntax element representing the area of the predefined difference quantization parameter signaling unit is information about a difference between a predefined value and a value resulting from applying log 2 to the area of the predefined difference quantization parameter signaling unit.

According to an embodiment, there is provided a non-transitory computer-readable recording medium having recorded thereon a program for executing the image decoding method described above, on a computer.

BRIEF DESCRIPTION OF THE DRAWINGS

FIG. 2B is a flowchart showing an image encoding method according to various embodiments.

FIG. 3A shows a syntax structure of a split unit for signaling a difference quantization parameter, according to an embodiment.

FIGS. 3B and 3C show syntax structures of a split unit and a transform unit for signaling a difference quantization parameter, according to an embodiment.

FIGS. 4A to 4C show syntax structures of a split unit, a coding unit, and a transform unit for signaling a difference quantization parameter, according to an embodiment.

DETAILED DESCRIPTION

Figure 1A:
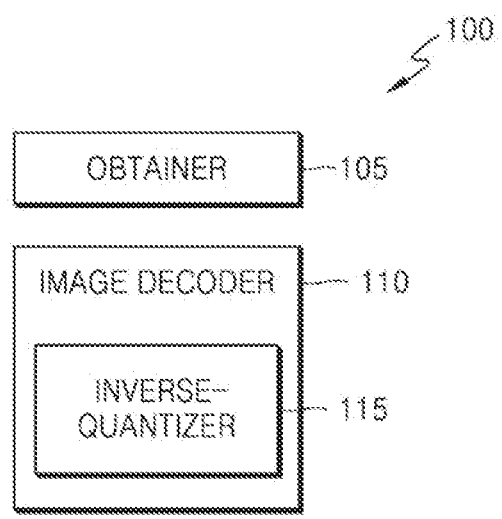
FIG. 1A is a block diagram of an image decoding apparatus according to various embodiments.

An image decoding method according to an embodiment of the disclosure includes: obtaining at least one coding unit including a current coding unit by hierarchically splitting a current image based on a split shape mode of the current image; obtaining a difference quantization parameter for the current coding unit from a bitstream, based on an area of a predefined difference quantization parameter signaling unit; obtaining a quantization parameter for the current coding unit by using a predicted quantization parameter for the current coding unit and the difference quantization parameter for the current coding unit; obtaining at least one inverse-quantized coefficient by inverse-quantizing at least one coefficient which is not 0, obtained based on residual information of the current coding unit included in the bitstream, based on the quantization parameter for the current coding unit and whether at least one coefficient which is not 0 exists in a transform unit included in the current coding unit, and obtaining a residual block of the current coding unit, based on the at least one inverse-quantized coefficient; and obtaining a reconstructed block of the current coding unit, based on the obtained residual block of the current coding unit, wherein the obtaining of the difference quantization parameter for the current coding unit from the bitstream based on the area of the predefined difference quantization parameter signaling unit includes: obtaining, when an area of the current coding unit is larger than or equal to the area of the predefined difference quantization parameter signaling unit, and a size of the current coding unit is larger than a maximum size of a transform unit, the difference quantization parameter for the current coding unit from information about a transform unit first decoded from among a plurality of transform units split from the current coding unit, and obtaining, when the area of the current coding unit is smaller than the area of the predefined difference quantization parameter signaling unit, a difference quantization parameter for a predefined coding unit including the current coding unit from information about a transform unit of a coding unit first decoded (or previously decoded) from among a plurality of coding units included in the predefined coding unit including the current coding unit, wherein the split type mode is a mode based on a split type including one of a binary split type and a ternary split type, and the area of the predefined coding unit is equal to the area of the predefined difference quantization parameter signaling unit or is two times the area of the predefined difference quantization parameter signaling unit, and when the area of the predefined coding unit is two times the area of the predefined difference quantization parameter signaling unit, the split type of the predefined coding unit is a ternary split type.

An image decoding apparatus according to an embodiment of the disclosure includes: at least one processor configured to obtain at least one coding unit including a current coding unit by hierarchically splitting a current image based on a split shape mode of the current image, obtain a difference quantization parameter for the current coding unit from a bitstream, based on an area of a predefined difference quantization parameter signaling unit, obtain a quantization parameter for the current coding unit by using a predicted quantization parameter for the current coding unit and the difference quantization parameter for the current coding unit, obtain at least one inverse-quantized coefficient by inverse-quantizing at least one coefficient which is not 0, obtained based on residual information of the current coding unit included in the bitstream, based on the quantization parameter for the current coding unit and whether at least one coefficient which is not 0 exists in a transform unit included in the current coding unit, and obtain a residual block of the current coding unit, based on the inverse-quantized coefficient, and obtain a reconstructed block of the current coding unit, based on the obtained residual block of the current coding unit, wherein, when the at least one processor obtains the difference quantization parameter for the current coding unit from the bitstream based on the area of the predefined difference quantization parameter signaling unit, the at least one processor is further configured to obtain, when an area of the current coding unit is larger than or equal to the area of the predefined difference quantization parameter signaling unit, and a size of the current coding unit is larger than a maximum size of a transform unit, the difference quantization parameter for the current coding unit from information about a transform unit first decoded from among a plurality of transform units split from the current coding unit, and obtain, when the area of the current coding unit is smaller than the area of the predefined difference quantization parameter signaling unit, a difference quantization parameter for a predefined coding unit including the current coding unit from information about a transform unit of a coding unit first decoded from among a plurality of coding units included in the predefined coding unit including the current coding unit, wherein the split type mode is a mode based on a split type including one of a binary split type and a ternary split type, and an area of the predefined coding unit is equal to the area of the predefined difference quantization parameter signaling unit or is two times the area of the predefined difference quantization parameter signaling unit, wherein, when the area of the predefined coding unit is two times the area of the predefined difference quantization parameter signaling unit, the split type of the predefined coding unit is the ternary split type.

An image encoding method according to an embodiment of the disclosure includes: obtaining at least one coding unit including a current coding unit by hierarchically splitting a current image, based on a split shape mode of the current image; obtaining at least one coefficient included in the current coding unit; obtaining at least one transform coefficient by performing transformation on the at least one coefficient included in the current coding unit; obtaining at least one quantized transform coefficient and a quantization parameter for the current coding unit by performing quantization on the obtained at least one transform coefficient; obtaining a difference quantization parameter for the current coding unit, based on a predicted quantization parameter and the quantization parameter for the current coding unit; generating a syntax element representing the difference quantization parameter for the current coding unit, based on an area of a predefined difference quantization parameter signaling unit; generating residual information of the current coding unit including information about the at least one quantized transform coefficient; and generating a bitstream including the residual information of the current coding unit and the syntax element, wherein the split type mode is a mode based on a split type including one of a binary split type and a ternary split type, and the generating of the syntax element includes: when an area of the current coding unit is larger than or equal to the area of the predefined difference quantization parameter signaling unit, and a size of the current coding unit is larger than a maximum size of a transform unit, generating the syntax element representing the difference quantization parameter for the current coding unit, which is to be included in information about a transform unit first encoded among a plurality of transform units split from the current coding unit, and when the area of the current coding unit is smaller than the area of the predefined difference quantization parameter signaling unit, generating the syntax element representing the difference quantization parameter for the predefined coding unit including the current coding unit, which is to be included in the information about the transform unit first encoded from the coding unit first encoded among the plurality of coding units included in the predefined coding unit including the current coding unit, wherein, the area of the predefined coding unit is equal to the area of the predefined quantization parameter signaling unit or is two times the area of the predefined difference quantization parameter signaling unit, and when the area of the predefined coding unit is two times the area of the predefined difference quantization parameter signaling unit, a split type of the predefined coding unit is the ternary split type.

A computer program for the image decoding method according to an embodiment of the disclosure may be recorded on a computer-readable recording medium.

Advantages and features of disclosed embodiments and a method of achieving the advantages and features will be apparent from the following description taken in conjunction with the accompanying drawings. However, the present disclosure is not restricted by these embodiments but can be implemented in many different forms, and the present embodiments are provided to describe the present disclosure and to allow those having ordinary skill in the art to understand the scope of the disclosure.

Terms used in this specification will be briefly described, and the disclosed embodiments will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms of "a," "an," and "the" may include plural forms unless the context clearly indicates otherwise.

It will be understood that when a certain part "includes" a certain component, the part does not exclude another component but can further include another component, unless the context clearly indicates otherwise.

As used herein, the terms "portion", "module", or "unit" refers to a software or hardware component that performs predefined functions. However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and "portions", "modules" or "units" may be combined into a smaller number of components and "portions", "modules" and "units", or sub-divided into additional components and "portions", "modules" or "units".

In an embodiment of the present disclosure, the "portion", "module", or "unit" may be implemented as a processor and a memory. The term "processor" should be interpreted in a broad sense to include a general-purpose processor, a central processing unit (CPU), a microprocessor, a digital signal processor (DSP), a controller, a microcontroller, a state machine, etc. In some embodiments, the "processor" may indicate an application-specific integrated circuit (ASIC), a programmable logic device (PLD), a field programmable gate array (FPGA), etc. The term "processor" may indicate a combination of processing devices, such as, for example, a combination of a DSP and a microprocessor, a combination of a plurality of microprocessors, a combination of one or more microprocessors coupled to a DSP core, or a combination of arbitrary other similar components.

The term "memory" should be interpreted in a broad sense to include an arbitrary electronic component capable of storing electronic information. The term "memory" may indicate various types of processor-readable media, such as random access memory (RAM), read only memory (ROM), non-volatile RAM (NVRAM), programmable ROM (PROM), erasable programmable ROM (EPROM), electrically erasable PROM (EEPROM), flash memory, a magnetic or optical data storage device, registers, etc. When a processor can read information from a memory and/or write information in the memory, the memory can be considered to electronically communicate with the processor. A memory integrated into a process electronically communicates with the processor.

Hereinafter, an "image" may refer to a static image such as a still image of video, or a moving image, that is, a dynamic image such as a video.

Hereinafter, a "sample" may be data to be processed at a sampling position of an image. For example, pixel values in a spatial-domain image and transform coefficients on a transform region may be samples. A unit including at least one of such samples may be defined as a block. Hereinafter, embodiments of the disclosure will be described in detail with reference to the accompanying drawings so that the embodiments may be readily implemented by one of ordinary skill in the technical field to which the present disclosure pertains. Also, in the drawings, parts irrelevant to the descriptions will be omitted for the simplicity of explanation.

Hereinafter, "coding block flag (CBF) information" may be flag information representing whether at least one (transform) coefficient which is not 0 is included in the corresponding data unit. The coding block flag information may be generated according to whether or not a specific condition is satisfied for each coding unit. However, the coding block flag information may be generated for each sub block unit that is smaller than a coding unit. Also, one piece of coding block flag information may be generated for both a luma component and a chroma component. However, one piece of coding block flag information may be generated for each component. In this case, one piece of coding block flag information for both a luma component and a chroma component may be generated together with coding block flag information for each component. That is, when a value of one piece of coding block flag information for both a luma component and a chroma component is 1, coding block flag information may be generated for each component. When a value of one piece of coding block flag information for both a luma component and a chroma component is 0, coding block flag information may not be generated for each component. Hereinafter, an image encoding apparatus, an image decoding apparatus, an image encoding method, and an image decoding method, according to an embodiment, will be described with reference to FIGS. 1 to 19. A method of determining a data unit of an image, according to an embodiment, will be described with reference to FIGS. 6 to 19, and an encoding or decoding method and apparatus for signaling a difference quantization parameter of a coding unit according to a size of the coding unit, according to an embodiment, will be described with reference to FIGS. 1A to 5.

Hereinafter, encoding/decoding methods and apparatuses for signaling a difference quantization parameter of a coding unit according to a size of the coding unit, according to an embodiment of the disclosure, will be described with reference to FIGS. 1A to 5.

FIG. 1A is a block diagram of an image decoding apparatus according to various embodiments.

An image decoding apparatus 100 according to various embodiments may include an obtainer 105 and an image decoder 110. The obtainer 105 and the image decoder 110 may each include at least one processor. Also, the obtainer 105 and the image decoder 110 may each include a memory storing instructions that are to be executed by the at least one processor. The image decoder 110 may be implemented as hardware that is separate from the obtainer 105, or may be integrated with the obtainer 105.

The image decoder 110 may include an inverse-quantizer 115. The inverse-quantizer 115 may be implemented as hardware that is separate from the image decoder 110.

The image decoder 110 may hierarchically split a current image based on a split shape mode of the current image, and may obtain a plurality of coding units including a current coding unit. Herein, the split shape mode may represent a mode of determining at least one of whether or not to split, a split direction, and a split type. The split type may represent one of a binary split type, a tri split type (ternary split type), and a quad split type. When binary split is performed in a horizontal direction (or a vertical direction) after binary split is performed in the vertical direction (or the horizontal direction), the same effect as when quad split is performed may be obtained. Therefore, the split type may represent one of the binary split type and the tri split type. Hereinafter, a method of splitting a coding unit of an upper depth into two or three coding units of a lower depth according to a split direction of the vertical or horizontal direction and a split type of the binary split type or the tri split type is called a Binary and Ternary Tree (BTT) scheme. When the BTT scheme is not used, a Quad Tree (QT) scheme may be used. The QT scheme may be a scheme of splitting a coding unit of an upper depth into four coding units of a lower depth by using only a split type of quad split.

The obtainer 105 may obtain a difference quantization parameter for a current coding unit from a bitstream, based on an area of a predefined difference quantization parameter signaling unit. Information about the difference quantization parameter obtained from the bitstream may include sign information of the difference quantization parameter and absolute value information of the difference quantization parameter. The area of the predefined difference quantization parameter signaling unit may be equal to an area of a predefined coding unit.

According to an embodiment, when an area of a current coding unit is larger than or equal to that of the predefined difference quantization parameter signaling unit, the obtainer 105 may obtain a difference quantization parameter for the current coding unit from information about a transform unit first decoded from among a plurality of transform units split from the current coding unit, based on a size of the current coding unit being larger than a maximum size of a transform unit. Here, the current coding unit may be a coding unit that is no longer split into coding units of a lower depth. At this time, the obtainer 105 may obtain the difference quantization parameter for the current coding unit from the bitstream, regardless of a value of a coding block flag representing whether at least one transform coefficient which is not 0 is included in at least one transform unit (particularly, the transform unit first decoded) included in the current coding unit.

Hereinafter, coding block flag (CBF) information may be flag information representing whether at least one transform coefficient which is not 0 exists in a current block according to transformation/quantization of a residual signal representing a difference between a signal of an original image and a predicted signal. For example, when coding block flag information represents that at least one transform coefficient which is not 0 exists in a current block (for example, when a value of a coding block flag is 1 although not limited thereto), the coding block flag information may represent that transform coefficients of the current block have been subject to entropy encoding (including transformation/quantization). When coding block flag information represents that all transform coefficients of a current block are 0 (for example, when a value of a coding block flag is 0 although not limited thereto), the coding block flag information may represent that the current block has not been subject to entropy encoding (including transformation/quantization). That is, an image encoding apparatus may include coding block flag information in a bitstream and output the bitstream, and an image decoding apparatus may obtain the coding block flag information from the bitstream and determine whether to perform entropy decoding (inverse-transformation/inverse-quantization) on a current block based on the coding block flag information.

The obtainer 105 may obtain a coding block flag for each transform unit from information about a plurality of transform units split from the current coding unit included in the bitstream, and obtain a coding block flag for each luma/chroma component. The image decoder 110 may determine whether to perform entropy decoding (including inverse-quantization and inverse-transformation) on the current block. Accordingly, because the image decoder 110 does not perform inverse-quantization on a transform unit having a CBF value of 0, the obtainer 105 may not obtain quantization parameter-related information for inverse-quantization of the corresponding transform unit. That is, when the obtainer 105 obtains a difference quantization parameter for a current coding unit from a bitstream according to a CBF value, an operation for obtaining the CBF value and an operation for identifying whether the CBF value is 1 may need to be performed in advance, which may cause a parsing delay and increase complexity for an identification on whether a condition is satisfied. However, the obtainer 105 may obtain a difference quantization parameter for the current coding unit from information about a first transform unit in decoding order, without identifying a coding block flag value representing whether at least one transform coefficient which is not 0 is included in at least one transform unit included in the current coding unit. At this time, the obtainer 105 may not obtain any difference quantization parameter from information about the remaining transform units (second and subsequent transform units) excluding the first transform unit in decoding order. As such, a difference quantization parameter for each transform unit may be determined to be the difference quantization parameter obtained from the information about the first transform unit. Accordingly, a parsing delay and complexity for an identification on whether a condition is satisfied may be reduced.

When the area of the current coding unit is larger than or equal to that of the predefined difference quantization parameter signaling unit, the obtainer 105 may obtain a difference quantization parameter for the current coding unit from the bitstream based on a coding block flag representing whether at least one transform coefficient which is not 0 is included in a transform unit having the same size as the current coding unit, when the size of the current coding unit is smaller than or equal to the maximum size of the transform unit. That is, the obtainer 105 may obtain the difference quantization parameter for the current coding unit based on a coding block flag value. When the coding block flag value is 0, the value of the transform coefficient included in the transform unit having the same size as the current coding unit is 0. Therefore, inverse-quantization may not need to be performed, and accordingly, the obtainer 105 may not obtain any difference quantization parameter for inverse-quantization.

When the coding block flag value is 1, the obtainer 105 may obtain a difference quantization parameter for inverse-quantization for the current coding unit.

When the current coding unit corresponds to coding units of at least one luma component and chroma components Cb and Cr, the obtainer 105 may obtain a difference quantization parameter for the current coding unit, based on at least one value of a first coding block flag value representing whether at least one transform coefficient which is not 0 is included in a transform unit having the same size as the coding unit of the luma component corresponding to the current coding unit, a second coding block flag value representing whether at least one transform coefficient which is not 0 is included in a transform unit having the same size as the coding unit of the chroma component Cb corresponding to the current coding unit, and a third coding block flag value representing whether at least one transform coefficient which is not 0 is included in a transform unit having the same size as the coding unit of the chroma component Cr corresponding to the current coding unit.

When a tree type is a single tree type, the image decoder 110 may obtain at least one coding unit based on information about a split shape mode of the current image, used in common between the components. That is, when the tree type is the single tree type, the current coding unit may correspond to the coding unit of the luma component and the coding units of the chroma components Cb and Cr. In this case, when the at least one of the first coding block flag value of the transform unit having the same size as the coding unit of the luma component corresponding to the current coding unit, the second coding block flag value of the transform unit having the same size as the coding unit of the chroma component Cb corresponding to the current coding unit, and the third coding block flag value of the transform unit having the same size as the coding unit of the chroma component Cr corresponding to the current coding unit is 1, the obtainer 105 may obtain a difference quantization parameter for the current coding unit.

When the tree type is a dual tree type, the image decoder 110 may obtain at least one coding unit for each of the luma component and the chroma components Cb and Cr, based on information about a split shape mode of an image for each of the luma component and the chroma components Cb and Cr. In this case, the dual tree type may include a dual luma type and a dual chroma type. When the dual tree type is the dual luma type, the image decoder 110 may obtain at least one coding unit of the luma component, based on information about the split shape mode of the image of the luma component. When the dual tree type is the dual chroma type, the image decoder 110 may obtain at least one coding unit of the chroma component, based information about the split shape mode of the image of the chroma component.

Here, a coding unit corresponding to the current coding unit may be a coding unit of the luma component. Alternatively, a coding unit corresponding to the current coding unit may be a coding unit of the chroma component (Cb or Cr). When a coding block flag value of a transform unit having the same size as the coding unit of the luma component or the chroma component corresponding to the current coding unit is 1, the image decoder 110 may obtain a difference quantization parameter for the coding unit of the corresponding component from the bitstream.

The size of the current coding unit may be less than or equal to that of the transform unit. For example, the obtainer 105 may obtain a coding block flag value of a transform unit having the same size as the current coding unit, and obtain a difference quantization parameter based on the coding block flag value, thereby preventing signaling of an unnecessary difference quantization parameter. That is, when a coding block flag value is 0, the obtainer 105 may not obtain the difference quantization parameter from the bitstream, thereby preventing signaling of an unnecessary difference quantization parameter.

When the area of the current coding unit is smaller than that of the predefined difference quantization parameter signaling unit, the obtainer 105 may obtain a difference quantization parameter for a predefined coding unit including the current coding unit from information about a transform unit of a coding unit first decoded (or previously decoded) from among a plurality of coding units included in the predefined coding unit. The predefined coding unit may have the same area as the predefined difference quantization parameter signaling unit, and be split into the plurality of coding units including the current coding unit. When the area of the predefined coding unit is two times that of the predefined difference quantization parameter signaling unit, a split type of the predefined coding unit may be a ternary split type. In this case, a coding unit having the same area as the predefined difference quantization parameter signaling unit may be obtained from among the coding units split from the predefined coding unit. However, the obtained corresponding coding unit may not be the predefined coding unit, but a coding unit having an area which is two times that of the predefined difference quantization parameter signaling unit may become the predefined coding unit.

Because the image decoder 110 performs no inverse-quantization on a coding unit having a CBF value of 0, the obtainer 105 may not obtain quantization parameter-related information for inverse-quantization of the corresponding coding unit. However, when the obtainer 105 obtains a difference quantization parameter for the current coding unit from the bitstream according to a CBF value, an operation for obtaining the CBF value and an operation for determining whether the CBF value is 1 may need to be performed in advance, which may cause a parsing delay and increase complexity for an identification on whether a condition is satisfied. However, the obtainer 105 may obtain a difference quantization parameter for the current coding unit from information about a first transform unit of a first coding unit in decoding order, without identifying a coding block flag value representing whether at least one transform coefficient which is not 0 is included in a transform unit included in at least one coding unit of the plurality of coding units included in the predefined coding unit including the current coding unit. At this time, the obtainer 105 may not obtain any difference quantization parameter from information about the remaining transform units (second and subsequent transform units) excluding the first transform unit of the first coding unit in decoding order. In this case, a difference quantization parameter for each coding unit may be determined to be the difference quantization parameter obtained from the information about the first coding unit. Accordingly, a parsing delay and complexity for an identification on whether a condition is satisfied may be reduced.

The inverse-quantizer 115 may obtain a quantization parameter for the current coding unit by using a predicted quantization parameter for the current coding unit and the difference quantization parameter for the current coding unit. At this time, the inverse-quantizer 115 may obtain a quantization parameter decoded earlier in decoding order in a current tile or slice, as the predicted quantization parameter for the current coding unit. When the current coding unit is a first coding unit of a tile or slice, the inverse-quantizer 115 may obtain a quantization parameter of a slice level as the predicted quantization parameter for the current coding unit. At this time, the quantization parameter may be obtained for each component. For example, the inverse-quantizer 115 may determine an offset value of a quantization parameter range of a luma component or a chroma component based on a bit depth of the luma component or a bit depth of the chroma component, and add a value for each component obtained based on a sum of the predicted quantization parameter for the current coding unit and the difference quantization parameter for the current coding unit to the offset value of the quantization parameter range for each component, thereby obtaining a quantization parameter for each component.

Here, a relationship between a quantization parameter $Qp_Y$ of a luma component and a quantization parameter $Qp_{cb(cr)}$ of a chroma component may be expressed by Equation 1 below.

$$Qp_{cb(cr)} = Qp_Y + \text{slice\_cb(cr)\_Qp\_offset} \quad [\text{Equation 1}]$$

Herein, slice_cb(cr)_qp_offset may represent an offset between a quantization parameter of a luma component and a quantization parameter of a chroma component Cb or Cr, obtained in a slice level, and may be obtained for each chroma component Cb or Cr.

Hereinafter, a method for signaling a difference quantization parameter considering a Split Unit Coding Unit (SUCO) scheme will be described. The SUCO scheme may increase encoding performance by changing an encoding/decoding order of coding units. That is, according to the SUCO scheme, when a split direction of a first coding unit is a vertical direction, an encoding/decoding order of a split second coding unit may be determined to be an order of coding units from left to right or an order of coding units from right to left. Details about the SUCO scheme will be described below with reference to FIG. 5.

According to the SUCO scheme, a neighboring block (for example, a neighboring coding unit or a neighboring quantization group) that is referred to obtain a predicted quantization parameter may depend on a decoding order. Herein, a quantization group means a data unit for determining a quantization parameter, and may include at least one coding unit. The quantization group may be a coding unit that is larger than or equal to a coding unit having a specific depth, a specific area, or a specific size. For example, all of left, upper, and right blocks of the current coding unit may be available for reference. Here, a quantization parameter QP of the current coding unit may be determined according to Equation 2 below.

$$QP = \text{pred } QP + \text{delta } QP \quad \text{[Equation 2]}$$

Herein, pred QP is a predicted quantization parameter of the current coding unit, and delta QP is a difference quantization parameter of the current coding unit. The pred QP may be predicted by using at least one QP of a left quantization group, an upper quantization group, or a right quantization group. When a QP of the left quantization group, the upper quantization group, or the right quantization group is unavailable, the pred QP may be predicted by using prev QP. The prev QP may be a quantization parameter of a final coding unit of a previous quantization group in encoding (decoding) order. When prev QP does not exist, the pred QP may be obtained by using a quantization parameter (slice QP) in a slice level. The pred QP may be obtained according to various embodiments as follows.

According to an embodiment, when a SUCO index value is 1 (or "on") (that is, when a decoding order is identified as an order from a right coding unit to a left coding unit), a predicted quantization parameter pred QP may be obtained according to Equation 3 below.

$$\text{pred } QP = (QP\_above + QP\_right + 1)/2 \quad \text{[Equation 3]}$$

Herein, QP_above may be a quantization parameter of the upper coding unit of the current coding unit, and QP_right may be a quantization parameter of the right coding unit of the current coding unit. When the SUCO index value is 0 (or "off") (that is, when a decoding order is identified as an order from a left coding unit to a right coding unit), a predicted quantization parameter pred QP may be obtained according to Equation 4 below.

$$\text{pred } QP = (Q\_above + QP\_left + 1)/2 \quad \text{[Equation 4]}$$

According to another embodiment, when a SUCO enable-flag indicates on (that is, when it is determined that SUCO is to be used), a predicted quantization parameter pred QP may be obtained according to Equation 5 below.

$$\text{pred } QP = (QP\_above + P\_right + QP\_left + QP\_\text{prev} + 2)/4 \quad \text{[Equation 5]}$$

Also, when the SUCO enable-flag indicates on, a predicted quantization parameter pred QP may be obtained according to Equation 6 below.

$$\text{pred } QP = (QP\_above + QP\_right + QP\_\text{loft} + 1)/3 \quad \text{[Equation 6]}$$

According to another embodiment, when a left block is available (that is, when there is a left quantization group and the left quantization group is previously encoded (decoded)), a predicted quantization parameter pred QP may be obtained according to Equation 7 below.

$$\text{pred } QP = (QP\_above + QP\_left + 1)/2 \quad \text{[Equation 7]}$$

hen the left block is unavailable (that is, when there is not a left quantization group nor a left quantization group is first encoded (decoded)), a predicted quantization parameter pred QP may be obtained according to Equation 8 below.

$$\text{pred } QP = (Q\_above + QP\_right + 1)/2 \quad \text{[Equation 8]}$$

According to another embodiment, when a right block is available (that is, when there is a right quantization group and the right quantization group is first encoded (decoded)), a predicted quantization parameter pred QP may be obtained according to Equation 9 below.

$$\text{pred } QP = (QP\_above | QP\_right + 1)/2 \quad \text{[Equation 9]}$$

When the right block is unavailable (that is, when there is no right quantization group or right quantization group that is previously encoded (decoded)), a predicted quantization parameter pred QP may be obtained according to Equation 10 below.

$$\text{pred } QP = (QP\_above + QP\_left + 1)/2 \quad \text{[Equation 10]}$$

According to another embodiment, by searching blocks in order of left block→upper block→right block, a predicted quantization parameter pred QP may be obtained by using a quantization parameter of an available quantization group.

For example, a predicted quantization parameter pred QP may be obtained according to Equation 11 below.

$$\text{pred } QP = (\text{Avail\_1\_}QP + \text{Avail\_2\_}QP + 1)/2 \quad \text{[Equation 11]}$$

When the number of available quantization groups is equal to or less than 1, a predicted quantization parameter pred QP may be obtained by using prev QP. In this case, a search order of blocks may be one of orders of upper-→left→right, left→upper→right, right→upper→left, left→right→upper, and right→left→upper.

According to another embodiment, a predicted quantization parameter pred QP may be obtained according to a weighted sum, based on reliabilities of a left block and an upper block. For example, a predicted quantization parameter pred QP may be obtained according to Equation 12 below.

$$\text{pred } QP = (N*QP\_above + M*QP\_left + L*QP\_right + (N+M+L)/2)/(N+M+L) \quad \text{[Equation 12]}$$

(where N, M, and L are natural numbers)

Herein, N, M, and L may be determined according to reliabilities. For example, a predicted quantization parameter pred QP may be obtained according to Equation 13 below.

$$\text{pred } QP = (2*QP\_above + QP\_left + QP\_right + 2)/4 \quad \text{[Equation 13]}$$

As an example of determining reliability, reliability may be determined based on similarity between an area of a current coding unit and an area of a neighboring block.

As an example of determining reliability, reliability may be determined according to prediction modes (e.g., intra mode or inter mode) of a current coding unit and a neighboring block.

As an example of determining reliability, when a current coding unit has been encoded (decoded) with a predefined encoding (decoding) tool and a neighboring block also has already been encoded (decoded) with the predefined encoding (decoding) tool, the neighboring block may be set to high reliability.

For example, when a current coding unit is encoded (decoded) according to a Skip mode, a Merge mode, an Affine mode, or a Merge with Motion Vector Difference (MMVD) mode among inter modes, and there is a neighboring block encoded (decoded) according to the Skip mode, the Merge mode, the Affine mode, or the MMVD mode among neighboring blocks, the neighboring block may be set to high reliability or a QP of the neighboring block may be more preferentially used than QPs of other blocks. The Affine mode refers to a mode in which motion compensation based on an affine model is used for inter prediction. The MMVD mode refers to a mode of generating new motion vector candidates by indexing motion vectors of neighboring blocks and predefined Motion Vector Differences (MVDs), and then deriving motion information of a current coding unit based on the motion vector candidates.

The obtainer 105 may obtain information about a difference quantization parameter from a bitstream, according to various embodiments. The various embodiments will be described below with reference to FIGS. 3A to 4C.

Hereinafter, a method of signaling a predefined area unit in which a difference quantization parameter of a coding unit is signaled will now be described.

The obtainer 105 may obtain information about a predefined area unit in unit of a sequence parameter set (SPS), a picture parameter set (PPS), a slice, a tile, or a tile group. The information about the predefined area unit may represent a predefined area value, a value (or a value resulting from applying a log of 2 to a predefined area value) resulting from expressing a predefined area value as a multiplier of 2, an index value of a table having an area value, or a difference from a specific value.

According to an embodiment, the information about the predefined area value delta_QP_area may be expressed as a multiplier of 2 of an area value. For example, the information about the predefined area value delta_QP_area may correspond to 7. In this case, the predefined area may be 2^7=128, and a coding unit determined according to the predefined area unit to signal a difference quantization parameter may be 8×16, 16×8, etc. Also, the information about the predefined area value delta_QP_area may correspond to 8. In this case, the predefined area may be 2^8=256, and a coding unit determined according to the predefined area unit to signal a difference quantization parameter may be 16×16, 8×32, 32×8, etc. Also, the information about the predefined area value delta_QP_area may correspond to 9. In this case, the predefined area may be 2^9=512, and a coding unit determined according to the predefined area unit to signal a difference quantization parameter may be 32×16, 16×32, 64×8, 8×64, etc. Also, the information about the predefined area value delta_QP_area may correspond to 10. In this case, the predefined area may be 2^10=1024, and a coding unit determined according to the predefined area unit to signal a difference quantization parameter may be 32×32, 16×64, 64×16, 128×8, 8×128, etc.

According to an embodiment, the information about the predefined area value delta_QP_area may correspond to an index value representing one of area values shown in Table 1 and Table 2.

TABLE 1

| Index | 0 | 1 | 2 | 3 | ... |
|---|---|---|---|---|---|
| Area Value | 128 | 256 | 512 | 1024 | ... |

TABLE 2

| Index | 0 | 1 | 2 | 3 | ... |
|---|---|---|---|---|---|
| Area Value | 256 | 512 | 1024 | 2048 | ... |

However, a correspondence relation between index values and area values are not limited to Table 1 and Table 2, and may be defined variously.

According to an embodiment, the information about the predefined area value delta_QP_area may represent a difference from a value related to a size of a minimum coding unit. For example, when the size of the minimum coding unit is 4×4, a value log 2_min_cu_area represented by the area may be log 2(16)=4, and, when the predefined area value is 256 (for example, when the size is 16×16), a value log 2_delta_qp_area represented by the area may be log 2(256)=8. Accordingly, the information about the predefined area value delta_QP_area may correspond to log 2_delta_qp_area−log 2_min_cu_area. For example, the information about the predefined area value delta_QP_area may correspond to 8−4=4.

According to an embodiment, the information about the predefined area value delta_QP_area may represent a difference from a value related to a minimum difference quantization parameter area. The minimum difference quantization parameter area may indicate an area of a minimum block of signaling a difference quantization parameter. When the minimum difference quantization parameter area (size) is 16×16 (256), a value represented by the area may be log 2(256)=8, and, when the predefined area value is 256 (for example, when the size is 16×16), a value represented by the area may be log 2(256)=8. Accordingly, the information about the predefined area value delta_QP_area may correspond to log 2_delta_qp_area−log 2_min_delta_qp_area. For example, the information about the predefined area value delta_QP_area may indicate 8−8=0.

According to an embodiment, the information about the predefined area value delta_QP_area may represent a difference from a value related to a size of a largest coding unit (or coding tree unit). For example, when the size of the largest coding unit is 128×128, a value represented by the area may be log 2(16384)=14, and, when the predefined area value is 256 (for example, when the size is 16×16), a value represented by the area may be log 2(256)=8. Accordingly, the information about the predefined area value delta_QP_area may correspond to log 2_max_cu_area−log 2_delta_qp_area. For example, the information about the predefined area value delta_QP_area may correspond to 14−8=6.

According to an embodiment, the information about the predefined area value delta_QP_area may represent a difference from a value related to a maximum difference quantization parameter area Maximum delta QP area. In this case, the maximum difference quantization parameter area may mean an area of a largest block of signaling a difference quantization parameter. For example, when the maximum difference quantization parameter area (size) is 64×64 (4096), a value represented by the area may be log 2(4096)=12, and, when the predefined area value is 256 (for example, when the size is 16×16), a value represented by the area may be log 2(256)=8. Accordingly, the information about the predefined area value delta_QP_area may be log 2_max_delta_qp_area−log 2_delta_qp_area. For example, the information about the predefined area value delta_QP_area may be 12−8=4.

Hereinafter, a method of signaling a difference quantization parameter in a frame level will be described.

When a difference quantization parameter delta QP is signaled, a QP may be used in a specific frame, without changes of QPs for each coding unit. In this case, the following processing may be performed in each frame level.

The obtainer 105 may obtain a first bin of bins representing information about a difference quantization parameter delta QP of a frame level. At this time, the first bin may represent whether or not the difference quantization parameter delta QP is 0. For example, the obtainer 105 may perform binary arithmetic decoding based on a context model on a first bit of the information about the difference quantization parameter delta QP of the frame level to obtain a first arithmetically decoded bin. Here, when the first arithmetically decoded bin is 0, the obtainer 105 may not obtain information about a difference quantization parameter delta QP that is not 0, and the inverse-quantizer 115 may obtain a quantization parameter of a current frame, which is the same as a quantization parameter of a previous frame.

When the first arithmetically decoded bin is not 0, the obtainer 105 may obtain information (the remaining bins after the first bin of the bins representing the information about the difference quantization parameter delta QP) about a difference quantization parameter that is not 0, from a bitstream.

The obtainer 105 may obtain default_zero_dqp_signal in a frame level, and update or maintain probability information for the information about the difference quantization parameter delta QP of the frame level, based on a value of default_zero_dqp_signal. For example, when the value of default_zero_dqp_signal is 1, the obtainer 105 may update a probability that a bin included in information about the difference quantization parameter delta QP will be 0 to a value that is close to 1. Here, a context index ctxIdx that is different from that of a previous frame may be used.

When the value of default_zero_dqp_signal is 0, the same probability as that of the previous frame may be used. That is, the same context index ctxIdx may be used.

In addition, two probability tables may be used. That is, a probability table of when default_zero_dqp_signal is 1 and a probability table of when default_zero_dqp_signal is 0 may be distinguished and used.

Moreover, the obtainer 105 may obtain residual information (information about at least one coefficient) of the current coding unit from the bitstream, and obtain at least one coefficient for the current coding unit based on the residual information of the current coding unit. The inverse-quantizer 115 may inverse-quantize at least one coefficient (which is not 0) for the current coding unit, obtained by the obtainer 105, based on whether the at least one coefficient which is not 0 exists in a quantization parameter for the current coding unit and a transform unit included in the current coding unit, to obtain at least one inverse-quantized coefficient.

The image decoder 110 may obtain a residual block of the current coding unit based on the at least one inverse-quantized coefficient. At this time, the at least one inverse-quantized coefficient may be at least one transform coefficient, and the image decoder 110 may perform inverse-transformation on a block including the at least one transform coefficient to obtain a residual block including at least one coefficient. At this time, the coefficient may be a coefficient on a spatial domain. The inverse-transformation may be omitted in some cases, and in these cases, the inverse-quantized coefficient may be a coefficient on the spatial domain. The image decoder 110 may obtain the residual block of the current coding unit, including the at least one inverse-quantized coefficient (that is, the coefficient on the spatial domain), without performing inverse-transformation.

The image decoder 110 may obtain a reconstructed block of the current coding unit based on the residual block of the current coding unit. For example, the image decoder 110 may sum sample values of samples included in the residual block of the current coding unit and sample values of samples included in a predicted block of the current coding unit to obtain sample values of samples included in a reconstructed block of the current coding unit, and obtain the reconstructed block of the current coding unit based on the sample values of the samples included in the reconstructed block. The predicted block of the current coding unit may be a block predicted according to various prediction schemes of an inter mode or an intra mode.

Figure 1B:
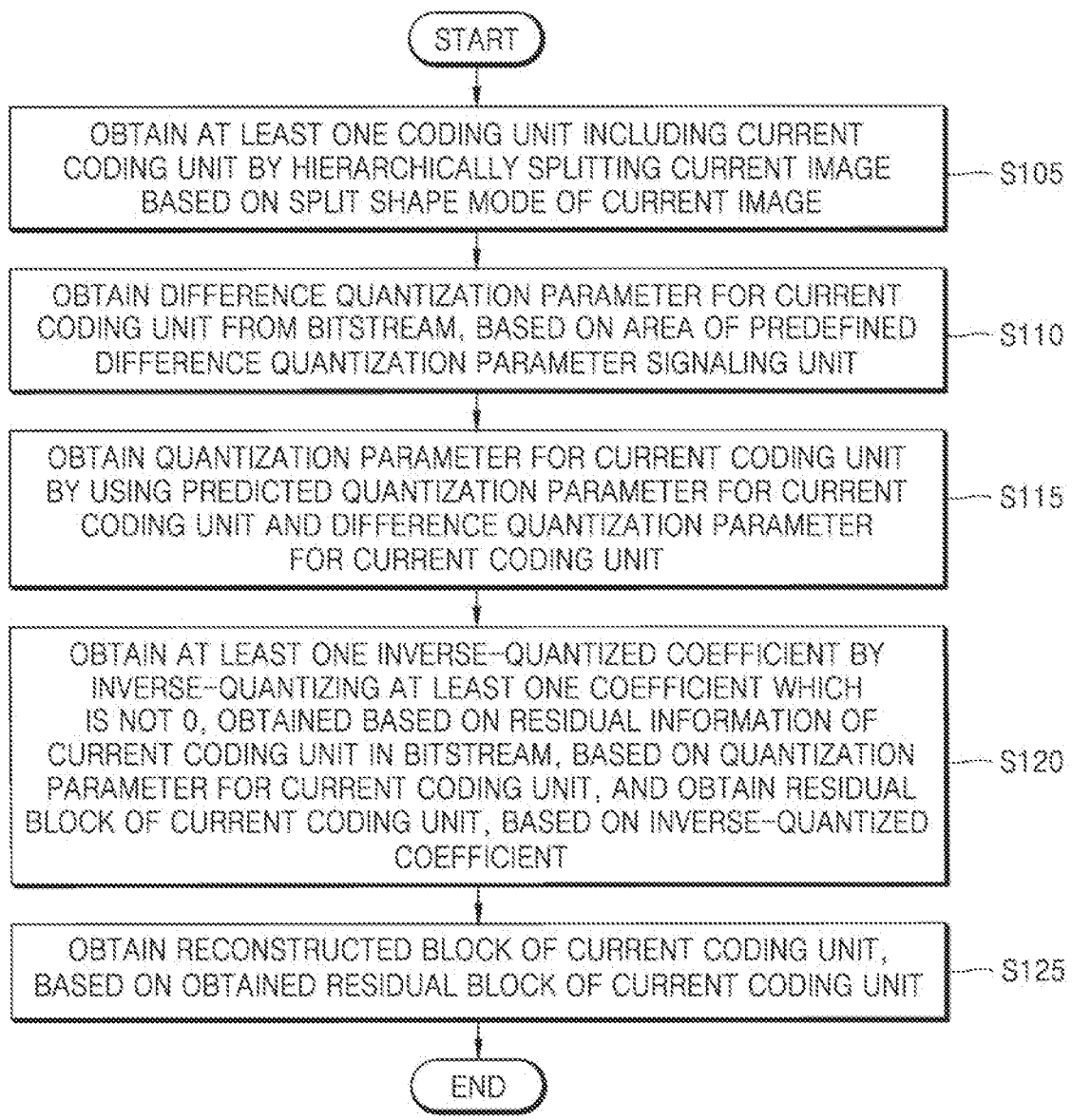
FIG. 1B is a flowchart showing an image decoding method according to various embodiments.

FIG. 1B is a flowchart showing an image decoding method according to various embodiments.

In operation S105, the image decoding apparatus 100 may obtain at least one coding unit including a current coding unit by hierarchically splitting a current image based on a split shape mode of the current image.

In operation S110, the image decoding apparatus 100 may obtain a difference quantization parameter for the current coding unit from a bitstream, based on an area of a predefined difference quantization parameter signaling unit.

When an area of the current coding unit is larger than or equal to that of the predefined difference quantization parameter signaling unit, and a size of the current coding unit is larger than a maximum size of a transform unit, the image decoding apparatus 100 may obtain a difference quantization parameter for the current coding unit from information about a transform unit first decoded from among a plurality of transform units split from the current coding unit. That is, the image decoding apparatus 100 may obtain a difference quantization parameter for the current coding unit from a syntax structure of the transform unit first decoded from among the plurality of transform units split from the current coding unit. At this time, the image decoding apparatus 100 may obtain the difference quantization parameter for the current coding unit, regardless of a value of a flag representing whether at least one transform coefficient which is not 0 is included in at least one transform unit (particularly, the transform unit first decoded) included in the current coding unit. That is, the image decoding apparatus 100 may obtain a difference quantization parameter for the current coding unit, without identifying a value of a flag representing whether at least one transform coefficient which is not 0 is included in at least one transform unit included in the current coding unit.

When the area of the current coding unit is larger than or equal to that of the predefined difference quantization parameter signaling unit, and the size of the current coding unit is smaller than or equal to the maximum size of the transform unit, the image decoding apparatus 100 may obtain a difference quantization parameter for the current coding unit, based on a value of a coding block flag representing whether at least one transform coefficient which is not 0 is included in a transform unit having the same size as the current coding unit. When the current coding unit corresponds to coding units of at least one luma component and chroma components Cb and Cr, the image decoding apparatus 100 may obtain a difference quantization parameter for the current coding unit, based on at least one value of a first coding block flag value representing whether at least one transform coefficient which is not 0 is included in a transform unit having the same size as the coding unit of the luma component corresponding to the current coding unit, a second coding block flag value representing whether at least one transform coefficient which is not 0 is included in a transform unit having the same size as the coding unit of the chroma component Cb corresponding to the current coding unit, and a third coding block flag value representing whether at least one transform coefficient which is not 0 is included in a transform unit having the same size as the coding unit of the chroma component Cr corresponding to the current coding unit. In this case, the area of the predefined difference quantization parameter signaling unit may be determined, based on information about a difference between a predefined value and a value resulting from applying log 2 to the area of the predefined difference quantization parameter signaling unit, obtained from a Picture Parameter Set (PPS) of the bitstream.

According to an embodiment, when a difference quantization parameter enable flag representing whether signaling for a difference quantization parameter is to be enabled represents enabling and a flag representing whether a signaling scheme of a predefined difference quantization parameter is to be used represents that the signaling scheme of the predefined difference quantization parameter is used, the case in which a split flag representing whether or not a current coding unit is to be split represents that the current coding unit is to not be split, and the case in which a sum of a value resulting from applying log 2 to a width of the current coding unit and a value resulting from applying log 2 to a height of the current coding unit is larger than or equal to a value resulting from applying log 2 to the area of the predefined difference quantization parameter signaling unit, the image decoding apparatus 100 may determine a value of cuQPDeltaCode of the current coding unit as a predefined first value when the height or width of the current coding unit is larger than the maximum size of the transform unit. For example, the predefined first value may be 2, although not limited thereto. When the height and width of the current coding unit is smaller than or equal to the maximum size of the transform unit, the image decoding apparatus 100 may determine a value of cuQPDeltaCode of the current coding unit as a predefined second value. The predefined second value may be 1, although not limited thereto.

The image decoding apparatus 100 may identify a value of cuQPDeltaCode to obtain a difference quantization parameter for the current coding unit. For example, the image decoding apparatus 100 may identify a value of cuQPDeltaCode for the current coding unit as the predefined first value, and obtain a difference quantization parameter of the current coding unit, regardless of a value of CBF of the current coding unit. The image decoding apparatus 100 may identify a value of cuQPDeltaCode as the predefined second value, and obtain a difference quantization parameter of the corresponding coding unit, based on a value of CBF of the corresponding coding unit (or a transform unit included in the corresponding coding unit) (for example, when at least one of CBF values for individual components is 1).

In addition, when the area of the current coding unit is smaller than that of the predefined difference quantization parameter signaling unit, the image decoding apparatus 100 may obtain a difference quantization parameter for the current coding unit from information about a transform unit first decoded from a coding unit first decoded from among a plurality of coding units included in a predefined coding unit including the current coding unit. Here, the image decoding apparatus 100 may obtain the difference quantization parameter for the current coding unit, regardless of a value of a coding block flag representing whether at least one coefficient which is not 0 is included in the transform unit of the coding unit first decoded (or previously decoded) from among the plurality of coding units.

According to an embodiment, when the area of the current coding unit is smaller than that of the predefined difference quantization parameter signaling unit, a split flag representing whether or not the predefined coding unit including the current coding unit is to be split indicates that the predefined coding unit including the current coding unit is split, a split type of the predefined coding unit including the current coding unit is a ternary split type and a sum of a value resulting from applying log 2 to the width of the predefined coding unit including the current coding unit and a value resulting from applying log 2 to the height of the predefined coding unit including the current coding unit that is equal to a value obtained by adding 1 to a value resulting from applying log 2 to the area of the predefined difference quantization parameter signaling unit, or a sum of a value resulting from applying log 2 to the height of the predefined coding unit including the current coding unit and a value resulting from applying log 2 to the height of the predefined coding unit including the current coding unit that is equal to a value resulting from applying log 2 to the area of the predefined difference quantization parameter signaling unit. The image decoding apparatus 100 may determine a value of cuQPDeltaCode of the predefined coding unit including the current coding unit as the predefined first value.

The image decoding apparatus 100 may identify a value of cuQPDeltaCode as the predefined first value, and obtain a difference quantization parameter for the current coding unit from information about a transform unit first decoded from a coding unit first decoded from among a plurality of coding units included in the predefined coding unit including the current coding unit, regardless of a value of CBF of a transform unit included in the corresponding coding unit.

In operation S115, the image decoding apparatus 100 may obtain a quantization parameter for the current coding unit by using a predicted quantization parameter for the current coding unit and the difference quantization parameter for the current coding unit.

In operation S120, the image decoding apparatus 100 may obtain at least one inverse-quantized coefficient by inverse-quantizing at least one coefficient which is not 0, obtained based on residual information of the current coding unit in the bitstream, based on the quantization parameter for the current coding unit and whether at least one coefficient which is not 0 exists in the transform unit included in the current coding unit, and obtain a residual block of the current coding unit, based on the inverse-quantized coefficient.

In operation S125, the image decoding apparatus 100 may obtain a reconstructed block of the current coding unit, based on the obtained residual block of the current coding unit.

Figure 1C:
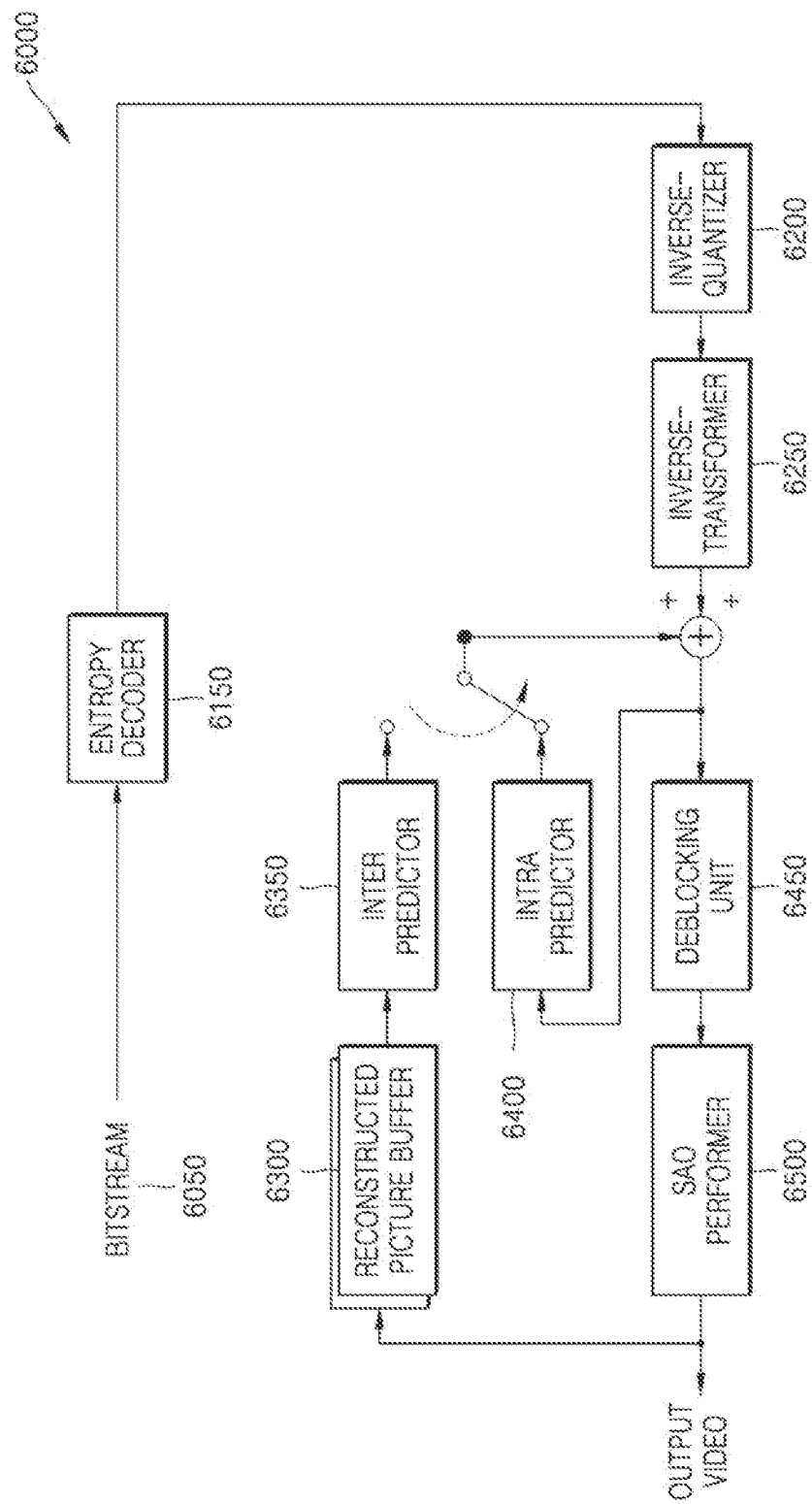
FIG. 1C is a block diagram of an image decoder according to various embodiments.

FIG. 1C is a block diagram of an image decoder 6000 according to various embodiments.

The image decoder 6000 according to various embodiments may perform tasks that the obtainer 105 and the image decoder 110 of the image decoding apparatus 100 to decode image data.

Referring to FIG. 1C, an entropy decoder 6150 may parse encoded image data to be decoded from a bitstream 6050 and encoding information required for decoding. The encoded image data may be a quantized transform coefficient, and an inverse-quantizer 6200 and an inverse-transformer 6250 may restore residual data from the quantized transform coefficient.

An intra predictor 6400 may perform intra prediction for each block. An inter predictor 6350 may perform inter prediction for each block by using a reference image obtained from a reconstructed picture buffer 6300. By adding the residual data and predicted data for each block generated by the intra predictor 6400 or the inter predictor 6350 to restore spatial-domain data for a block of a current image, a deblocking unit 6450 and a SAO performer 6500 may perform roof filtering on the reconstructed spatial-domain data and output a filtered, reconstructed image. Also, reconstructed images stored in the reconstructed picture buffer 6300 may be output as reference images.

For the image decoder 110 of the image decoding apparatus 100 to decode image data, the image decoder 6000 according to various embodiments may perform phased tasks for each block. For example, a task of the inverse-quantizer 6200 may correspond to a task of the inverse-quantizer 115.

Figure 2A:
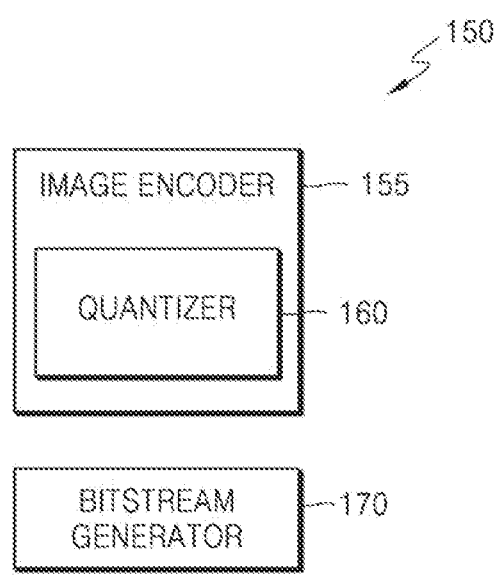
FIG. 2A is a block diagram of an image encoding apparatus according to various embodiments.

FIG. 2A is a block diagram of an image encoding apparatus according to various embodiments.

An image encoding apparatus 150 according to various embodiments may include an image encoder 155 and a bitstream generator 170.

The image encoder 155 and the bitstream generator 170 may include at least one processor. Also, the image encoder 155 and the bitstream generator 170 may include a memory storing instructions that are to be executed by the at least one processor. The image encoder 155 and the bitstream generator 170 may be implemented as different hardware, or the image encoder 155 may include the bitstream generator 170. The image encoder 155 may include a quantizer 160. In this case, the quantizer 160 may be implemented as hardware that is different from the image encoder 155.

The image encoder 155 may hierarchically split a current image based on a split shape mode of the current image to obtain a plurality of coding units including a current coding unit. At this time, the split shape mode may represent at least one of whether or not to split, a split direction, or a split type. The split type may represent one of a binary split type, a tri split type, and a quad split type. When binary split is performed in a horizontal direction (or a vertical direction) after binary split is performed in the vertical direction (or the horizontal direction), substantially the same effect as when quad split is performed may be obtained. Therefore, the split type may represent only one of the binary split type and the tri split type.

The image encoder 155 may obtain at least one coefficient included in the current coding unit. For example, the image encoder 155 may obtain a residual sample value of a residual block of the current coding unit, based on a difference between an original sample value in an original block of the current coding unit and a predicted sample value in a predicted block of the current coding unit. The residual sample value in the residual block may correspond to at least one coefficient. At this time, the predicted block may be obtained based on prediction according to an intra mode or an inter mode.

The image encoder 155 may perform transformation on the at least one coefficient included in the current coding unit to obtain at least one transform coefficient.

The quantizer 160 may perform quantization on the at least one transform coefficient to obtain at least one quantized transform coefficient and a quantization parameter for the current coding unit.

The image encoder 155 may obtain a difference quantization parameter for the current coding unit, based on the quantization parameter for the current coding unit and a predicted quantization parameter.

The image encoder 155 may generate residual information of the current coding unit, including information about the at least one quantized transform coefficient. Also, the image encoder 155 may generate a syntax element representing a difference quantization parameter for the current coding unit, based on an area of a predefined difference quantization parameter signaling unit. At this time, the syntax element representing the difference quantization parameter may include a syntax element representing a sign of the difference quantization parameter and a syntax element representing an absolute value of the difference quantization parameter.

According to an embodiment, in the case in which an area of the current coding unit is larger than or equal to an area of the predefined difference quantization parameter signaling unit, the image encoder 155 may generate a syntax element related to a difference quantization parameter for the current coding unit, included in information about a transform unit first decoded from among a plurality of transform units split from the current coding unit, when the size of the current coding unit is larger than the maximum size of the transform unit. Herein, the current coding unit may be a coding unit that is no longer split into coding units of a lower depth.

The image encoder 155 may generate the syntax element related to the difference quantization parameter for the current coding unit, regardless of whether at least one transform coefficient which is not 0 is included in at least one transform unit (particularly, a first encoded transform unit) included in the current coding unit.

The bitstream generator 170 may generate a bitstream including the syntax element representing the difference quantization parameter for the current coding unit and the residual information of the current coding unit.

When the area of the current coding unit is larger than or equal to that of the predefined difference quantization parameter signaling unit, the image encoder 155 may generate a syntax element representing a difference quantization parameter for the current coding unit, based on whether at least one transform coefficient which is not 0 is included in a transform unit having the same size as the current coding unit, when the size of the current coding unit is smaller than or equal to the maximum size of the transform unit. When at least one transform coefficient which is not 0 is not included in the transform unit having the same size as the current coding unit, the image encoder 155 may generate no syntax element representing the difference quantization parameter for the current coding unit. When at least one transform coefficient which is not 0 is included in the transform unit having the same size as the current coding unit, the image encoder 155 may generate a syntax element representing the difference quantization parameter for the current coding unit.

When the current coding unit corresponds to coding units of at least one luma component and chroma components Cb and Cr, the image encoder 155 may generate a syntax element representing a difference quantization parameter for the current coding unit, based on whether at least one transform coefficient which is not 0 is included in a transform unit having the same size as the coding unit of the luma component corresponding to the current coding unit, whether at least one transform coefficient which is not 0 is included in a transform unit having the same size as the coding unit of the chroma component Cb corresponding to the current coding unit, and whether at least one transform coefficient which is not 0 is included in a transform unit having the same size as the coding unit of the chroma component Cr corresponding to the current coding unit. When a tree type is a single tree type, the image encoder 155 may obtain at least one coding unit, based on information about a split shape mode of the current image, used in common between the components. That is, when a tree type is a single tree type, the current coding unit may correspond to the coding unit of the luma component and the coding units of the chroma components Cb and Cr. In this case, the image encoder 155 may obtain the syntax element representing the difference quantization parameter for the current coding unit, based on at least one of whether at least one transform coefficient which is not 0 is included in the transform unit having the same size as the coding unit of the luma component corresponding to the current coding unit, whether at least one transform coefficient which is not 0 is included in the transform unit having the same size as the coding unit of the chroma component Cb corresponding to the current coding unit, and whether at least one transform coefficient which is not 0 is included in the transform unit having the same size as the coding unit of the chroma component Cr corresponding to the current coding unit.

When the tree type is a dual tree type, the image encoder 155 may obtain at least one coding unit for each of the luma component and the chroma components Cb and Cr, based on a split shape mode of an image for each of the luma component and the chroma components Cb and Cr. The dual tree type may include a dual luma type and a dual chroma type, and in the case of the dual luma type, the image encoder 155 may obtain at least one coding unit of a luma component based on a split shape mode of an image of the luma component. In the case of the dual chroma type, the image encoder 155 may obtain at least one coding unit of a chroma component based on a split shape mode of an image of the chroma component.

In this case, a coding unit corresponding to the current coding unit may be the coding unit of the luma component. Alternatively, a coding unit corresponding to the current coding unit may be the coding unit of the chroma component Cb or Cr. The image encoder 155 may generate a syntax element representing a difference quantization parameter for the coding unit of the corresponding component, based on whether at least one transform coefficient which is not 0 is included in a transform unit having the same size as the coding unit of the luma component or the chroma component corresponding to the current coding unit. In the case in which the area of the current coding unit is smaller than that of the predefined difference quantization parameter signaling unit, the image encoder 155 may generate a syntax element representing a difference quantization parameter for the current coding unit included in information about a transform unit first encoded from a coding unit first decoded from among a plurality of coding units included in a predefined coding unit including the current coding unit.

The quantizer 160 may obtain a quantization parameter encoded earlier in encoding order in a current tile or slice, as a prediction parameter for the current coding unit. When the current coding unit is a first coding unit of a tile or slice, the quantizer 160 may obtain a quantization parameter of a slice level as a predicted parameter for the current coding unit. The quantization parameter may be obtained for each component. For example, the quantizer 160 may determine an offset value of an quantization parameter range of a luma component or a chroma component based on a bit depth of the luma component or a bit depth of the chroma component, and sum the offset value of the quantization parameter range for each component and a value for each component obtained based on a sum of the predicted quantization parameter for the current coding unit and the difference quantization parameter for the current coding unit, thereby obtaining a quantization parameter for each component.

Meanwhile, a relation between a quantization parameter $Qp_Y$ of a luma component and a quantization parameter $Qp_{cb(cr)}$ of a chroma component may be expressed by using Equation 14 below. At this time, slice_cb(cr)_qp_offset may be an offset between the quantization parameter $Qp_Y$ of the luma component and the quantization parameter $Qp_{cb(cr)}$ of the chroma component Cb or Cr, obtained in the slice level, and information of slice_cb(cr)_qp_offset may be obtained for each chroma component Cb or Cr.

$$Qp_{cb(cr)} = Qp_Y + \text{slice\_cb(cr)\_qp\_offset} \qquad \text{[Equation 14]}$$

Hereinafter, a method for signaling a difference quantization parameter, in consideration of the SUCO scheme, will now be described. The SUCO scheme may be a scheme of increasing coding performance by changing an encoding/decoding order of coding units. That is, according to the SUCO scheme, when a split direction of a first coding unit is a vertical direction, an encoding/decoding order of a split second coding unit may be determined as an order of coding units from left to right or an order of coding units from right to left. Details about the SUCO scheme will be described below with reference to FIG. 5.

According to the SUCO scheme, a neighboring block (for example, a neighboring coding unit or a neighboring quantization group) that is referred to obtain a predicted quantization parameter may change according to an encoding order. Herein, a quantization group means a data unit of determining a quantization parameter, and may include at least one coding unit. The quantization group may be a coding unit that is larger than or equal to a coding unit having a specific depth, a specific area, or a specific size. For example, all of left, upper, and right blocks of a current coding unit may be used for reference. In this case, a quantization parameter QP of the current coding unit may be induced according to Equation 15 below.

$$QP = \text{pred } QP + \text{delta } QP \qquad \text{[Equation 15]}$$

Pred QP may be a predicted quantization parameter of the current coding unit, and delta QP may be a difference quantization parameter of the current coding unit. The pred QP may be predicted by using QP of at least one quantization group of a left quantization group, an upper quantization group, or a right quantization group. When any QP of the left quantization group, the upper quantization group, or the right quantization group is unavailable, the pred QP may be predicted or determined by using prev QP. The prev QP may be a quantization parameter of a final coding unit of a previous quantization group in encoding (decoding) order. When prev QP does not exist, a predicted quantization parameter may be obtained by using a quantization parameter (slice QP) of a slice level. At this time, the pred QP may be obtained according to various embodiments, as follows.

According to an embodiment, when an encoding order is identified as an order from a right coding unit to a left coding unit, the predicted quantization parameter pred QP may be obtained according to Equation 16 below.

$$\text{pred } QP=(QP\_above+QP\_right+1)/2 \quad \text{[Equation 16]}$$

Herein, QP_above may be a quantization parameter of the upper coding unit of the current coding unit, and QP_right may be a quantization parameter of the right coding unit of the current coding unit. Meanwhile, when an encoding order is identified as an order from a left coding unit to a right coding unit, a predicted quantization parameter pred QP may be obtained according to Equation 17 below.

$$\text{pred } QP=(QP\_above+QP\_left+1)/2 \quad \text{[Equation 17]}$$

According to another embodiment, when it is identified that the SUCO scheme is to be used, a predicted quantization parameter pred QP may be obtained according to Equation 18 below.

$$\text{predQP}=(QP\_above+QP\_right+QP\_left+QP\_prev+2)/4 \quad \text{[Equation 18]}$$

Alternatively, when it is identified that the SUCO scheme is to be used, a predicted quantization parameter pred QP may be obtained according to Equation 19 below.

$$\text{pred } QP=(QP\_above+QP\_right+QP\_left+1)/3 \quad \text{[Equation 19]}$$

According to another embodiment, when a left block is available (that is, when a left quantization group exists and is first encoded), a predicted quantization parameter pred QP may be obtained according to Equation 20 below.

$$\text{Pred } QP=(QP\_above+QP\_left+1)/2 \quad \text{[Equation 20]}$$

Moreover, when the left block is unavailable (when there is not a left quantization group nor a left quantization group is first encoded), a predicted quantization parameter pred QP may be obtained according to Equation 21 below.

$$\text{pred } QP=(QP\_above+QP\_right+1)/2 \quad \text{[Equation 21]}$$

According to another embodiment, when a right block is available (that is, when there is a right quantization group exists and the right quantization group is first encoded), a predicted quantization parameter pred QP may be obtained according to Equation 22 below.

$$\text{pred } QP=(QP\_above+QP\_right+1)/2 \quad \text{[Equation 22]}$$

When the right block is unavailable (when there is not a right quantization group nor a right quantization group is first encoded), a predicted quantization parameter pred QP may be obtained according to Equation 23 below.

$$\text{pred } QP=(QP\_above+QP\_left+1)/2 \quad \text{[Equation 23]}$$

According to another embodiment, blocks may be searched in an order of left block→upper block→right block to obtain a predicted quantization parameter pred QP by using a quantization parameter of an available quantization group.

For example, a predicted quantization parameter pred QP may be obtained according to Equation 24 below.

$$\text{pred } QP=(\text{Avail\_1\_}QP+\text{Avail\_2\_}QP+1)/2 \quad \text{[Equation 24]}$$

When the number of available quantization groups is equal to or less than 1, a predicted quantization parameter pred QP may be obtained by using prev QP. In this case, an order in which blocks are searched may be one of orders of upper→left→right, left→upper→right, right→upper→left, left→right→upper, and right→left→upper.

According to another embodiment, a predicted quantization parameter pred QP may be obtained according to a weighted sum, based on reliabilities of left and upper blocks. For example, a predicted quantization parameter pred QP may be obtained according to Equation 25 below.

$$\text{pred } QP=(N*QP\_above+M*QP\_left+L*QP\_right+(N+M+L)/2)/(N+M+L) \quad \text{[Equation 25]}$$

(where N, M, and L are natural numbers)

In this case, N, M, and L may be determined according to reliabilities. For example, a predicted quantization parameter pred QP may be obtained according to Equation 26 below.

$$\text{pred } QP=(2*QP\_above+QP\_left+QP\_right+2)/4 \quad \text{[Equation 26]}$$

As an example of determining reliability, reliability may be determined based on similarity between an area of a current coding unit and that of a neighboring block.

As an example of determining reliability, reliability may be determined according to a neighboring block and a prediction mode (an intra mode or an inter mode) of a current coding unit.

As an example of determining reliability, when a current coding unit has been encoded (decoded) with a predefined encoding (decoding) tool and a neighboring block also has already been encoded (decoded) with the predefined encoding (decoding) tool, the neighboring block may be set to high reliability.

For example, when a current coding unit is encoded (decoded) according to a Skip mode, a Merge mode, an Affine mode, or a MMVD mode among inter modes, and there is a neighboring block encoded (decoded) according to the Skip mode, the Merge mode, the Affine mode, or the MMVD mode among neighboring blocks, the neighboring block may be set to high reliability or a QP of the neighboring block may be more preferentially used than those of other blocks. The Affine mode refers to a mode in which motion compensation based on an affine model is used for inter prediction. The MMVD mode refers to a mode of generating new motion vector candidates by indexing motion vectors of neighboring blocks and predefined Motion Vector Differences (MVDs), and then inducing motion information of a current coding unit based on the motion vector candidates.

Also, the image encoder 155 may generate a syntax element representing a difference quantization parameter, according to various embodiments. The various embodiments will be described below with reference to FIGS. 3A to 4C.

Hereinafter, a method of signaling a predefined area unit in which a difference quantization parameter of a coding unit is signaled will now be described.

The image encoder 155 may generate information about a predefined area unit included in a SPS unit, a PPS unit, a slice unit, a tile unit, or a tile group unit. In this case, the information about the predefined area unit may represent a predefined area value, a value (or a value resulting from applying log 2 to a predefined area value) resulting from expressing a predefined area value as a multiplier of 2, an index value of a table having an area value, or a difference from a specific value.

According to an embodiment, the information about the predefined area value delta_QP_area may be expressed as a multiplier of 2. For example, the information about the predefined area value delta_QP_area may correspond to 7. In this case, the predefined area may be 2^7=128, and a coding unit determined according to the predefined area unit to signal a difference quantization parameter may be 8×16, 16×8, etc. Also, the information about the predefined area value delta_QP_area correspond to 8. In this case, the predefined area may be 2^8=256, and a coding unit determined according to the predefined area unit to signal a difference quantization parameter may be 16×16, 8×32, 32×8, etc. Also, the information about the predefined area value delta_QP_area may correspond to 9. In this case, the predefined area may be 2^9=512, and a coding unit determined according to the predefined area unit to signal a difference quantization parameter may be 32×16, 16×32, 64×8, 8×64, etc. Also, the information about the predefined area value delta_QP_area may correspond to 10. In this case, the predefined area may be 2^10=1024, and a coding unit determined according to the predefined area unit to signal a difference quantization parameter may be 32×32, 16×64, 64×16, 128×8, 8×128, etc.

According to an embodiment, the information about the predefined area value delta_QP_area may correspond to an index value representing one of area values shown in Table 3 and Table 4.

TABLE 3

| Index | 0 | 1 | 2 | 3 | ... |
|---|---|---|---|---|---|
| Area Value | 128 | 256 | 512 | 1024 | ... |

TABLE 4

| Index | 0 | 1 | 2 | 3 | ... |
|---|---|---|---|---|---|
| Area Value | 256 | 512 | 1024 | 2048 | ... |

However, a correspondence relation between index values and area values are not limited to Table 3 and Table 4, and may be defined variously.

According to an embodiment, the information about the predefined area value delta_QP_area may represent a difference from a value related to a size of a minimum coding unit. For example, when the size of the minimum coding unit is 4×4, a value log 2_min_cu_area represented by the area may be log 2(16)=4, and, when the predefined area value is 256 (for example, when the size is 16×16), a value log 2_delta_qp_area represented by the area may be log 2(256)=8. Accordingly, the information about the predefined area value delta_QP_area may correspond to log 2_delta_qp_area−log 2_min_cu_area. For example, the information about the predefined area value delta_QP_area may correspond to 8−4=4.

According to an embodiment, the information about the predefined area value delta_QP_area may represent a difference from a value related to a minimum difference quantization parameter area Minimum delta QP area. The minimum difference quantization parameter area may indicate an area of a minimum block of signaling a difference quantization parameter. When the minimum difference quantization parameter area (size) is 16×16 (256), a value represented by the area may be log 2(256)=8, and, when the predefined area value is 256 (for example, when the size is 16×16), a value represented by the area may be log 2(256)=8. Accordingly, the information about the predefined area value delta_QP_area may correspond to log 2_delta_qp_area−log 2_min_delta_qp_area. For example, the information about the predefined area value delta_QP_area may indicate 8−8=0.

According to an embodiment, the information about the predefined area value delta_QP_area may represent a difference from a value related to a size of a largest coding unit (or coding tree unit). For example, when the size of the largest coding unit is 128×128, a value represented by the area may be log 2(16384)=14, and, when the predefined area value is 256 (for example, when the size is 16×16), a value represented by the area may be log 2(256)=8. Accordingly, the information about the predefined area value delta_QP_area may correspond to log 2_max_cu_area−log 2_delta_qp_area. For example, the information about the predefined area value delta_QP_area may correspond to 14−8=6.

According to an embodiment, the information about the predefined area value delta_QP_area may represent a difference from a value related to a maximum difference quantization parameter area Maximum delta QP area. In this case, the maximum difference quantization parameter area may indicate an area of a largest block of signaling a difference quantization parameter. For example, when the maximum difference quantization parameter area (size) is 64×64 (4096), a value represented by the area may be 12 log 2(4096)=12, and, when the predefined area value is 256 (for example, when the size is 16×16), a value represented by the area may be log 2(256)=8. Accordingly, the information about the predefined area value delta_QP_area may correspond to log 2_max_delta_qp_area−log 2_delta_qp_area. For example, the information about the predefined area value delta_QP_area may correspond to 12−8=4.

Hereinafter, a method of signaling a difference quantization parameter in a frame level will now be described.

Hereinafter, when a difference quantization parameter delta QP is signaled, a QP may be used in a specific frame, without changes of QPs for each coding unit. In this case, the following processing may be performed in each frame level.

The image encoder 155 may perform binary arithmetic encoding based on a context model on a first bin of bins representing information about a difference quantization parameter delta QP of a frame level, thereby obtaining a binary arithmetically encoded bin. At this time, the first bin may represent whether or not the difference quantization parameter delta QP is 0.

When a quantization parameter of a current frame, which is the same as that of a previous frame, is obtained, the image encoder 155 may perform binary arithmetic encoding based on a context model on a first bin representing that a difference quantization parameter is 0 to obtain a binary arithmetically encoded bin. When a difference quantization parameter exists, the image encoder 155 may perform binary arithmetic encoding based on a context model on a first bin representing that a difference quantization parameter is not 0 to obtain a binary arithmetically encoded bin. At this time, the image encoder 155 may perform binary arithmetic encoding based on a context model on a syntax element representing a value of the difference quantization parameter which is not 0.

The image encoder 155 may update or maintain probability information for information (in which a first bin represents whether or not a difference quantization parameter is 0 and the remaining bins represents a value of the difference quantization parameter) about a difference quantization parameter delta QP in a frame level, and generate a value of default_zero_dqp_signal in the frame level based on the probability information. For example, when the value of default_zero_dqp_signal is 1, the image encoder 155 may update probability that a bit included in information about the difference quantization parameter delta QP will be 0 to a value that is close to 1. When the value of default_zero_dqp_signal is 0, the same probability as that for the previous frame may be used. At this time, two probability tables may be used. That is, a probability table of when the value of default_zero_dqp_signal is 1 and a probability table of when the value of the default_zero_dqp_signal is 0 may be distinguished and used.

Meanwhile, a transformation operation may be omitted in some cases, and in these cases, a quantized coefficient may be a coefficient on a spatial domain. The image encoder 155 may generate information of a residue block of a current coding unit, including at least one quantized coefficient (that is, a coefficient on the spatial domain), without performing a transformation operation.

The bitstream generator 170 may generate a bitstream including a syntax element representing the difference quantization parameter for the current coding unit and the residual information of the current coding unit.

FIG. 2B is a flowchart showing an image encoding method according to various embodiments.

In operation S155, an image encoding apparatus 150 may obtain at least one coding unit including a current coding unit by hierarchically splitting a current image based on a split shape mode of the current image.

In operation S160, the image encoding apparatus 150 may obtain at least one coefficient included in the current coding unit.

In operation S165, the image encoding apparatus 150 may obtain at least one transform coefficient by performing transformation on the at least one coefficient included in the current coding unit.

In operation S170, the image encoding apparatus 150 may obtain at least one quantized transform coefficient and a quantization parameter for the current coding unit by performing quantization on the at least one transform coefficient.

In operation S175, the image encoding apparatus 150 may obtain a difference quantization parameter for the current coding unit, based on a predicted quantization parameter and the quantization parameter for the current coding unit.

In operation S180, the image encoding apparatus 150 may generate a syntax element representing the difference quantization parameter for the current coding unit, based on an area of a predefined difference quantization parameter signaling unit. A syntax element may refer to information about an image quantization parameter or coefficients included in an image, which is included in a bitstream. That is, a syntax element may indicate an element of data that is represented in a bitstream.

When an area of the current coding unit is larger than or equal to that of the predefined difference quantization parameter signaling unit, and a size of the current coding unit is larger than a maximum size of a transform unit, the image encoding apparatus 150 may generate a syntax element representing a difference quantization parameter that is to be included in information about a transform unit first encoded from among a plurality of transform units split from the current coding unit. When the area of the current coding unit is smaller than the area of the predefined difference quantization parameter signaling unit, the image encoding apparatus 150 may generate a syntax element representing a difference quantization parameter that is to be included in information about a first transform unit of a first coding unit of a plurality of coding units included in a predefined coding unit including the current coding unit. When the area of the current coding unit is larger than or equal to the area of the predefined difference quantization parameter signaling unit, and the size of the current coding unit is smaller than or equal to the maximum size of the transform unit, the image encoding apparatus 150 may generate the syntax element representing the difference quantization parameter for the current coding unit, based on whether at least one transform coefficient which is not 0 is included in a transform unit having the same size as the current coding unit.

In operation S185, the image encoding apparatus 150 may generate residual information of the current coding unit, the residual information including information about the at least one quantized transform coefficient.

In operation S190, the image encoding apparatus 150 may generate a bitstream including the residual information of the current coding unit and the syntax element.

Figure 2C:
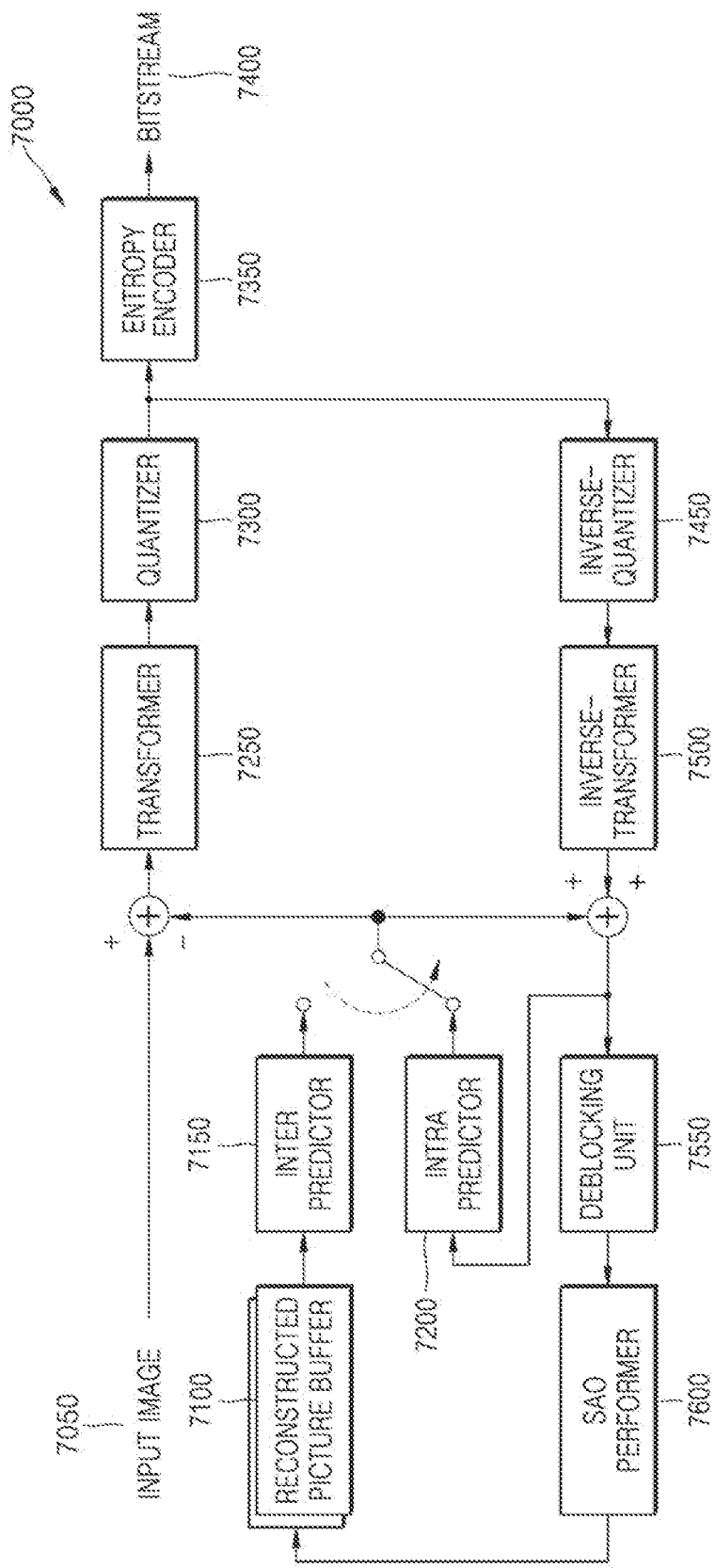
FIG. 2C is a block diagram of an image encoder according to various embodiments.

FIG. 2C is a block diagram of an image encoder according to various embodiments.

An image encoder 7000 according to various embodiments may perform tasks that are performed by the image encoder 155 and the bitstream generator 170 of the image encoding apparatus 150 so as to encode image data.

That is, an intra predictor 7200 may perform intra prediction on each block of a current input image 7050, and an inter predictor 7150 may perform inter prediction on each block by using the current input image 7050 and a reference image obtained from a reconstructed picture buffer 7100.

By subtracting prediction data for each block output from the intra predictor 7200 or the inter predictor 7150 from data for an encoded block of the current image 7050, residual data may be generated, and a transformer 7250 and a quantizer 7300 may perform transformation and quantization on the residual data and output a quantized transform coefficient for each block. An inverse-quantizer 7450 and an inverse-transformer 7500 may perform inverse-quantization and inverse-transformation on the quantized transform coefficient to restore residual data of a spatial domain. The reconstructed residue data of the spatial domain may be added to the prediction data for each block output from the intra predictor 7200 or the inter predictor 7150, thereby being reconstructed as spatial-domain data for each block of the current image 7050. A deblocking unit 7550 and a SAO performer 7600 may perform in-roof filtering on the reconstructed, spatial-domain data to generate a filtered, reconstructed image. The generated, reconstructed image may be stored in a reconstructed picture buffer 7100. Reconstructed images stored in the reconstructed picture buffer 7100 may be used as reference images for inter prediction of other images. An entropy encoder 7350 may perform entropy encoding on the quantized transform coefficient, and the entropy-encoded coefficient may be output to a bitstream 7400.

In order for the image encoder 7000 according to various embodiments to be applied to the image encoding apparatus 100, phased tasks of the image encoder 7000 according to various embodiments may be performed for each block. For example, a task of the quantizer 7300 may correspond to a task of the quantizer 115. FIG. 3A shows a syntax structure of a split unit for signaling a difference quantization parameter, according to an embodiment. Herein, the syntax structure may refer to one or more syntax elements that are represented together in a bitstream according to a predefined order. Herein, the split unit refers to a coding unit being split, and after a split flag representing whether or not to split is obtained from the split unit, whether or not to continue to split may be determined. At this time, the split unit may be recursively (hierarchically) split based on split information such as a split flag, etc.

Referring to FIG. 3A, the image decoding apparatus 100 may obtain a syntax element cu_qp_delta for a difference quantization parameter from a syntax structure 200 of a split unit level. After the image decoding apparatus 100 obtains a split flag btt_split_flag from a bitstream, the image decoding apparatus 100 may obtain the syntax element cu_qp_delta from the bitstream. At this time, the image decoding apparatus 100 may obtain the syntax element cu_qp_delta for each specific area unit cuQpDeltaArea. Here, information about the specific area unit cuQpDeltaArea may be obtained in unit of a SPS, a PPS, a slice, a tile, or a tile group. The information about the specific area unit cuQpDeltaArea may represent an area value, a value resulting from expressing an area value as a multiplier of 2, or an index value of a table having a corresponding relation between various area values and indices. Alternatively, the specific area may be determined to be a value predetermined between the image decoding apparatus 100 and the image encoding apparatus 150. When a block extends over a picture boundary, an area for obtaining a syntax element cu_qp_delta may be an area of the block, the area including an outside region of the picture. However, the area for obtaining the syntax element cu_qp_delta may be limited to only an inside region of the picture. In the case in which the image decoding apparatus 100 obtains a split flag btt_split_flag for a current coding unit (x0, y0) and the split flag btt_split_flag represents that the current coding unit (x0, y0) is no longer split (btt_split_flag[x0][y0]==0), the image decoding apparatus 100 may obtain a syntax element cu_qp_delta from a bitstream when an area log 2CbWidth+log 2CbHeight of the current coding unit (x0, y0) is larger than or equal to a specific area cuQpDeltaArea for signaling a difference quantization parameter.

When the image decoding apparatus 100 obtains a split flag btt_split_flag for a current coding unit (x0, y0) and the split flag btt_split_flag represents that the current coding unit (x0, y0) is to be split (else if), the image decoding apparatus 100 may obtain a syntax element cu_qp_delta from a bitstream when the area log 2CbWidth+log 2CbHeight of the current coding unit (x0, y0) is two times (+1) the specific area cuQpDeltaArea for signaling the difference quantization parameter and a split type of the current coding unit (x0, y0) is a ternary split type (btt_split_type[x0][y0]==1), or when the area log 2CbWidth+log 2CbHeight of the current coding unit (x0, y0) is equal to the specific area cuQpDeltaArea for signaling the difference quantization parameter.

FIGS. 3B and 3C show syntax structures of a transform unit and a split unit for signaling a difference quantization parameter, according to an embodiment.

Referring to FIGS. 3B and 3C, the image decoding apparatus 100 may determine a value of cuQpDeltaCode according to a predefined condition in a syntax structure 210 of a split unit level. The image decoding apparatus 100 may obtain CBF from a syntax structure 220 of a transform unit level, identify a value of cuQpDeltaCode (and a value of CBF), and obtain a syntax element cu_qp_delta from a bitstream according to a condition based on the identified value of cuQpDeltaCode.

Referring to FIG. 3B, in the case in which a value of cu_qp_delta_enabled_flag is 1 and a value of sps_quant_flag is 1 (cu_qp_delta_enabled_flag && sps_dquant_flag), the case in which a split flag btt_split_flag indicates that a current coding unit (x0, y0) is no longer split, and the case in which an area log 2CbWidth+log 2CbHeight of the current coding unit (x0, y0) is larger than or equal to a specific area cuQpDeltaArea for signaling a difference quantization parameter, the image decoding apparatus 100 may determine a value of cuQpdeltaCode as 1. Herein, cu_qp_delta_enabled_flag may be a flag representing whether to enable signaling of a difference quantization parameter of a coding unit level, and sps_dquant_flag may be a flag representing whether to perform signaling of the difference quantization parameter according to a predefined difference quantization parameter signaling scheme obtained in a SPS level. Herein, the predefined difference quantization parameter signaling scheme refers to a scheme for signaling a difference quantization parameter regardless of a CBF value of a transform unit in some cases.

In the case in which the split flag represents that the current coding unit (x0, y0) is split (else if), the case in which the area log 2CbWidth+log 2CbHeight of the current coding unit (x0, y0) is two times (+1) the specific area cuQpDeltaArea for signaling the difference quantization parameter and the split type of the current coding unit (x0, y0) is a ternary split type (btt_split_type[x0][y0]==1), or the case in which the area log 2CbWidth+log 2CbHeight of the current coding unit (x0, y0) is equal to the specific area cuQpDeltaArea for signaling the difference quantization parameter, the image decoding apparatus 100 may determine a value of cuQpdeltaCode as 2.

Referring to FIG. 3C, in the case in which the value of cuQPDeltaCode is 1, the image decoding apparatus 100 may obtain a syntax element cu_qp_delta from the bitstream when one value of CBF (Y, U, V) cbf_luma, cbf_cb, and cbf_cr for a current transform unit is 1. The image decoding apparatus 100 may not obtain the syntax element cu_qp_delta from the bitstream when all values of CBF (Y, U, V) cbf_luma, cbf_cb, and cbf_cr are 0.

When the value of cuQPDeltaCode is 2, the image decoding apparatus 100 may obtain CBF of a transform unit having the same size as a first coding unit of a plurality of coding units split from the current coding unit, and then obtain a syntax element cu_qp_delta from the bitstream, regardless of values of CBF cbf_luma, cbf_cb, and cbf_cr of the current transform unit. At this time, after the syntax element cu_qp_delta is obtained from the first coding unit, the image decoding apparatus 100 may determine the value of cuQpdeltaCode as 0, and accordingly, the image decoding apparatus 100 may not obtain the syntax element cu_qp_delta from the bitstream with respect to the remaining coding unit except for the first coding unit of the plurality of coding units split from the current coding unit. In this case, a difference quantization parameter of the remaining coding unit may be the first obtained syntax element cu_qp_delta.

However, the disclosure is not limited thereto, and in the case in which the value of cuQPDeltaCode is 2, the image decoding apparatus 100 may obtain a syntax element cu_qp_delta from the bitstream when at least one value of CBF cbf_luma, cbf_cb, and cbf_cr for the current coding unit is 1. For example, when all values of CBF cbf_luma, cbf_cb, and cbf_cr of the first coding unit of the plurality of coding units split from the current coding unit are 0, the image decoding apparatus 100 may obtain a syntax element cu_qp_delta from a second coding unit. Because the values of CBF of the first coding unit are 0, the first coding unit does not require a quantization parameter, and therefore, when at least one of CBF values of the coding units is 1, a syntax element cu_qp_delta may be obtained from the corresponding coding unit.

FIGS. 4A to 4C show syntax structures of a split unit, a coding unit, and a transform unit for signaling a difference quantization parameter, according to an embodiment.

Referring to FIGS. 4A to 4C, the image decoding apparatus 100 may determine a value of cuQpDeltaCode according to a predefined condition in a syntax structure 230 of a split unit level. The image decoding apparatus 100 may obtain a transform unit (At this time, syntax elements included in a transform unit syntax structure are obtained) having the same size as that of a coding unit according to a maximum size of a transform unit in a coding unit syntax structure 240, or a plurality of transform units from the coding unit, then obtain CBF cbf_luma, cbf_cb, and cbf_cr from a transform unit syntax structure 250, identify a value of cuQpDeltaCode (and a value of CBF), and obtain a syntax element cu_qp_delta from a bitstream according to a condition based on the identified value of cuQpDeltaCode.

Referring to FIG. 4A, in the case in which a value of cu_qp_delta_enabled_flag is 1 and a value of sps_dquant_flag is 1 in the syntax structure 230 of the split unit level (cu_qp_delta_enabled_flag && sps_dquant_flag), the case in which a value of a split flag btt_split_flag of a current coding unit (x0, y0) represents that the current coding unit (x0, y0) is no longer split (btt_split_flag[x0][y0]==0) and a value of cuQpDeltaCode is not 2, the case in which an area log 2CbWidth+log 2CbHeight of the current coding unit (x0, y0) is larger than or equal to an area cuQPDeltaArea of a predefined difference quantization parameter signaling unit (log 2CbWidth+log 2CbHeight>=cuQpDeltaArea), and the case in which a width log 2CbWidth or a height log 2CbHeight of the current coding unit (x0, y0) is larger than 6 that is a maximum size of a transform unit (log 2CbWidth>6 II log 2CbHeight>6), the image decoding apparatus 100 may set a value of cuQpdeltaCode of the current coding unit (x0, y0) to 2.

In the syntax structure 230 of the split unit level, in the case in which a value of cu_qp_delta_enabled_flag is 1 and a value of sps_dquant_flag is 1 (cu_qp_delta_enabled_flag && sps_dquant_flag), the case in which a value of a split flag btt_split_flag of the current coding unit (x0, y0) represents that the current coding unit (x0, y0) is no longer split (btt_split_flag[x0][y0]==0) and a value of cuQpDeltaCode is not 2, the case in which the area log 2CbWidth+log 2CbHeight of the current coding unit (x0, y0) is larger than or equal to the area cuQPDeltaArea of the predefined difference quantization parameter signaling unit (log 2CbWidth+log 2CbHeight>=cuQpDeltaArea), and the case in which the width log 2CbWidth and height log 2CbHeight of the current coding unit (x0, y0) are smaller than 6 that is the maximum size of the transform unit (else), The image decoding apparatus 100 may set a value of cuQPDeltaCode to 1. Here, the reason for identifying whether the value of cuQpDeltaCode is not 2 is to determines whether there is a coding unit having the same area as that of the predefined difference quantization parameter signaling unit among coding units split and obtained according to the ternary split type from a coding unit corresponding to two times of the predefined difference quantization parameter signaling unit, and the value of cuQPDeltaCode may be again set to 1 when a value of cuQPDeltaCode for the coding unit is 2 is not identified.

When the value of cuQPDeltaCode is 1, information about a difference quantization parameter may be signaled only when a value of a coding block flag of a transform unit is 1, and in the case in which the value of cuQPDeltaCode is 2, information about a difference quantization parameter may be signaled through information related to a first-decoded transform unit included in coding units of the difference quantization parameter signaling unit, regardless of a value of a coding block flag of the transform unit.

The image decoding apparatus 100 may set a value of isCuQPDeltaCoded to 0. Only when the value of isCuQPDeltaCoded is 0, a difference quantization parameter may be obtained from information about the corresponding transform unit. By setting a value of the difference quantization parameter to 1 after the difference quantization parameter is obtained, a difference quantization parameter for the difference quantization parameter signaling unit may be once obtained, and a difference quantization parameter may be no longer obtained from information about a subsequent transform unit.

In the syntax structure 230 of the split unit level, in the case in which a value of cu_qp_delta_enabled_flag is 1 and a value of sps_dquant_flag is 1 (cu_qp_delta_enabled_flag && sps_dquant_flag), the case in which a value of the split flag btt_split_flag of the current coding unit (x0, y0) represents that the current coding unit (x0, y0) is to be split (else if) and the area log 2CbWidth+log 2CbHeight of the current coding unit (x0, y0) is two times (+1) the area cuQpDeltaArea of the predefined difference quantization parameter signaling unit, the case in which the split type of the current coding unit (x0, y0) is the ternary split type (btt_split_type[x0][y0]==1), or the case in which the area log 2CbWidth+log 2CbHeight of the current coding unit (x0, y0) is equal to the area cuQpDeltaArea of the predefined difference quantization parameter signaling unit and a value of cuQpdeltaCode is not 2, the image decoding apparatus 100 may set a value of cuQpdeltaCode to 2. Meanwhile, the image decoding apparatus 100 may set a value of isCuQPDeltaCoded to 0.

When the value of the split flag btt_split_flag of the current coding unit (x0, y0) is 1, the image decoding apparatus 100 may obtain coding units of a lower depth included in the current coding unit (x0, y0) according to a split shape mode SplitMode[x0][y0] determined according to a split type and a split direction. At this time, syntax elements of the coding unit syntax structure 240 of the coding unit level related to the coding units of the lower depth may be obtained. That is, syntax elements of the syntax structure 230 of the split unit level may be recursively obtained.

For example, in the case in which the value of the split flag btt_split_flag of the current coding unit (x0, y0) is 1, the image decoding apparatus 100 may obtain syntax elements of the syntax structure 230 of the split unit level for three coding units [x0,y0], [x0,y1], and [x0,y2] of a lower depth included in the current coding unit (x0, y0) when a split shape mode SplitMode[x0][y0] determined according to a split type and a split direction is a mode according to horizontal ternary split (SplitMode[x0][y0]==SPLIT_TT_HOR). At this time, a value of cuQpDeltaCode set in the current coding unit (x0, y0) may be transferred to the syntax structure 230 of the split unit level.

When the value of the split flag btt_split_flag of the current coding unit (x0, y0) is 0 (else), the image decoding apparatus 100 may obtain syntax elements of the syntax structure 240 of the coding unit level of the current coding unit (x0, y0) that is no longer split.

Referring to FIG. 4B, the image decoding apparatus 100 may obtain, from a bitstream, a flag cbf_all representing whether a current coding unit includes a transform coefficient of at least one component which is not 0, and, when the current coding unit includes the transform coefficient of the at least one component which is not 0 (if(cbf_all)), the image decoding apparatus 100 may set a value of isSplit representing whether the current coding unit is to be split into a plurality of sub blocks (transform units) according to 6 that is a maximum size of a transform unit. That is, when the width log 2CbWidth of the current coding unit is larger than 6 that is the maximum size of the transform unit, or when the height log 2CbHeight of the current coding unit is larger than 6 that is the maximum size of the transform unit, the image decoding apparatus 100 may set a value of isSplit to 1, and otherwise, the image decoding apparatus 100 may set the value of isSplit to 0.

The image decoding apparatus 100 may determine a size log 2TbWidth and log 2TbHeight of a transform unit based on 6 that is the maximum size of the transform unit and the size log 2CbWidth and log 2CbHeight of the current coding unit. For example, when the width log 2CbWidth of the current coding unit is larger than 6 that is the maximum size of the transform unit, the image decoding apparatus 100 may determine the width of the transform unit to be 6 that is the maximum size of the transform unit, and otherwise, the image decoding apparatus 100 may determine the width of the transform unit to be the width of the current coding unit. Likewise, the image decoding apparatus 100 may determine a height of the transform unit.

The image decoding apparatus 100 may obtain a transform unit based on reference coordinates (x0, y0) and the size log 2TbWidth and log 2TbHeight of the transform unit. That is, the image decoding apparatus 100 may obtain syntax elements of a syntax structure 250 of a transform unit level. At this time, the value of cuQpDeltaCode of the current coding unit may be transferred.

The image decoding apparatus 100 may additionally obtain a transform unit based on a condition according to the size log 2CbWidth and log 2CbHeight of the current coding unit and 6 that is the maximum size of the transform unit. That is, when the width or size of the current coding unit is larger than 6 that is the maximum size of the transform unit, the image decoding apparatus 100 may obtain additional transform units included in the current coding unit. At this time, the value of cuQpDeltaCode of the current coding unit may be transferred.

Referring to FIG. 4C, the image decoding apparatus 100 may obtain CBF cbf_luma, cbf_cb_, and cbf_cr for each component of a transform unit in the syntax structure 250 of the transform unit level. In the case in which a value of cu_qp_delta_enabled is 1 and the case in which a value of sps_dquant_flag is 0 (!sps_dquant_flag), or the case in which a value of cuQpDeltaCode is 1 and a value of isdeltaCoded is 0, the image decoding apparatus 100 may obtain syntax element information for cu_qp_delta from a bitstream when at least one of values of CBF cbf_luma, cbf_cb_, and cbf_cr for each component is 1 (cbf_luma||cbf_cb||cbf_cr).

In the case in which a value of cu_qp_delta_enabled is 1, the case in which a value of cuQpDeltaCode is 2, and a value of isdeltaCoded is 0, the image decoding apparatus 100 may obtain syntax element information for cu_qp_delta from a bitstream. At this time, the image decoding apparatus 100 may obtain the syntax element information for cu_qp_delta from the bitstream, regardless of values of CBF cbf_luma, cbf_cb_, and cbf_cr for each component.

According to the syntax structures shown in FIGS. 4A to 4C, the image decoding apparatus 100 may obtain syntax element information for a difference quantization parameter in a level of a coding unit, and, at this time, the image decoding apparatus 100 may obtain the syntax element information for the difference quantization parameter based on a size of a predefined difference quantization parameter signaling unit. For example, in the case in which a size of a current coding unit that is no longer split is larger than that of the predefined difference quantization parameter signaling unit, the image decoding apparatus 100 may obtain syntax element information for cu_qp_delta in a syntax structure 250 of a first transform unit when the current coding unit is split into a plurality of sub blocks (transform units) including a coefficient. At this time, the image decoding apparatus 100 may obtain syntax element information for cu_qp_delta regardless of a value of CBF of the corresponding transform unit. The image decoding apparatus 100 may not obtain the syntax element information for cu_qp_delta with respect to the remaining transform unit except for the first transform unit of the plurality of transform units, and in this case, a difference quantization parameter for the remaining transform unit may be obtained based on cu_qp_delta obtained in the first transform unit.

With respect to a coding unit having a smaller size than that of the predefined difference quantization parameter signaling unit, when a size of a predefined coding unit including the corresponding coding unit is equal to a size of the predefined difference quantization parameter signaling unit, or a size of at least one of the plurality of sub blocks (a plurality of coding units including the current coding unit) generated by splitting is smaller than a size of the corresponding coding unit (splitting according to the ternary split type) while the size of the predefined coding unit is two times that of the predefined difference quantization parameter signaling unit, the image decoding apparatus 100 may obtain syntax element information for cu_qp_delta from a bitstream in a syntax structure 250 of a transform unit level of a first transform unit of a first coding unit among the plurality of sub blocks. At this time, the image decoding apparatus 100 may obtain the syntax element information for cu_qp_delta regardless of a value of CBF of the corresponding transform unit. The image decoding apparatus 100 may not obtain the syntax element information for cu_qp_delta with respect to the remaining transform unit except for the first transform unit of the first coding unit among the plurality of coding units and the remaining coding unit except for the first coding unit, and in this case, a difference quantization parameter for the remaining coding unit may be obtained based on cu_qp_delta obtained in the first transform unit of the first coding unit.

In the above description given with reference to FIGS. 4A and 4B, it is assumed that the maximum size of the transform unit is 64 (a value resulting from applying log 2 to 64 is 6). However, it will be understood by one of ordinary skill in the art that the maximum size of the transform unit may be one of multipliers of 2.

Figure 4D:
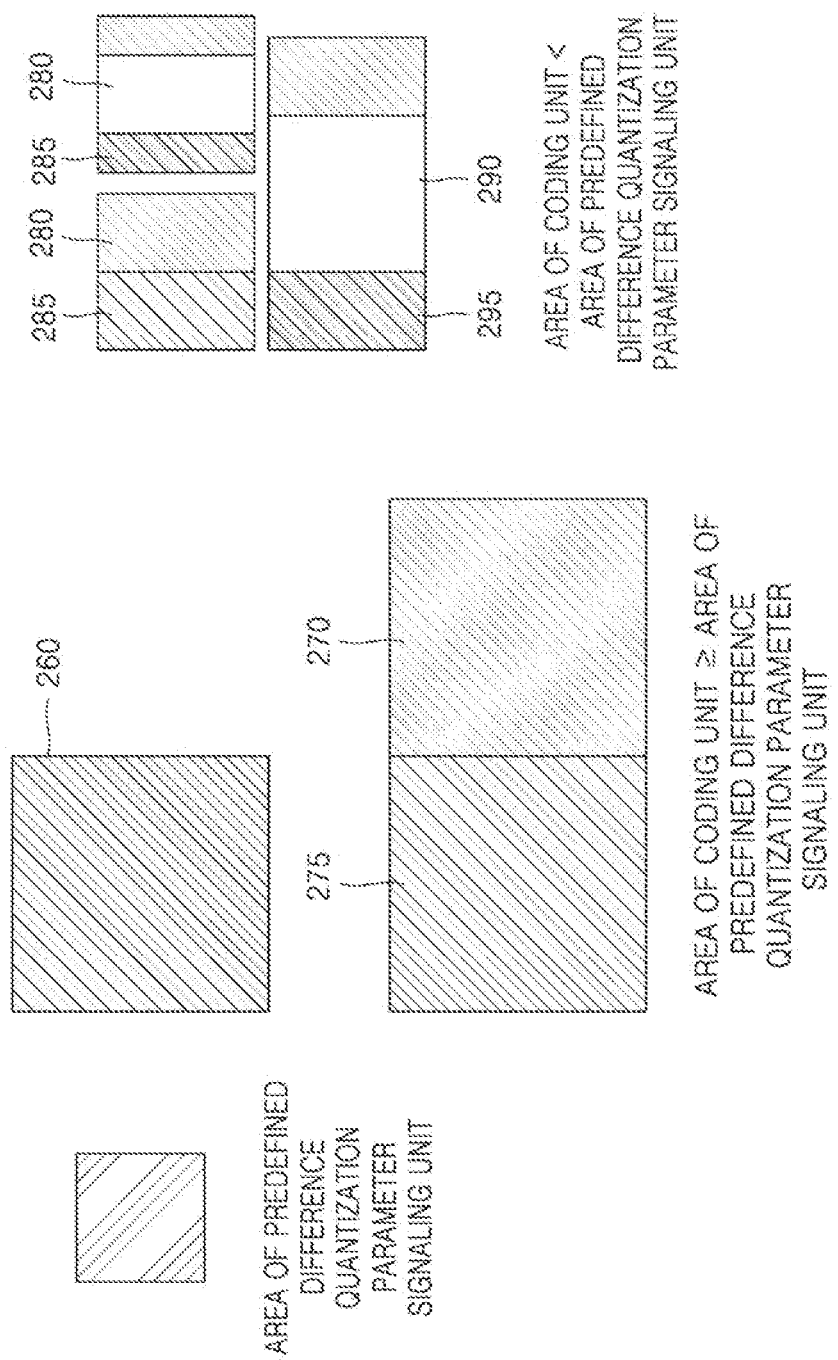
FIG. 4D is a diagram for describing a method for signaling a difference quantization parameter, according to the syntax structures of the split unit, the coding unit, and the transform unit for signaling the difference quantization parameter as shown in FIGS. 4A to 4C.

FIG. 4D is a diagram for describing a method for signaling a difference quantization parameter, according to the syntax structures of the split unit, the coding unit, and the transform unit for signaling the difference quantization parameter as shown in FIGS. 4A to 4C.

Referring to FIG. 4D, the image decoding apparatus 100 may signal a difference quantization parameter for a coding unit, based on an area of a predefined difference quantization parameter signaling unit.

For example, when an area of a coding unit 260 that is not split is larger than or equal to that of an area of the predefined difference quantization parameter signaling unit, the image decoding apparatus 100 may obtain a syntax element for a difference quantization parameter of the coding unit 260 from information about a transform unit having the same size as that of the coding unit 260, when a size of the coding unit 260 is smaller than or equal to a maximum size of a transform unit. At this time, the image decoding apparatus 100 may obtain a coding block flag from the information about the transform unit, and only when a value of the coding block flag indicates 1, the image decoding apparatus 100 may obtain a syntax element for a difference quantization parameter, and, when a value of the coding block flag indicates 0, the image decoding apparatus 100 may not obtain the syntax element for a difference quantization parameter.

When an area of a coding unit 270 that is not split is larger than or equal to that of the predefined difference quantization parameter signaling unit, the image decoding apparatus 100 may split the coding unit 270 to obtain transform units including a transform unit 275 having the maximum size of the transform unit and obtain a syntax element for a difference quantization parameter for the coding unit 270 from information about the transform unit 275 first decoded from among the transform units 275, when a size of the coding unit 270 is larger than the maximum size of the transform unit.

In addition, when an area of a coding unit 285 of a lower depth split according to various split types (for example, a ternary split type or a binary split type) from a coding unit 280 of an upper depth is smaller than an area of the predefined difference quantization parameter signaling unit, the image decoding apparatus 100 may obtain a syntax element for a difference quantization parameter for the coding unit 280 from information about a transform unit first decoded from among transform units of the coding unit 285 first decoded from among two or three coding units included in the coding unit 280, when the area of the coding unit 280 is equal to the area of the predefined difference quantization parameter signaling unit. At this time, the image decoding apparatus 100 may obtain a syntax element for a difference quantization parameter for the coding unit 280, regardless of a value of a coding block flag of the corresponding transform unit. At this time, the coding unit 285 may be additionally split into coding units of a lower depth, or may be no longer split. A transform unit may be obtained from a coding unit that is no longer split. In this case, the transform unit may have the same size as the coding unit that is no longer split, but the disclosure is not limited thereto.

In the case in which an area of a coding unit 295 of a lower depth having a small size among coding units of a lower depth split according to the ternary split type from a coding unit 290 of an upper depth is smaller than that of the predefined difference quantization parameter signaling unit, the image decoding apparatus 100 may obtain a syntax element for a difference quantization parameter for the coding unit 290 from information about a transform unit first decoded from among transform units included in the coding unit 295 first decoded from among three coding units included in the coding unit 290, when an area of the coding unit 290 is two times that of the predefined difference quantization parameter signaling unit. At this time, the image decoding apparatus 100 may obtain a syntax element for a difference quantization parameter for the coding unit 290, regardless of a value of a coding block flag of the corresponding transform unit.

The coding unit 295 may be additionally split into coding units of a lower depth, or may be no longer split. A transform unit may be obtained from a coding unit that is no longer split. In this case, the transform unit may have the same size as the coding unit that is no longer split, although not limited thereto.

The above description has been given with reference to FIG. 4D, under an assumption of a case in which decoding is performed without enabling of the SUCO scheme. However, it will be understood by one of ordinary skill in the art that, when the SUCO scheme is enabled, a first decoded coding unit may be located to the right side in a coding unit of an upper depth, unlike FIG. 4D.

Figure 5:
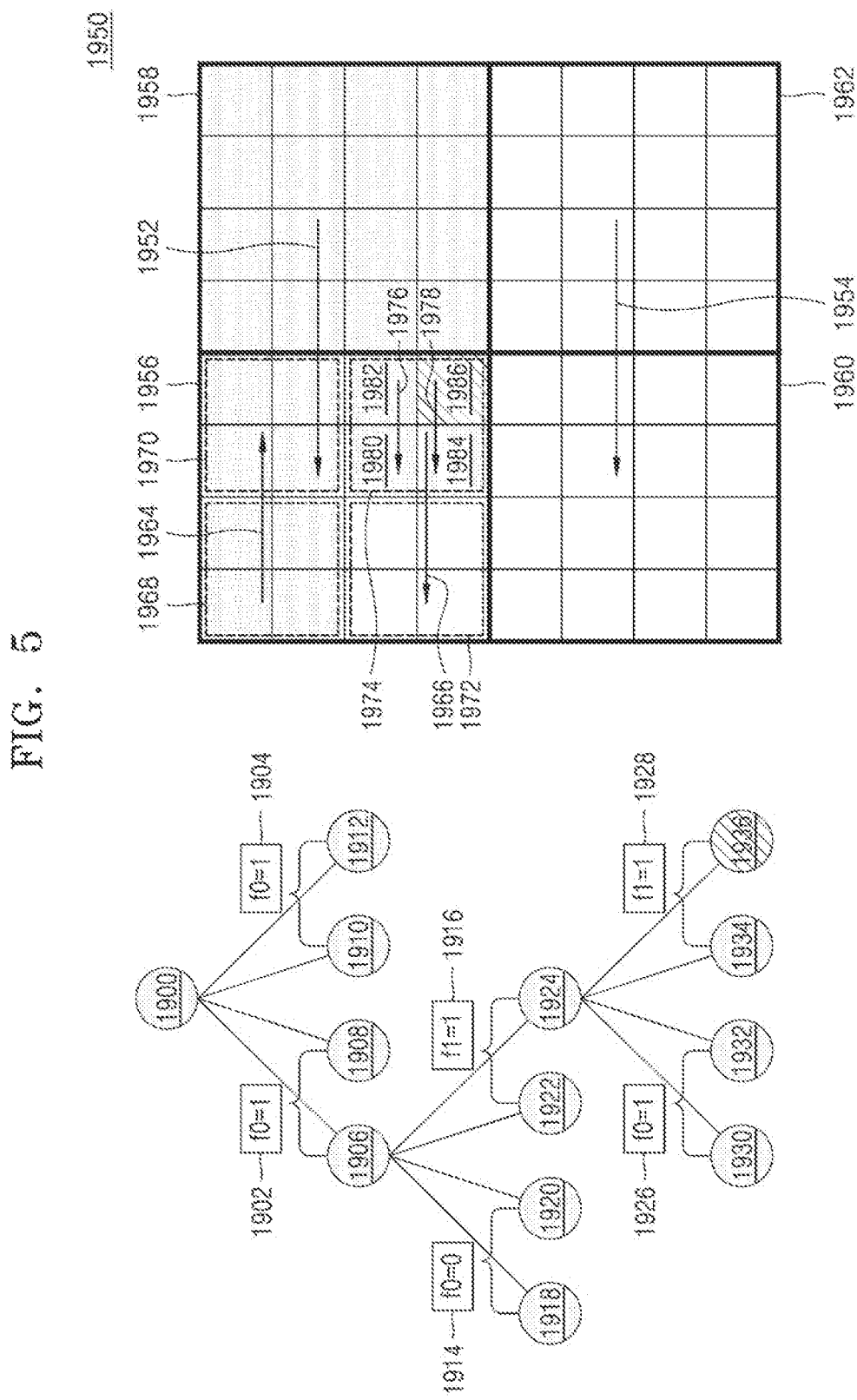
FIG. 5 is a diagram for describing a Split Unit Coding Unit (SUCO) scheme for determining an encoding (decoding) order between coding units to be a forward direction or a backward direction based on an encoding order flag, and describing that a right neighboring block is available according to the encoding (decoding) order based on the SUCO scheme.

FIG. 5 is a diagram for describing a SUCO scheme for determining an encoding (decoding) order between coding units to be a forward direction or a backward direction based on an encoding order flag and describing that a right neighboring block is available according to the encoding (decoding) order based on the SUCO scheme, according to an embodiment of the disclosure.

Referring to FIG. 5, a largest coding unit 1950 may be split into a plurality of coding units 1956, 1958, 1960, 1962, 1968, 1970, 1972, 1974, 1980, 1982, 1984, and 1986 having various sizes. The largest coding unit 1950 may correspond to an uppermost node 1900 having a tree structure. Also, the plurality of coding units 1956, 1958, 1960, 1962, 1968, 1970, 1972, 1974, 1980, 1982, 1984, and 1986 may respectively correspond to a plurality of nodes 1906, 1908, 1910, 1912, 1918, 1920, 1922, 1924, 1930, 1932, 1934, and 1936. Upper encoding order flags 1902, 1914 and 1926 representing encoding orders in the tree structure may correspond to arrows 1952, 1964, and 1976, and upper encoding order flags 1904, 1916, and 1928 may correspond to arrows 1954, 1966, and 1978.

Upper encoding order flags may represent encoding orders of two coding units located at an upper position among four coding units having the same depth. When an upper encoding order flag indicates 0, encoding may be performed in the forward direction. In contrast, when an upper encoding order flag indicates 1, encoding may be performed in the backward direction.

Likewise, lower encoding order flags may represent encoding orders of two coding units located at a lower position among four coding units having the same depth. When a lower encoding order flag indicates 0, encoding may be performed in the forward direction. In contrast, when a lower encoding order flag indicate 1, encoding may be performed in the backward direction.

For example, because the upper encoding order flag 1914 is 0, an encoding order between the coding units 1968 and 1970 may be determined to be the forward direction from left to right. Also, because the lower encoding order flag 1916 is 1, an encoding order between the coding units 1972 and 1974 may be determined to be the backward direction from right to left.

According to some embodiments, an upper encoding order flag and a lower encoding order flag may be set to have the same value. For example, when the upper encoding order flag 1902 is determined as 1, the lower encoding order flag 1904 corresponding to the upper encoding order flag 1902 may also be determined as 1. Because values of an upper encoding order flag and a lower encoding order flag are determined with 1 bit, an information amount of encoding order information may be reduced.

According to some embodiments of the disclosure, an upper encoding order flag and a lower encoding order flag of a current coding unit may be determined by referring to at least one of an upper encoding order flag or a lower encoding order flag applied to a coding unit having a lower depth than the current coding unit. For example, the upper encoding order flag 1926 and the lower encoding order flag 1928 applied to the coding units 1980, 1982, 1984, and 1986 may be determined based on the lower encoding order flag 1916 applied to the coding units 1971 and 1974. Accordingly, the upper encoding order flag 1926 and the lower encoding order flag 1928 may be determined to be the same value as that of the encoding order flag 1916. Because values of an upper encoding order flag and a lower encoding order flag are determined from an upper coding unit of a current coding unit, no encoding order information may be obtained from a bitstream. Accordingly, an information amount of encoding order information may be reduced.

At this time, because data of samples included in a neighboring coding unit 1958 decoded earlier than the current coding unit 1986 and located to the right of the current coding unit 1986 is available, the image decoding apparatus 100 may obtain a prediction parameter of the current coding unit 1986 according to an embodiment of the disclosure by using data (preferably, a quantization parameter) of the neighboring coding unit 1958 located to the right of the current coding unit 1986.

The image decoding apparatus 100 and the image encoding apparatus 150 according to various embodiments, described above with reference to FIGS. 1 to 5, may explicitly signal information about a difference quantization parameter for a current coding unit through a bitstream efficiently according to a size of a coding unit.

FIG. 2B is a flowchart showing an image encoding method according to various embodiments.

Referring back to FIG. 2B, in operation S115, an image encoding apparatus 150 may obtain at least one coding unit including a current coding unit by hierarchically splitting a current image based on a split shape mode of the current image.

In operation S160, the image encoding apparatus 150 may obtain at least one coefficient included in the current coding unit.

In operation S165, the image encoding apparatus 150 may obtain at least one transform coefficient by performing transformation on the at least one coefficient included in the current coding unit.

In operation S170, the image encoding apparatus 150 may obtain at least one quantized transform coefficient and a quantization parameter for the current coding unit by performing quantization on the at least one transform coefficient.

In operation S175, the image encoding apparatus 150 may obtain a difference quantization parameter for the current coding unit, based on a predicted quantization parameter and the quantization parameter for the current coding unit.

In operation S180, the image encoding apparatus 150 may generate a syntax element representing the difference quantization parameter for the current coding unit, based on an area of a predefined difference quantization parameter signaling unit. A syntax element may refer to information about an image quantization parameter or coefficients included in an image, which is included in a bitstream. That is, a syntax element may indicate an element of data that is represented in a bitstream.

When an area of the current coding unit is larger than or equal to that of the predefined difference quantization parameter signaling unit, and a size of the current coding unit is larger than a maximum size of a transform unit, the image encoding apparatus 150 may generate a syntax element representing a difference quantization parameter that is to be included in information about a transform unit first encoded from among a plurality of transform units split from the current coding unit. When the area of the current coding unit is smaller than the area of the predefined difference quantization parameter signaling unit, the image encoding apparatus 150 may generate a syntax element representing a difference quantization parameter that is to be included in information about a first transform unit of a first coding unit of a plurality of coding units included in a predefined coding unit including the current coding unit. When the area of the current coding unit is larger than or equal to the area of the predefined difference quantization parameter signaling unit, and the size of the current coding unit is smaller than or equal to the maximum size of the transform unit, the image encoding apparatus 150 may generate the syntax element representing the difference quantization parameter for the current coding unit, based on whether at least one transform coefficient which is not 0 is included in a transform unit having the same size as the current coding unit.

In operation S185, the image encoding apparatus 150 may generate residual information of the current coding unit, the residual information including information about the at least one quantized transform coefficient.

In operation S190, the image encoding apparatus 150 may generate a bitstream including the residual information of the current coding unit and the syntax element.

FIG. 2C is a block diagram of an image encoder according to various embodiments.

Referring back to FIG. 2C, an image encoder 7000 according to various embodiments may perform tasks that are performed by the image encoder 155 and the bitstream generator 170 of the image encoding apparatus 150 so as to encode image data.

That is, an intra predictor 7200 may perform intra prediction on each block of a current image 7050, and an inter predictor 7150 may perform inter prediction on each block by using the current image 7050 and a reference image obtained from a reconstructed picture buffer 7100.

By subtracting prediction data for each block output from the intra predictor 7200 or the inter predictor 7150 from data for an encoded block of the current image 7050, residue data may be generated, and a transformer 7250 and a quantizer 7300 may perform transformation and quantization on the residue data and output a quantized transform coefficient for each block. An inverse-quantizer 7450 and an inverse-transformer 7500 may perform inverse-quantization and inverse-transformation on the quantized transform coefficient to restore residue data of a spatial domain. The reconstructed residue data of the spatial domain may be added to the prediction data for each block output from the intra predictor 7200 or the inter predictor 7150, thereby being reconstructed as spatial-domain data for each block of the current image 7050. A deblocking unit 7550 and a SAO performer 7600 may perform in-roof filtering on the reconstructed, spatial-domain data to generate a filtered, reconstructed image. The generated, reconstructed image may be stored in a reconstructed picture buffer 7100. Reconstructed images stored in the reconstructed picture buffer 7100 may be used as reference images for inter prediction of other images. An entropy encoder 7350 may perform entropy encoding on the quantized transform coefficient, and the entropy-encoded coefficient may be output to a bitstream 7400.

In order for the image encoder 7000 according to various embodiments to be applied to the image encoding apparatus 150, phased tasks of the image encoder 7000 according to various embodiments may be performed for each block. For example, a task of the quantizer 7300 may correspond to a task of the quantizer 160. FIG. 3A shows a syntax structure of a split unit for signaling a difference quantization parameter, according to an embodiment. Herein, the syntax structure may refer to one or more syntax elements that are represented together in a bitstream according to a predefined order. Herein, the split unit refers to a coding unit being split, and after a split flag representing whether or not to split is obtained from the split unit, whether or not to continue to split may be determined. At this time, the split unit may be recursively (hierarchically) split based on split information such as a split flag, etc.

Referring to FIG. 3A, the image decoding apparatus 100 may obtain a syntax element cu_qp_delta for a difference quantization parameter from a syntax structure 200 of a split unit level. After the image decoding apparatus 100 obtains a split flag btt_split_flag from a bitstream, the image decoding apparatus 100 may obtain the syntax element cu_qp_delta from the bitstream. At this time, the image decoding apparatus 100 may obtain the syntax element cu_qp_delta for each specific area unit cuQpDeltaArea. At this time, information about the specific area unit cuQpDeltaArea may be obtained in unit of a SPS, a PPS, a slice, a tile, or a tile group. The information about the specific area unit cuQpDeltaArea may represent an area value, a value resulting from expressing an area value as a multiplier of 2, or an index value of a table having a corresponding relation between various area values and indices. Alternatively, the specific area may be determined to be a value predetermined between the image decoding apparatus 100 and the image encoding apparatus 150. When a block extends over a picture boundary, an area for obtaining a syntax element cu_qp_delta may be an area of the block, the area including an outside region of the picture. However, the area for obtaining the syntax element cu_qp_delta may be limited to only an inside region of the picture. In the case in which the image decoding apparatus 100 obtains a split flag btt_split_flag for a current coding unit (x0, y0) and the split flag btt_split_flag represents that the current coding unit (x0, y0) is no longer split (btt_split_flag[x0][y0]==0), the image decoding apparatus 100 may obtain a syntax element cu_qp_delta from a bitstream when an area log 2CbWidth+log 2CbHeight of the current coding unit (x0, y0) is larger than or equal to a specific area cuQpDeltaArea for signaling a difference quantization parameter.

Meanwhile, in the case in which the image decoding apparatus 100 obtains a split flag btt_split_flag for a current coding unit (x0, y0) and the split flag btt_split_flag represents that the current coding unit (x0, y0) is to be split (else if), the image decoding apparatus 100 may obtain a syntax element cu_qp_delta from a bitstream when the area log 2CbWidth+log 2CbHeight of the current coding unit (x0, y0) is two times (+1) the specific area cuQpDeltaArea for signaling the difference quantization parameter and a split type of the current coding unit (x0, y0) is a ternary split type (btt_split_type[x0][y0]==1), or when the area log 2CbWidth+log 2CbHeight of the current coding unit (x0, y0) is equal to the specific area cuQpDeltaArea for signaling the difference quantization parameter.

FIGS. 3B and 3C show syntax structures of a transform unit and a split unit for signaling a difference quantization parameter, according to an embodiment.

Referring back to FIGS. 3B and 3C, the image decoding apparatus 100 may determine a value of cuQpDeltaCode according to a predefined condition in a syntax structure 210 of a split unit level. The image decoding apparatus 100 may obtain CBF from a syntax structure 220 of a transform unit level, identify a value of cuQpDeltaCode (and a value of CBF), and obtain a syntax element cu_qp_delta from a bitstream according to a condition based on the identified value of cuQpDeltaCode.

Referring to FIG. 3B, in the case in which a value of cu_qp_delta_enabled_flag is 1 and a value of sps_quant_flag is 1 (cu_qp_delta_enabled_flag && sps_dquant_flag), the case in which a split flag btt_split_flag indicates represents that a current coding unit (x0, y0) is no longer split, and the case in which an area log 2CbWidth+log 2CbHeight of the current coding unit (x0, y0) is larger than or equal to a specific area cuQpDeltaArea for signaling a difference quantization parameter, the image decoding apparatus 100 may determine a value of cuQpdeltaCode as 1. Herein, cu_qp_delta_enabled_flag may be a flag representing whether to enable signaling of a difference quantization parameter of a coding unit level, and sps_dquant_flag may be a flag representing whether to perform signaling of the difference quantization parameter according to a predefined difference quantization parameter signaling scheme obtained in a SPS level. Herein, the predefined difference quantization parameter signaling scheme refers to a scheme for signaling a difference quantization parameter regardless of a CBF value of a transform unit in some cases.

In the case in which the split flag represents that the current coding unit (x0, y0) is split (else if), the case in which the area log 2CbWidth+log 2CbHeight of the current coding unit (x0, y0) is two times (+1) the specific area cuQpDeltaArea for signaling the difference quantization parameter and the split type of the current coding unit (x0, y0) is a ternary split type (btt_split_type[x0][y0]==1), or the case in which the area log 2CbWidth+log 2CbHeight of the current coding unit (x0, y0) is equal to the specific area cuQpDeltaArea for signaling the difference quantization parameter, the image decoding apparatus 100 may determine a value of cuQpdeltaCode as 2.

Referring to FIG. 3C, in the case in which the value of cuQPDeltaCode is 1, the image decoding apparatus 100 may obtain a syntax element cu_qp_delta from the bitstream when one value of CBF (Y, U, V) cbf_luma, cbf_cb, and cbf_cr for a current transform unit is 1. The image decoding apparatus 100 may not obtain the syntax element cu_qp_delta from the bitstream when all values of CBF (Y, U, V) cbf_luma, cbf_cb, and cbf_cr are 0.

When the value of cuQPDeltaCode is 2, the image decoding apparatus 100 may obtain CBF of a transform unit having the same size as a first coding unit of a plurality of coding units split from the current coding unit, and then obtain a syntax element cu_qp_delta from the bitstream, regardless of values of CBF cbf_luma, cbf_cb, and cbf_cr of the current transform unit. At this time, after the syntax element cu_qp_delta is obtained from the first coding unit, the image decoding apparatus 100 may determine the value of cuQpdeltaCode as 0, and accordingly, the image decoding apparatus 100 may not obtain the syntax element cu_qp_delta from the bitstream with respect to the remaining coding unit except for the first coding unit of the plurality of coding units split from the current coding unit.

In this case, a difference quantization parameter of the remaining coding unit may be the first obtained syntax element cu_qp_delta.

However, the disclosure is not limited thereto, and in the case in which the value of cuQPDeltaCode is 2, the image decoding apparatus 100 may obtain a syntax element cu_qp_delta from the bitstream when at least one value of CBF cbf_luma, cbf_cb, and cbf_cr for the current coding unit is 1. For example, when all values of CBF cbf_luma, cbf_cb, and cbf_cr of the first coding unit of the plurality of coding units split from the current coding unit are 0, the image decoding apparatus 100 may obtain a syntax element cu_qp_delta from a second coding unit. Because the values of CBF of the first coding unit are 0, the first coding unit does not require a quantization parameter, and therefore, when at least one of CBF values of the coding units is 1, a syntax element cu_qp_delta may be obtained from the corresponding coding unit.

FIGS. 4A to 4C show syntax structures of a split unit, a coding unit, and a transform unit for signaling a difference quantization parameter, according to an embodiment.

Referring back to FIGS. 4A to 4C, the image decoding apparatus 100 may determine a value of cuQpDeltaCode according to a predefined condition in a syntax structure 230 of a split unit level. The image decoding apparatus 100 may obtain a transform unit (At this time, syntax elements included in a transform unit syntax structure are obtained) having the same size as that of a coding unit according to a maximum size of a transform unit in a coding unit syntax structure 240, or a plurality of transform units from the coding unit, then obtain CBF cbf_luma, cbf_cb, and cbf_cr from a transform unit syntax structure 250, identify a value of cuQpDeltaCode (and a value of CBF), and obtain a syntax element cu_qp_delta from a bitstream according to a condition based on the identified value of cuQpDeltaCode.

Referring to FIG. 4A, in the case in which a value of cu_qp_delta_enabled_flag is 1 and a value of sps_dquant_flag is 1 in the syntax structure 230 of the split unit level (cu_qp_delta_enabled_flag && sps_dquant_flag), the case in which a value of a split flag btt_split_flag of a current coding unit (x0, y0) represents that the current coding unit (x0, y0) is no longer split (btt_split_flag[x0][y0]==0) and a value of cuQPDeltaCode is not 2, the case in which an area log 2CbWidth+log 2CbHeight of the current coding unit (x0, y0) is larger than or equal to an area cuQPDeltaArea of a predefined difference quantization parameter signaling unit (log 2CbWidth+log 2CbHeight>=cuQpDeltaArea), and the case in which a height log 2CbWidth or a width log 2CbHeight of the current coding unit (x0, y0) is larger than 6 that is a maximum size of a transform unit (log 2CbWidth>6 II log 2CbHeight>6), the image decoding apparatus 100 may set a value of cuQpdeltaCode of the current coding unit (x0, y0) to 2.

In the syntax structure 230 of the split unit level, in the case in which a value of cu_qp_delta_enabled_flag is 1 and a value of sps_dquant_flag is 1 (cu_qp_delta_enabled_flag && sps_dquant_flag), the case in which a value of a split flag btt_split_flag of the current coding unit (x0, y0) represents that the current coding unit (x0, y0) is no longer split (btt_split_flag[x0][y0]==0) and a value of cuQpDeltaCode is not 2, the case in which the area log 2CbWidth+log 2CbHeight of the current coding unit (x0, y0) is larger than or equal to the area cuQpDeltaArea of the predefined difference quantization parameter signaling unit (log 2CbWidth+log 2CbHeight>=cuQpDeltaArea), and the case in which the height log 2CbWidth and width log 2CbHeight of the current coding unit (x0, y0) are smaller than 6 that is the maximum size of the transform unit (else), the image decoding apparatus 100 may set a value of cuQPDeltaCode to 1. At this time, the reason of identifying whether the value of cuQPDeltaCode is not 2 may be because there is a coding unit having the same area as that of the predefined difference quantization parameter signaling unit among coding units split and obtained according to the ternary split type from a coding unit corresponding to two times of the predefined difference quantization parameter signaling unit, and the value of cuQPDeltaCode may be again set to 1 when whether a value of cuQPDeltaCode for the coding unit is 2 is not identified.

In the case in which the value of cuQPDeltaCode is 1, information about a difference quantization parameter may be signaled only when a value of a coding block flag of a transform unit is 1, and in the case in which the value of cuQPDeltaCode is 2, information about a difference quantization parameter may be signaled through information related to a first-decoded transform unit included in coding units of the difference quantization parameter signaling unit, regardless of a value of a coding block flag of the transform unit.

Meanwhile, the image decoding apparatus 100 may set a value of isCuQPDeltaCoded to 0. Only when the value of isCuQPDeltaCoded is 0, a difference quantization parameter may be obtained from information about the corresponding transform unit. By setting a value of the difference quantization parameter to 1 after the difference quantization parameter is obtained, a difference quantization parameter for the difference quantization parameter signaling unit may be once obtained, and a difference quantization parameter may be no longer obtained from information about a subsequent transform unit.

In the syntax structure 230 of the split unit level, in the case in which a value of cu_qp_delta_enabled_flag is 1 and a value of sps_dquant_flag is 1 (cu_qp_delta_enabled_flag && sps_dquant_flag), the case in which a value of the split flag btt_split_flag of the current coding unit (x0, y0) represents that the current coding unit (x0, y0) is to be split (else if) and the area log 2CbWidth+log 2CbHeight of the current coding unit (x0, y0) is two times (+1) the area cuQpDeltaArea of the predefined difference quantization parameter signaling unit, the case in which the split type of the current coding unit (x0, y0) is the ternary split type (btt_split_type[x0][y0]==1), or the case in which the area log 2CbWidth+log 2CbHeight of the current coding unit (x0, y0) is equal to the area cuQpDeltaArea of the predefined difference quantization parameter signaling unit and a value of cuQpdeltaCode is not 2, the image decoding apparatus 100 may set a value of cuQpdeltaCode to 2. Meanwhile, the image decoding apparatus 100 may set a value of isCuQPDeltaCoded to 0.

When the value of the split flag btt_split_flag of the current coding unit (x0, y0) is 1, the image decoding apparatus 100 may obtain coding units of a lower depth included in the current coding unit (x0, y0) according to a split shape mode SplitMode[x0][y0] determined according to a split type and a split direction. At this time, syntax elements of the coding unit syntax structure 240 of the coding unit level related to the coding units of the lower depth may be obtained. That is, syntax elements of the syntax structure 230 of the split unit level may be recursively obtained.

For example, in the case in which the value of the split flag btt_split_flag of the current coding unit (x0, y0) is 1, the image decoding apparatus 100 may obtain syntax elements of the syntax structure 230 of the split unit level for three coding units [x0,y0], [x0,y1], and [x0,y2] of a lower depth included in the current coding unit (x0, y0) when a split shape mode SplitMode[x0][y0] determined according to a split type and a split direction is a mode according to a horizontal ternary split (SplitMode[x0][y0]==SPLIT_TT_HOR). At this time, a value of cuQpDeltaCode set in the current coding unit (x0, y0) may be transferred to the syntax structure 230 of the split unit level.

Meanwhile, when the value of the split flag btt_split_flag of the current coding unit (x0, y0) is 0 (else), the image decoding apparatus 100 may obtain syntax elements of the syntax structure 240 of the coding unit level of the current coding unit (x0, y0) that is no longer split.

Referring to FIG. 4B, the image decoding apparatus 100 may obtain, from a bitstream, a flag cbf_all representing whether a current coding unit includes a transform coefficient of at least one component which is not 0, and, when the current coding unit includes the transform coefficient of the at least one component which is not 0 (if(cbf_all)), the image decoding apparatus 100 may set a value of isSplit representing whether the current coding unit is to be split into a plurality of sub blocks (transform units) according to 6 that is a maximum size of a transform unit. That is, when the width log 2CbWidth of the current coding unit is larger than 6 that is the maximum size of the transform unit, or when the height log 2CbHeight of the current coding unit is larger than 6 that is the maximum size of the transform unit, the image decoding apparatus 100 may set a value of isSplit to 1, and otherwise, the image decoding apparatus 100 may set the value of isSplit to 0.

Meanwhile, the image decoding apparatus 100 may determine a size log 2TbWidth and log 2TbHeight of a transform unit based on 6 that is the maximum size of the transform unit and the size log 2CbWidth and log 2CbHeight of the current coding unit. For example, when the width log 2CbWidth of the current coding unit is larger than 6 that is the maximum size of the transform unit, the image decoding apparatus 100 may determine the width of the transform unit to be 6 that is the maximum size of the transform unit, and otherwise, the image decoding apparatus 100 may determine the width of the transform unit to be the width of the current coding unit. Likewise, the image decoding apparatus 100 may determine a height of the transform unit.

The image decoding apparatus 100 may obtain a transform unit based on reference coordinates (x0, y0) and the size log 2TbWidth and log 2TbHeight of the transform unit. That is, the image decoding apparatus 100 may obtain syntax elements of a syntax structure 250 of a transform unit level. At this time, the value of cuQpDeltaCode of the current coding unit may be transferred.

The image decoding apparatus 100 may additionally obtain a transform unit based on a condition according to the size log 2CbWidth and log 2CbHeight of the current coding unit and 6 that is the maximum size of the transform unit. That is, when the width or size of the current coding unit is larger than 6 that is the maximum size of the transform unit, the image decoding apparatus 100 may obtain additional transform units included in the current coding unit. At this time, the value of cuQpDeltaCode of the current coding unit may be transferred.

Referring to FIG. 4C, the image decoding apparatus 100 may obtain CBF cbf_luma, cbf_cb_, and cbf_cr for each component of a transform unit in the syntax structure 250 of the transform unit level. In the case in which a value of cu_qp_delta_enabled is 1 and the case in which a value of sps_dquant_flag is 0 (!sps_dquant_flag), or the case in which a value of cuQpDeltaCode is 1 and a value of isdeltaCoded is 0, the image decoding apparatus 100 may obtain syntax element information for cu_qp_delta from a bitstream when at least one of values of CBF cbf_luma, cbf_cb_, and cbf_cr for each component is 1 (cbf_luma||cbf_cb||cbf_cr).

In the case in which a value of cu_qp_delta_enabled is 1, the case in which a value of cuQpDeltaCode is 2, and a value of isdeltaCoded is 0, the image decoding apparatus 100 may obtain syntax element information for cu_qp_delta from a bitstream. At this time, the image decoding apparatus 100 may obtain the syntax element information for cu_qp_delta from the bitstream, regardless of values of CBF cbf_luma, cbf_cb_, and cbf_cr for each component.

According to the syntax structures shown in FIGS. 4A to 4C, the image decoding apparatus 100 may obtain syntax element information for a difference quantization parameter in a level of a coding unit, and, at this time, the image decoding apparatus 100 may obtain the syntax element information for the difference quantization parameter based on a size of a predefined difference quantization parameter signaling unit. For example, in the case in which a size of a current coding unit that is no longer split is larger than that of the predefined difference quantization parameter signaling unit, the image decoding apparatus 100 may obtain syntax element information for cu_qp_delta in a syntax structure 250 of a first transform unit when the current coding unit is split into a plurality of sub blocks (transform units) including a coefficient. At this time, the image decoding apparatus 100 may obtain the syntax element information for cu_qp_delta regardless of a value of CBF of the corresponding transform unit. The image decoding apparatus 100 may not obtain the syntax element information for cu_qp_delta with respect to the remaining transform unit except for the first transform unit of the plurality of transform units, and in this case, a difference quantization parameter for the remaining transform unit may be obtained based on cu_qp_delta obtained in the first transform unit.

Meanwhile, in regard of a coding unit having a smaller size than that of the predefined difference quantization parameter signaling unit, in the case in which a size of a predefined coding unit including the corresponding coding unit is equal to a size of the predefined difference quantization parameter signaling unit, or a size of at least one of the plurality of sub blocks (a plurality of coding units including the current coding unit) generated by splitting is smaller than a size of the corresponding coding unit (splitting according to the ternary split type) while the size of the predefined coding unit is two times that of the predefined difference quantization parameter signaling unit, the image decoding apparatus 100 may obtain syntax element information for cu_qp_delta from a bitstream in a syntax structure 250 of a transform unit level of a first transform unit of a first coding unit among the plurality of sub blocks. At this time, the image decoding apparatus 100 may obtain the syntax element information for cu_qp_delta regardless of a value of CBF of the corresponding transform unit. The image decoding apparatus 100 may not obtain the syntax element information for cu_qp_delta with respect to the remaining transform unit except for the first transform unit of the first coding unit among the plurality of coding units and the remaining coding unit except for the first coding unit, and in this case, a difference quantization parameter for the remaining coding unit may be obtained based on cu_qp_delta obtained in the first transform unit of the first coding unit.

Meanwhile, in the above description given with reference to FIGS. 4A and 4B, it is assumed that the maximum size of the transform unit is 64 (a value resulting from applying log 2 to 64 is 6). However, it will be understood by one of ordinary skill in the art that the maximum size of the transform unit may be one of multipliers of 2.

FIG. 4D is a diagram for describing a method for signaling a difference quantization parameter, according to the syntax structures of the split unit, the coding unit, and the transform unit for signaling the difference quantization parameter as shown in FIGS. 4A to 4C.

Referring back to FIG. 4D, the image decoding apparatus 100 may signal a difference quantization parameter for a coding unit, based on an area of a predefined difference quantization parameter signaling unit.

For example, in the case in which an area of a coding unit 260 that is no longer split is larger than or equal to that of the predefined difference quantization parameter signaling unit, the image decoding apparatus 100 may obtain a syntax element for a difference quantization parameter of the coding unit 260 from information about a transform unit having the same size as that of the coding unit 260, when a size of the coding unit 260 is smaller than or equal to a maximum size of a transform unit. At this time, the image decoding apparatus 100 may obtain a coding block flag from the information about the transform unit, and only when a value of the coding block flag indicates 1, the image decoding apparatus 100 may obtain a syntax element for a difference quantization parameter, and, when a value of the coding block flag indicates 0, the image decoding apparatus 100 may not obtain the syntax element for a difference quantization parameter.

In the case in which an area of a coding unit 270 that is no longer split is larger than or equal to that of the predefined difference quantization parameter signaling unit, the image decoding apparatus 100 may split the coding unit 270 to obtain transform units including a transform unit 275 having the maximum size of the transform unit and obtain a syntax element for a difference quantization parameter for the coding unit 270 from information about the transform unit 275 first decoded from among the transform units 275, when a size of the coding unit 270 is larger than the maximum size of the transform unit.

Meanwhile, in the case in which an area of a coding unit 285 of a lower depth split according to various split types (for example, a ternary split type or a binary split type) from a coding unit 280 of an upper depth is smaller than an area of the predefined difference quantization parameter signaling unit, the image decoding apparatus 100 may obtain a syntax element for a difference quantization parameter for the coding unit 280 from information about a transform unit first decoded from among transform units included in the coding unit 285 first decoded from among two or three coding units included in the coding unit 280, when the area of the coding unit 280 is equal to the area of the predefined difference quantization parameter signaling unit. At this time, the image decoding apparatus 100 may obtain a syntax element for a difference quantization parameter for the coding unit 280, regardless of a value of a coding block flag of the corresponding transform unit. At this time, the coding unit 285 may be additionally split into coding units of a lower depth, or may be no longer split. A transform unit may be obtained from a coding unit that is no longer split. In this case, the transform unit may have the same size as the coding unit that is no longer split, although not limited thereto.

In the case in which an area of a coding unit 295 of a lower depth having a small size among coding units of a lower depth split according to the ternary split type from a coding unit 290 of an upper depth is smaller than that of the predefined difference quantization parameter signaling unit, the image decoding apparatus 100 may obtain a syntax element for a difference quantization parameter for the coding unit 290 from information about a transform unit first decoded from among transform units included in the coding unit 295 first decoded from among three coding units included in the coding unit 290, when an area of the coding unit 290 is two times that of the predefined difference quantization parameter signaling unit. At this time, the image decoding apparatus 100 may obtain a syntax element for a difference quantization parameter for the coding unit 290, regardless of a value of a coding block flag of the corresponding transform unit.

At this time, the coding unit 295 may be additionally split into coding units of a lower depth, or may be no longer split. A transform unit may be obtained from a coding unit that is no longer split. In this case, the transform unit may have the same size as the coding unit that is no longer split, although not limited thereto.

The above description has been given with reference to FIG. 4D, under an assumption of a case in which decoding is performed without enabling of the SUCO scheme. However, it will be understood by one of ordinary skill in the art that, when the SUCO scheme is enabled, a first decoded coding unit may be located to the right side in a coding unit of an upper depth, unlike FIG. 4D.

FIG. 5 is a diagram for describing a SUCO scheme for determining an encoding (decoding) order between coding units to be a forward direction or a backward direction based on an encoding order flag and describing that a right neighboring block is available according to the encoding (decoding) order based on the SUCO scheme, according to an embodiment of the disclosure.

Referring back to FIG. 5, a largest coding unit 1950 may be split into a plurality of coding units 1956, 1958, 1960, 1962, 1968, 1970, 1972, 1974, 1980, 1982, 1984, and 1986. The largest coding unit 1950 may correspond to an uppermost node 1900 having a tree structure. Also, the plurality of coding units 1956, 1958, 1960, 1962, 1968, 1970, 1972, 1974, 1980, 1982, 1984, and 1986 may respectively correspond to a plurality of nodes 1906, 1908, 1910, 1912, 1918, 1920, 1922, 1924, 1930, 1932, 1934, and 1936. Upper encoding order flags 1902, 1914 and 1926 representing encoding orders in the tree structure may correspond to arrows 1952, 1964, and 1976, and upper encoding order flags 1904, 1916, and 1928 may correspond to arrows 1954, 1966, and 1978.

Upper encoding order flags may represent encoding orders of two coding units located at an upper position among four coding units having the same depth. When an upper encoding order flag indicates 0, encoding may be performed in the forward direction. In contrast, when an upper encoding order flag indicates 1, encoding may be performed in the backward direction.

Likewise, lower encoding order flags may represent encoding orders of two coding units located at a lower position among four coding units having the same depth. When a lower encoding order flag indicates 0, encoding may be performed in the forward direction. In contrast, when a lower encoding order flag indicate 1, encoding may be performed in the backward direction.

For example, because the upper encoding order flag 1914 is 0, an encoding order between the coding units 1968 and

1970 may be determined to be the forward direction from left to right. Also, because the lower encoding order flag 1916 is 1, an encoding order between the coding units 1972 and 1974 may be determined to be the backward direction from right to left.

According to some embodiments, an upper encoding order flag and a lower encoding order flag may be set to have the same value. For example, when the upper encoding order flag 1902 is determined as 1, the lower encoding order flag 1904 corresponding to the upper encoding order flag 1902 may also be determined as 1. Because values of an upper encoding order flag and a lower encoding order flag are determined with 1 bit, an information amount of encoding order information may be reduced.

According to some embodiments of the disclosure, an upper encoding order flag and a lower encoding order flag of a current coding unit may be determined by referring to at least one of an upper encoding order flag or a lower encoding order flag applied to a coding unit having a lower depth than the current coding unit. For example, the upper encoding order flag 1926 and the lower encoding order flag 1928 applied to the coding units 1980, 1982, 1984, and 1986 may be determined based on the lower encoding order flag 1916 applied to the coding units 1971 and 1974. Accordingly, the upper encoding order flag 1926 and the lower encoding order flag 1928 may be determined to be the same value as that of the encoding order flag 1916. Because values of an upper encoding order flag and a lower encoding order flag are determined from an upper coding unit of a current coding unit, no encoding order information may be obtained from a bitstream. Accordingly, an information amount of encoding order information may be reduced.

At this time, because data of samples included in a neighboring coding unit 1958 decoded earlier than the current coding unit 1986 and located to the right of the current coding unit 1986 is available, the image decoding apparatus 100 may obtain a prediction parameter of the current coding unit 1986 according to an embodiment of the disclosure by using data (preferably, a quantization parameter) of the neighboring coding unit 1958 located to the right of the current coding unit 1986.

The image decoding apparatus 100 and the image encoding apparatus 150 according to various embodiments, described above with reference to FIGS. 1 to 5, may explicitly signal information about a difference quantization parameter for a current coding unit through a bitstream efficiently according to a size of a coding unit. Hereinafter, splitting of a coding unit will be described in detail according to an embodiment of the disclosure.

An image may be split into largest coding units. A size of a largest coding unit may be determined based on information obtained from a bitstream. The largest coding units may be in a shape of squares having the same size, although not limited thereto. Also, a largest coding unit may be hierarchically split into coding units based on information about a split shape mode obtained from a bitstream. The information about the split shape mode may include at least one of information representing whether or not to split, split direction information, and split type information. The information representing whether or not to split may represent whether or not to split the coding unit. The split direction information may represent one of a horizontal direction or a vertical direction in which the coding unit is split. The split type information may represent one of binary split, tri split (or ternary split), or quad split by which the coding unit is split.

In the disclosure, for convenience of description, the information about the split shape mode has been described to be classified into information representing whether or not to split, split direction information, and split type information, however, the information about the split type mode is not limited to these. The image decoding apparatus 100 may obtain the information about the split shape mode as an empty string from the bitstream. The image decoding apparatus 100 may determine whether or not to split a coding unit, a split direction, and a split type, based on the empty string.

The coding unit may be smaller than or equal to the largest coding unit. For example, when the information about the split shape mode indicates that the coding unit is to not be split, the coding unit may have the same size as the largest coding unit. When the information about the split shape mode is that the coding unit is to be split, the largest coding unit may be split into coding units of a lower depth. Also, when information about a split shape mode for each coding unit of a lower depth represents that the coding unit is to be split, the coding unit of the lower depth may be split into coding units having a smaller size. However, splitting of an image is not limited thereto, and a largest coding unit and a coding unit may not be distinguished from each other. Splitting of a coding unit will be described in more detail with reference to FIGS. 6 to 19.

Also, a coding unit may be split into prediction units for image prediction. Each prediction unit may be equal to or smaller than the coding unit. Also, the coding unit may be split into transform units for image transformation. Each transform unit may be equal to or smaller than the coding unit. A shape and size of the transform unit may be irrelevant to those of the prediction unit. A coding unit may be distinguished from a prediction unit, or a transform unit, or a coding unit, a prediction unit, and a transform unit may be the same. A prediction unit and a transform unit may be split by the same method of splitting a coding unit. Splitting a coding unit will be described in more detail with reference to FIGS. 6 to 19. A current block and a neighboring block of the disclosure may represent one of a largest coding unit, a coding unit, a prediction unit, and a transform unit. Also, a current block or a current coding unit may be a block being currently decoded or encoded or a block being currently split. The neighboring block may be a block reconstructed earlier than a current block. The neighboring block may be spatially or temporally adjacent to the current block. The neighboring block may be located to any one of the left-lower side, left-upper side, upper side, right-upper side, right side, and right-lower side of the current block.

Figure 6:
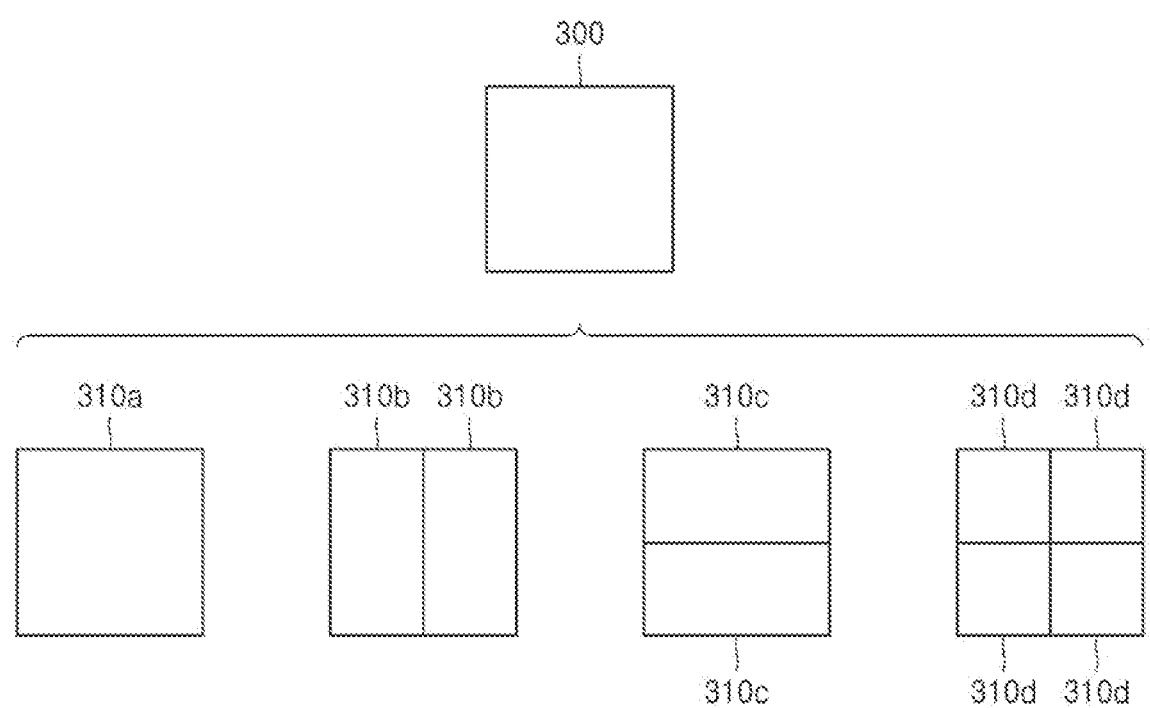
FIG. 6 illustrates a process, performed by the image decoding apparatus, of determining at least one coding unit by splitting a current coding unit, according to an embodiment.

FIG. 6 illustrates a process, performed by the image decoding apparatus 100, of determining at least one coding unit by splitting a current coding unit, according to an embodiment.

A block shape may include 4N×4N, 4N×2N, 2N×4N, 4N×N or N×4N. Here, N may be a positive integer. Block shape information is information indicating at least one of a shape, direction, a ratio of a width and height, or sizes.

The shape of the coding unit may include a square and a non-square. When the lengths of the width and height of the coding unit are equal (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, or N×4N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, or 8:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 150 may obtain predetermined split shape mode information, based on the block shape information. The image decoding apparatus 100 may obtain the predetermined split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the predetermined split shape mode information to be a quad split. The quad split is a split shape mode in which both the width and the height of the coding unit are bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating, for example, "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 6, when the block shape information of a current coding unit 300 indicates a square shape, the image decoder 110 may not split a coding unit 310*a* having the same size as the current coding unit 300, based on the split shape mode information indicating not to perform splitting, or may determine coding units 310*b*, 310*c*, 310*d*, etc. split based on the split shape mode information indicating a predefined splitting method.

Referring to FIG. 6, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. However, splitting methods of the square coding unit are not limited to the aforementioned methods, and may include various methods that may be indicated by the split shape mode information. Predefined splitting methods of splitting the square coding unit will be described in detail below in relation to various embodiments.

Figure 7:
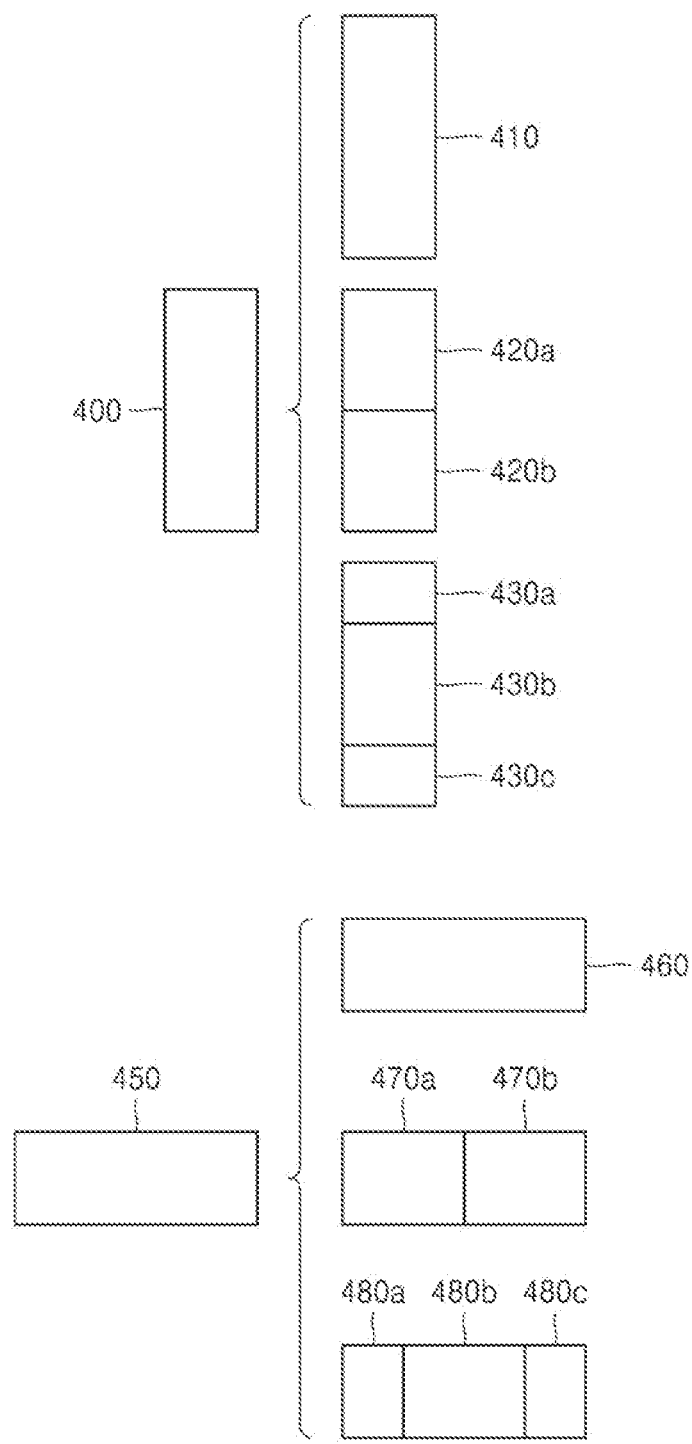
FIG. 7 illustrates a process, performed by the image decoding apparatus, of determining at least one coding unit by splitting a non-square coding unit, according to an embodiment.

FIG. 7 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predefined splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450, based on the split shape mode information indicating not to perform splitting, or may determine coding units 420*a* and 420*b*, 430*a*, 430*b*, and 430*c*, 470*a* and 470*b*, or 480*a*, 480*b*, and 480*c* which are split based on the split shape mode information indicating a predefined splitting method to obtain coding units of various sizes. Predefined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 7, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (tri split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a predefined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predefined restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a or 480c, wherein coding unit 430b or 480b is at a center location from among the three coding units 430a, 430b, and 430c or 480a, 480b, and 480c generated by splitting the current coding unit 400 or 450. For example, the image decoding apparatus 100 may restrict the coding unit 430b or 480b at the center location to be no longer split or to be split only a predefined number of times, unlike the other coding units 430a and 430c, or 480a and 480c.

Figure 8:
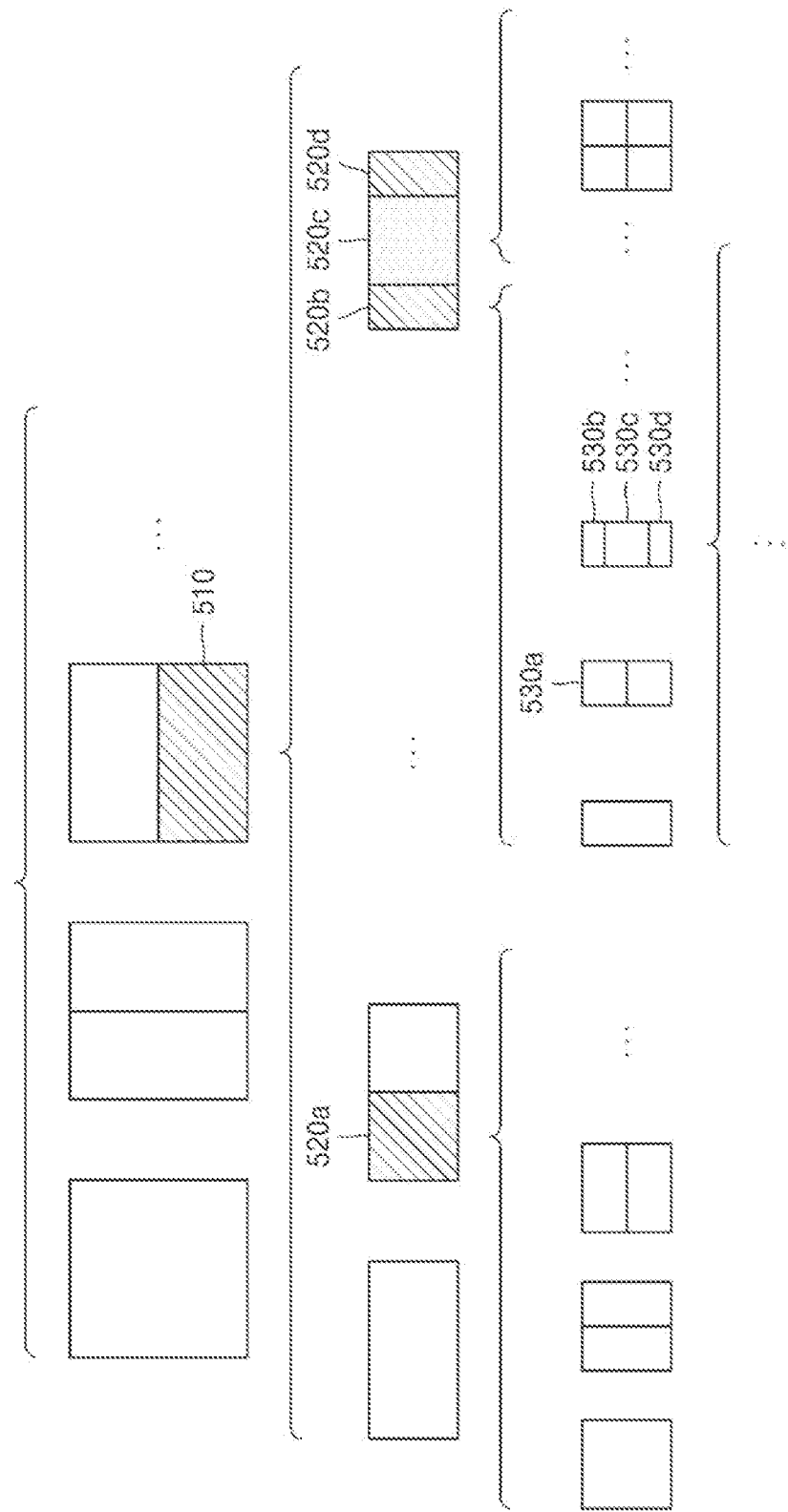
FIG. 8 illustrates a process, performed by the image decoding apparatus, of splitting a coding unit based on at least one of block shape information and split shape mode information, according to an embodiment.

FIG. 8 illustrates a process, performed by the image decoding apparatus 100, of splitting a coding unit based on at least one of block shape information and split shape mode information, according to an embodiment.

According to an embodiment, the image decoding apparatus 100 may determine to split or not split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on at least one of the block shape information and the split shape mode information, or may determine to not split the determined second coding unit 510. Referring to FIG. 8, the image decoding apparatus 100 may split the non-square second coding unit 510, which is determined by splitting the first coding unit 500, into one or more third coding units 520a, or 520b, 520c, and 520d at least one of the block shape information and the split shape mode information, or may not split the non-square second coding unit 510. The image decoding apparatus 100 may obtain at least one of the block shape information and the split shape mode information, and may split a plurality of various-shaped second coding units (e.g., 510) by splitting the first coding unit 500, based on at least one of the obtained block shape information and the obtained split shape mode information, and the second coding unit 510 may be split by using a splitting method of the first coding unit 500 based on at least one of the block shape information and the split shape mode information. According to an embodiment, when the first coding unit 500 is split into the second coding units 510 based on at least one of block shape information and split shape mode information about the first coding unit 500, the second coding unit 510 may also be split into the third coding units 520a, or 520b, 520c, and 520d, based on at least one of block shape information and split shape mode information about the second coding unit 510. That is, a coding unit may be recursively split based on at least one of block shape information and split shape mode information about each coding unit. Therefore, a square coding unit may be determined by splitting a non-square coding unit, and a non-square coding unit may be determined by recursively splitting the square coding unit.

Referring to FIG. 8, a predefined coding unit (e.g., a coding unit located at a center location or a square coding unit) from among the odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on at least one of block shape information and split shape mode information. Also, the image decoding apparatus 100 may determine not to split the second coding unit 510 based on at least one of block shape information and split shape mode information. According to an embodiment, the image decoding apparatus 100 may split the non-square second coding unit 510 into the odd number of third coding units 520b, 520c, and 520d. The image decoding apparatus 100 may put a predefined restriction on a predefined third coding unit from among the odd number of third coding units 520b, 520c, and 520d. For example, the image decoding apparatus 100 may restrict the coding unit 520c at a center location from among the odd number of third coding units 520b, 520c, and 520d to be no longer split or to be split a settable number of times.

Referring to FIG. 8, the image decoding apparatus 100 may restrict the coding unit 520c, which is at the center location from among the odd number of third coding units 520b, 520c, and 520d included in the non-square second coding unit 510, to be no longer split, to be split by using a predefined splitting method (e.g., split into only four coding units or split by using a splitting method of the second coding unit 510), or to be split only a predefined number of times (e.g., split only n times (where n>0)). However, the restrictions on the coding unit 520c at the center location are not limited to the aforementioned examples, and it should be interpreted that the restrictions may include various restrictions for decoding the coding unit 520c at the center location differently from the other third coding units 520b and 520d.

According to an embodiment, the image decoding apparatus 100 may obtain at least one of block shape information and split shape mode information, which is used to split a current coding unit, from a predefined location in the current coding unit.

Figure 9:
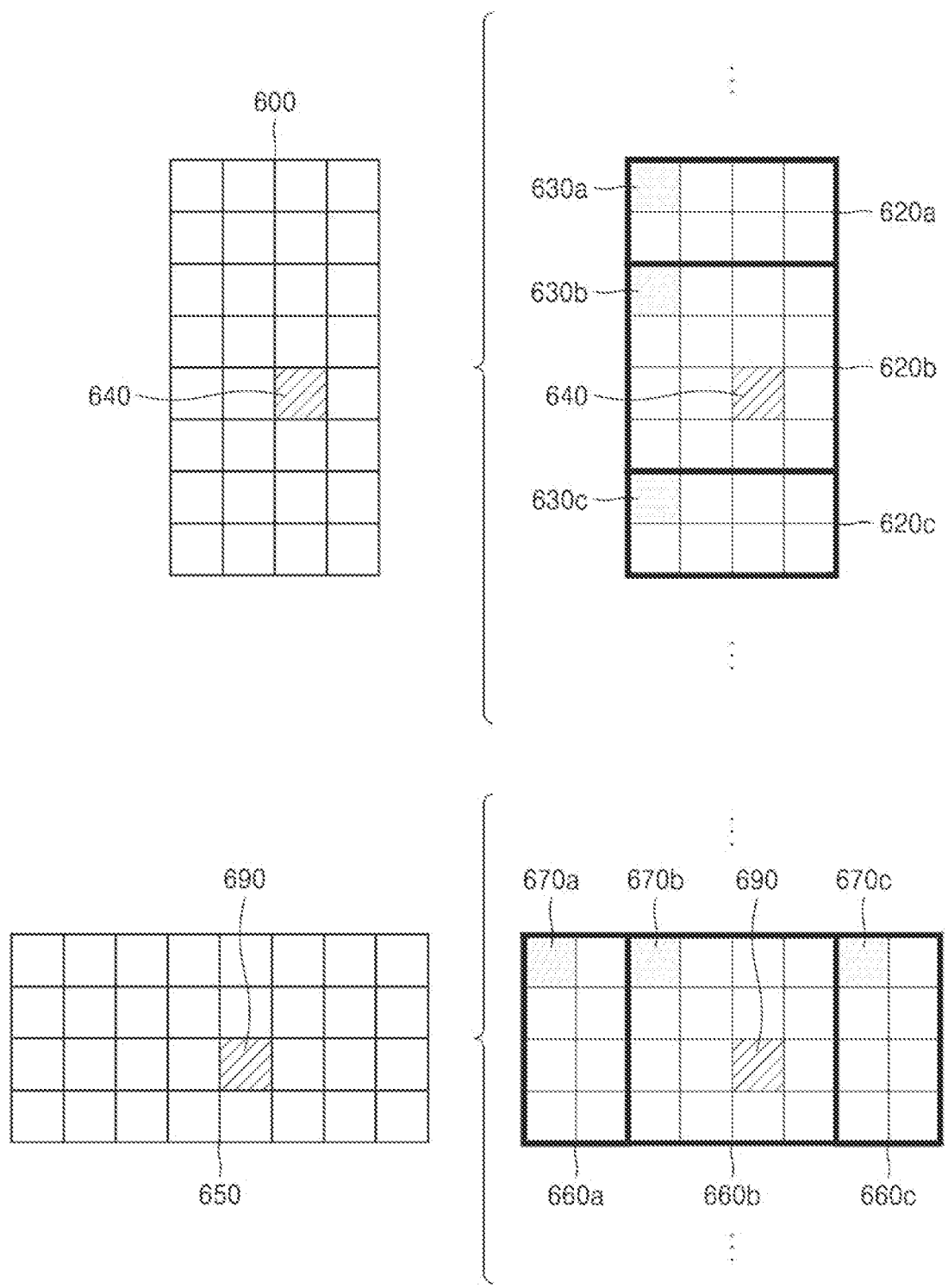
FIG. 9 illustrates a method, performed by the image decoding apparatus, of determining a predefined coding unit from among an odd number of coding units, according to an embodiment.

FIG. 9 illustrates a method, performed by the image decoding apparatus 100, of determining a predefined coding unit from among an odd number of coding units, according to an embodiment.

Referring to FIG. 9, at least one of block shape information and split shape mode information about a current coding unit 600 or 650 may be obtained from a sample of a predefined location (e.g., a sample 640 or 690 of a center location) from among a plurality of samples included in the current coding unit 600 or 650. However, the predefined location in the current coding unit 600, from which at least one of the block shape information and the split shape mode information may be obtained, is not limited to the center location in FIG. 9, and may include various locations included in the current coding unit 600 (e.g., top, bottom, left, right, upper-left, lower-left, upper-right, and lower-right locations). The image decoding apparatus 100 may obtain at least one of the block shape information and the split shape mode information from the predefined location and may determine to split or not to split the current coding unit into various-shaped and various-sized coding units.

According to an embodiment, when the current coding unit is split into a predefined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predefined location.

According to an embodiment, the image decoding apparatus 100 may use information indicating locations of the odd number of coding units, so as to determine a coding unit at a center location from among the odd number of coding units. Referring to FIG. 9, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predefined samples included in the coding units 620a, 620b, and 620c. In detail, the image decoding apparatus 100 may determine the coding unit 620b at the center location by determining the locations of the coding units 620a, 620b, and 620c based on information indicating locations of top-left samples 630a, 630b, and 630c of the coding units 620a, 620b, and 620c.

According to an embodiment, the information indicating the locations of the top-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top-left sample 630a of the upper coding unit 620a may include coordinates (xa, ya), information indicating the location of the top-left sample 530b of the middle coding unit 620b may include coordinates (xb, yb), and information indicating the location of the top-left sample 630c of the lower coding unit 620c may include coordinates (xc, yc). The image decoding apparatus 100 may determine the middle coding unit 620b by using the coordinates of the top-left samples 630a, 630b, and 630c which are included in the coding units 620a, 620b, and 620c, respectively. For example, when the coordinates of the top-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top-left samples 630a, 630b, and 630c may include coordinates indicating absolute locations in the picture, or may use coordinates (dxb, dyb) indicating a relative location of the top-left sample 630*b* of the middle coding unit 620*b* and coordinates (dxc, dyc) indicating a relative location of the top-left sample 630*c* of the lower coding unit 620*c* with reference to the location of the top-left sample 630*a* of the upper coding unit 620*a*. A method of determining a coding unit at a predefined location by using coordinates of a sample included in the coding unit, as information indicating a location of the sample, is not limited to the aforementioned method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a predefined criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the top-left sample 630*a* of the upper coding unit 620*a*, the coordinates (xb, yb) that is the information indicating the location of the top-left sample 630*b* of the middle coding unit 620*b*, and the coordinates (xc, yc) that is the information indicating the location of the top-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a*, 620*b*, and 620*c*. Referring to FIG. 6, the image decoding apparatus 100 may determine the middle coding unit 620*b*, which has a size different from the size of the upper and lower coding units 620*a* and 620*c*, as the coding unit of the predefined location. However, the aforementioned method, performed by the image decoding apparatus 100, of determining a coding unit having a size different from the size of the other coding units merely corresponds to an example of determining a coding unit at a predefined location by using the sizes of coding units, which are determined based on coordinates of samples, and thus various methods of determining a coding unit at a predefined location by comparing the sizes of coding units, which are determined based on coordinates of predefined samples, may be used.

The image decoding apparatus 100 may determine the width or height of each of the coding units 660*a*, 660*b*, and 660*c* by using the coordinates (xd, yd) that is information indicating the location of a top-left sample 670*a* of the left coding unit 660*a*, the coordinates (xe, ye) that is information indicating the location of a top-left sample 670*b* of the middle coding unit 660*b*, and the coordinates (xf, yf) that is information indicating a location of the top-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a*, 660*b*, and 660*c*. Referring to FIG. 9, the image decoding apparatus 100 may determine the middle coding unit 660*b*, which has a size different from the sizes of the left and right coding units 660*a* and 660*c*, as the coding unit of the predefined location. However, the aforementioned method, performed by the image decoding apparatus 100, of determining a coding unit having a size different from the size of the other coding units merely corresponds to an example of determining a coding unit at a predefined location by using the sizes of coding units, which are determined based on coordinates of samples, and thus various methods of determining a coding unit at a predefined location by comparing the sizes of coding units, which are determined based on coordinates of predefined samples, may be used.

However, locations of samples considered to determine locations of coding units are not limited to the aforementioned top-left locations, and information about arbitrary locations of samples included in the coding units may be used.

According to an embodiment, the image decoding apparatus 100 may select a coding unit at a predefined location from among an odd number of coding units determined by splitting the current coding unit, in consideration of the shape of the current coding unit. For example, when the current coding unit has a non-square shape, a width of which is longer than its height, the image decoding apparatus 100 may determine the coding unit at the predefined location in a horizontal direction. That is, the image decoding apparatus 100 may determine one of coding units at different locations in a horizontal direction and may put a restriction on the coding unit. When the current coding unit has a non-square shape, a height of which is longer than its width, the image decoding apparatus 100 may determine the coding unit at the predefined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, so as to determine the coding unit at the predefined location from among the even number of coding units. The image decoding apparatus 100 may determine an even number of coding units by splitting (bi split, binary split) the current coding unit, and may determine the coding unit at the predefined location by using the information about the locations of the even number of coding units. An operation related thereto may correspond to the operation of determining a coding unit at a predefined location (e.g., a center location) from among an odd number of coding units, which is described in detail above with reference to FIG. 9, and thus detailed descriptions thereof are not provided here.

According to an embodiment, when a non-square current coding unit is split into a plurality of coding units, predefined information about a coding unit at a predefined location may be used in a splitting process to determine the coding unit at the predefined location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 9, the image decoding apparatus 100 may split the current coding unit 600 into the plurality of coding units 620*a*, 620*b*, and 620*c* based on at least one of the block shape information and the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which based on at least one of the block shape information and the split shape mode information is obtained. That is, at least one of block shape information and split shape mode information about the current coding unit 600 may be obtained from the sample 640 at a center location of the current coding unit 600 and, when the current coding unit 600 is split into the plurality of coding units 620*a*, 620*b*, and 620*c* based on at least one of the block shape information and the split shape mode information, the coding unit 620*b* including the sample 640 may be determined as the coding unit at the center location. However, information used to determine the coding unit at the center location is not limited to at least one of block shape information and split shape mode information, and various types of information may be used to determine the coding unit at the center location.

According to an embodiment, predefined information for identifying the coding unit at the predefined location may be obtained from a predefined sample included in a coding unit to be determined. The image decoding apparatus 100 may use at least one of the block shape information and the split shape mode information, which is obtained from a sample at a predefined location in the current coding unit 600 (e.g., a sample at a center location of the current coding unit 600), to determine a coding unit at a predefined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predefined location by considering a block shape of the current coding unit 600, may determine the coding unit 620*b* including a sample, from which predefined information (e.g., at least one of the block shape information and the split shape mode information) is obtainable, from among the plurality of coding units 620*a*, 620*b*, and 620*c* determined by splitting the current coding unit 600, and may put a predefined restriction on the coding unit 620*b*. Referring to FIG. 9, according to an embodiment, the image decoding apparatus 100 may determine the sample 640 at the center location of the current coding unit 600 as the sample from which the predefined information is obtainable, and may put a predefined restriction on the coding unit 620*b* including the sample 640, in a decoding operation. However, the location of the sample from which the predefined information is obtainable is not limited to the aforementioned location, and may include arbitrary locations of samples included in the coding unit 620*b* to be determined for a restriction.

According to an embodiment, the location of the sample from which the predefined information is obtainable may be determined based on the shape of the current coding unit 600. According to an embodiment, the block shape information may indicate whether the current coding unit has a square or non-square shape, and the location of the sample from which the predefined information is obtainable may be determined based on the shape. For example, the image decoding apparatus 100 may determine a sample located on a boundary for splitting at least one of a width and height of the current coding unit in half, as the sample from which the predefined information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predefined information is obtainable.

According to an embodiment, when the current coding unit is split into a plurality of coding units, the image decoding apparatus 100 may use at least one of the block shape information and the split shape mode information so as to determine a coding unit at a predefined location from among the plurality of coding units. According to an embodiment, the image decoding apparatus 100 may obtain at least one of the block shape information and the split shape mode information from a sample at a predefined location in a coding unit, and may split the plurality of coding units, which are generated by splitting the current coding unit, by using at least one of the block shape information and the split shape mode information, which is obtained from the sample of the predefined location in each of the plurality of coding units. That is, a coding unit may be recursively split based on at least one of the block shape information and the split shape mode information, which is obtained from the sample at the predefined location in each coding unit. An operation of recursively splitting a coding unit is described above with reference to FIG. 8, and thus detailed descriptions thereof are not provided here.

According to an embodiment, the image decoding apparatus 100 may determine one or more coding units by splitting the current coding unit, and may determine an order of decoding the one or more coding units, based on a predefined block (e.g., the current coding unit).

Figure 10:
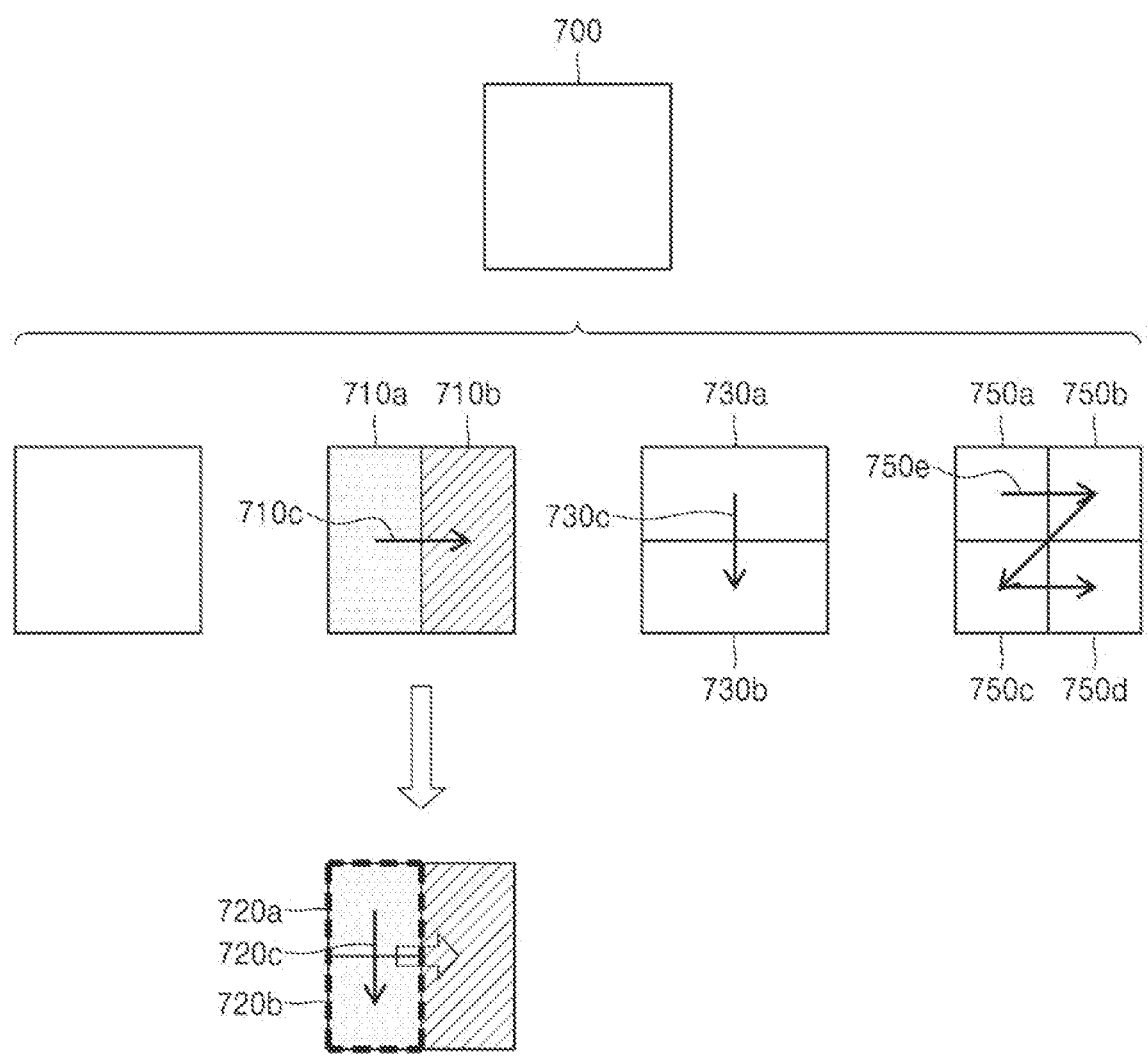
FIG. 10 illustrates an order of processing a plurality of coding units when the image decoding apparatus determines the plurality of coding units by splitting a current coding unit, according to an embodiment.

FIG. 10 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710*a* and 710*b* by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on at least one of block shape information and split shape mode information.

Referring to FIG. 10, the image decoding apparatus 100 may determine to process the second coding units 710a and 710b in a horizontal direction order 710c, the second coding units 710a and 710b being determined by splitting the first coding unit 700 in a vertical direction. The image decoding apparatus 100 may determine to process the second coding units 730a and 730b in a vertical direction order 730c, the second coding units 730a and 730b being determined by splitting the first coding unit 700 in a horizontal direction. The image decoding apparatus 100 may determine to process the second coding units 750a, 750b, 750c, and 750d, which are determined by splitting the first coding unit 700 in vertical and horizontal directions, in a predefined order for processing coding units in a row and then processing coding units in a next row (e.g., in a raster scan order or Z-scan order 750e).

According to an embodiment, the image decoding apparatus 100 may recursively split coding units. Referring to FIG. 10, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 10, the image decoding apparatus 100 may determine the second coding units 710a and 710b by splitting the first coding unit 700 in a vertical direction, and may determine to independently split each of the second coding units 710a and 710b or not to split the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the aforementioned example, and various methods may be used to independently process coding units, which are split and determined to various shapes, in a predefined order.

Figure 11:
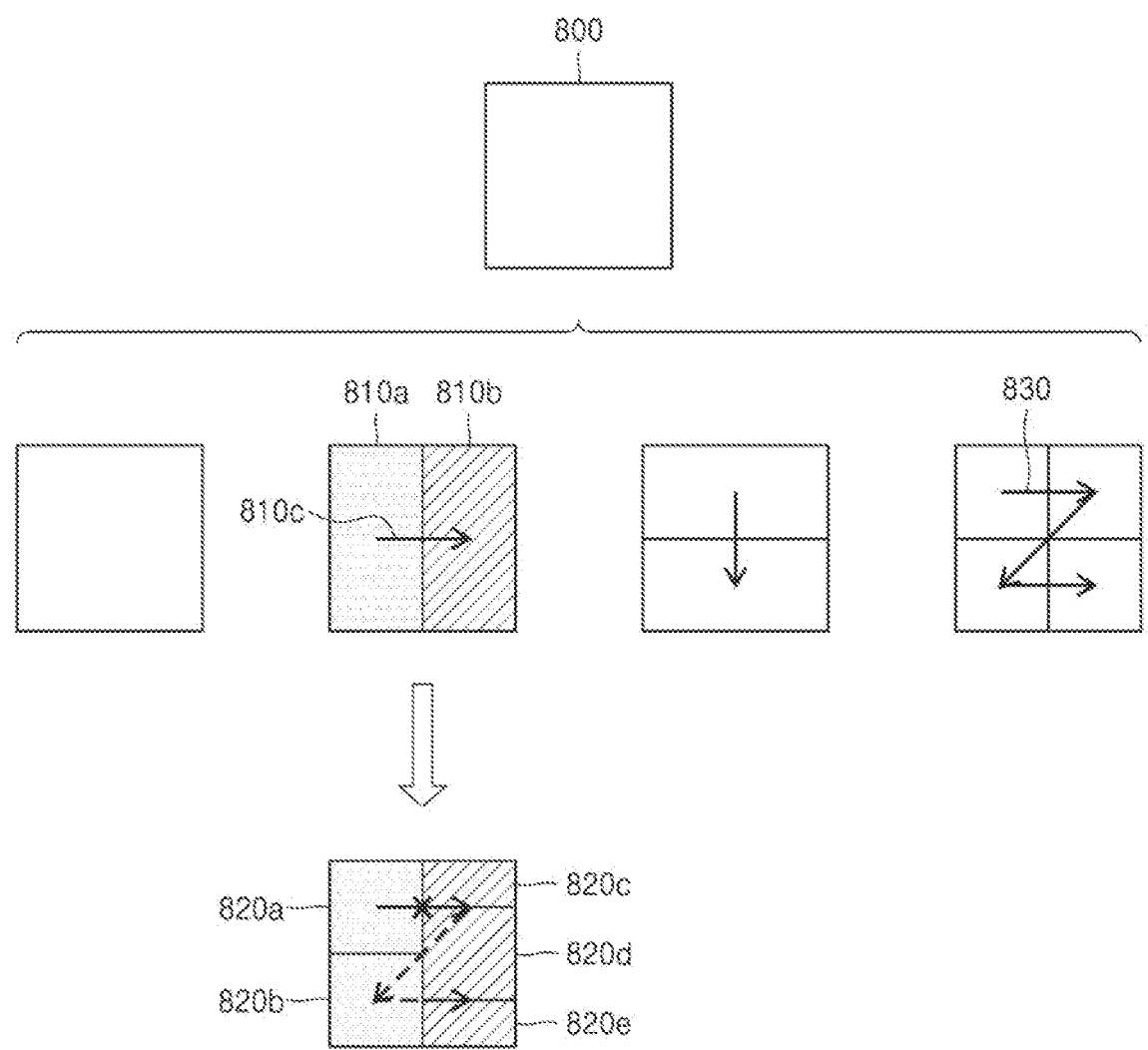
FIG. 11 illustrates a process, performed by the image decoding apparatus, of determining that a current coding unit is to be split into an odd number of coding units, when the coding units are not able to be processed in a predefined order, according to an embodiment.

FIG. 11 illustrates a process, performed by the image decoding apparatus 100, of determining that a current coding unit is to be split into an odd number of coding units, when the coding units are not processable in a predefined order, according to an embodiment.

According to an embodiment, the image decoding apparatus 100 may determine that the current coding unit is to be split into an odd number of coding units, based on obtained block shape information and split shape mode information. Referring to FIG. 11, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether there are an odd number of split coding units, by determining whether the third coding units 820a and 820b, and 820c, 820d, and 820e are processable in a predefined order. Referring to FIG. 11, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predefined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predefined order.

According to an embodiment, the image decoding apparatus 100 may determine whether the third coding units 820a and 820b, and 820c, 820d, and 820e included in the first coding unit 800 satisfy the condition for processing in the predefined order, and the condition may be whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units that are unable to be split along the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predefined restriction on a coding unit at a predefined location from among the split coding units. The restriction or the predefined location is described above in relation to various embodiments, and thus detailed descriptions thereof are not provided herein.

Figure 12:
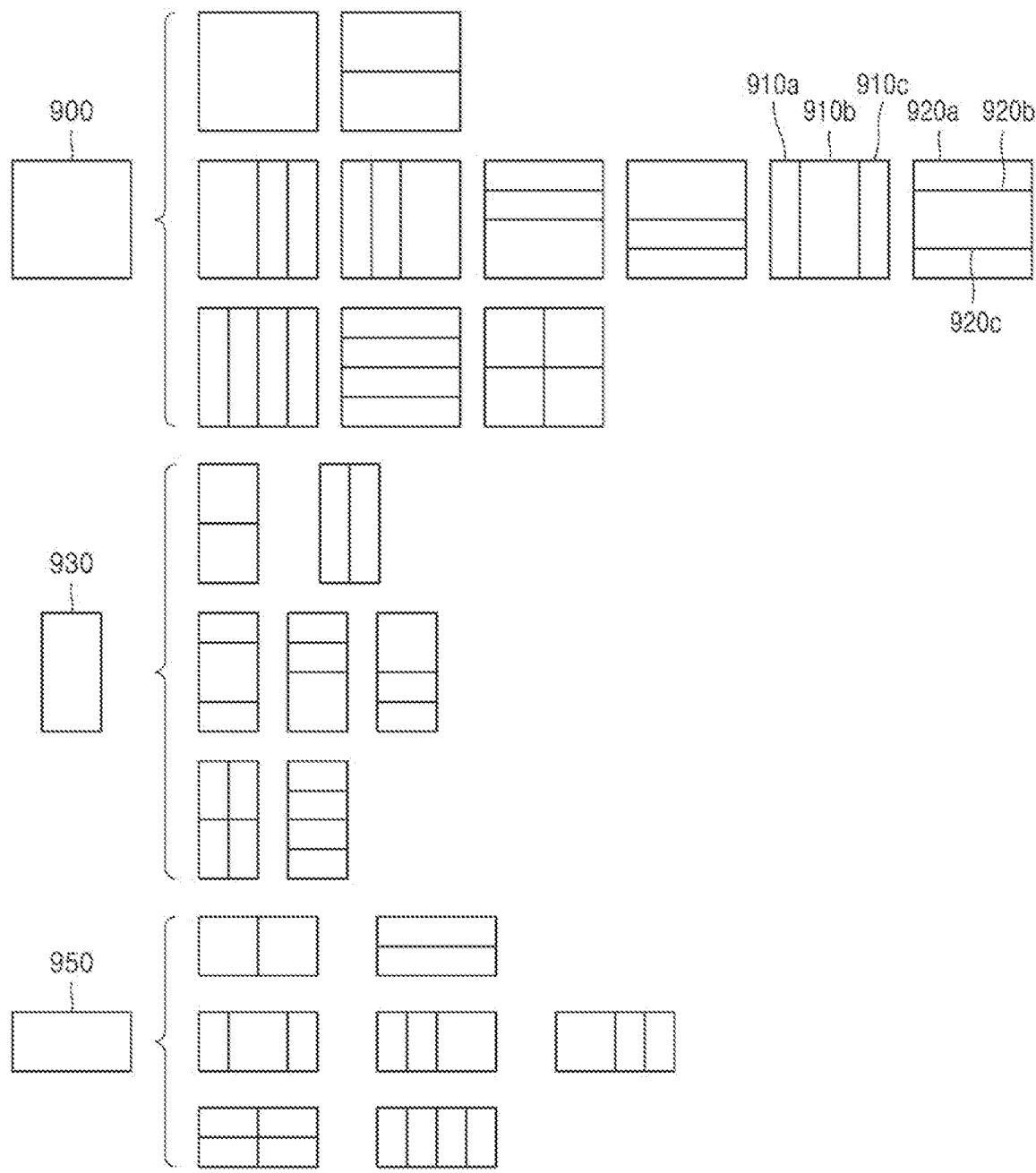
FIG. 12 illustrates a process, performed by the image decoding apparatus, of determining at least one coding unit by splitting a first coding unit, according to an embodiment.

FIG. 12 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and split shape mode information that is obtained through the obtainer 105. The square first coding unit 900 may be split into four square coding units, or may be split into a plurality of non-square coding units. For example, referring to FIG. 12, when the block shape information indicates that the first coding unit 900 is a square and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predefined order, and the condition relates to whether at least one of a width and height of the first coding unit 900 is to be split in half along a boundary of the second coding units 910a, 910b, 910c, 920a, 920b, and 920c. Referring to FIG. 12, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predefined order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predefined order. When the condition is not satisfied as described above, the image decoding apparatus 100 may determine disconnection of a scan order, and may determine that the first coding unit 900 is to be split into an odd number of coding units, based on a result of the determination. According to an embodiment, when a coding unit is split into an odd number of coding units, the image decoding apparatus 100 may put a predefined restriction on a coding unit at a predefined location from among the split coding units. The restriction or the predefined location is described above in relation to various embodiments, and thus detailed descriptions thereof are not provided herein.

According to an embodiment, the image decoding apparatus 100 may determine various-shaped coding units by splitting a first coding unit.

Referring to FIG. 12, the image decoding apparatus 100 may split the square first coding unit 900 or a non-square first coding unit 930 or 950 into various-shaped coding units.

Figure 13:
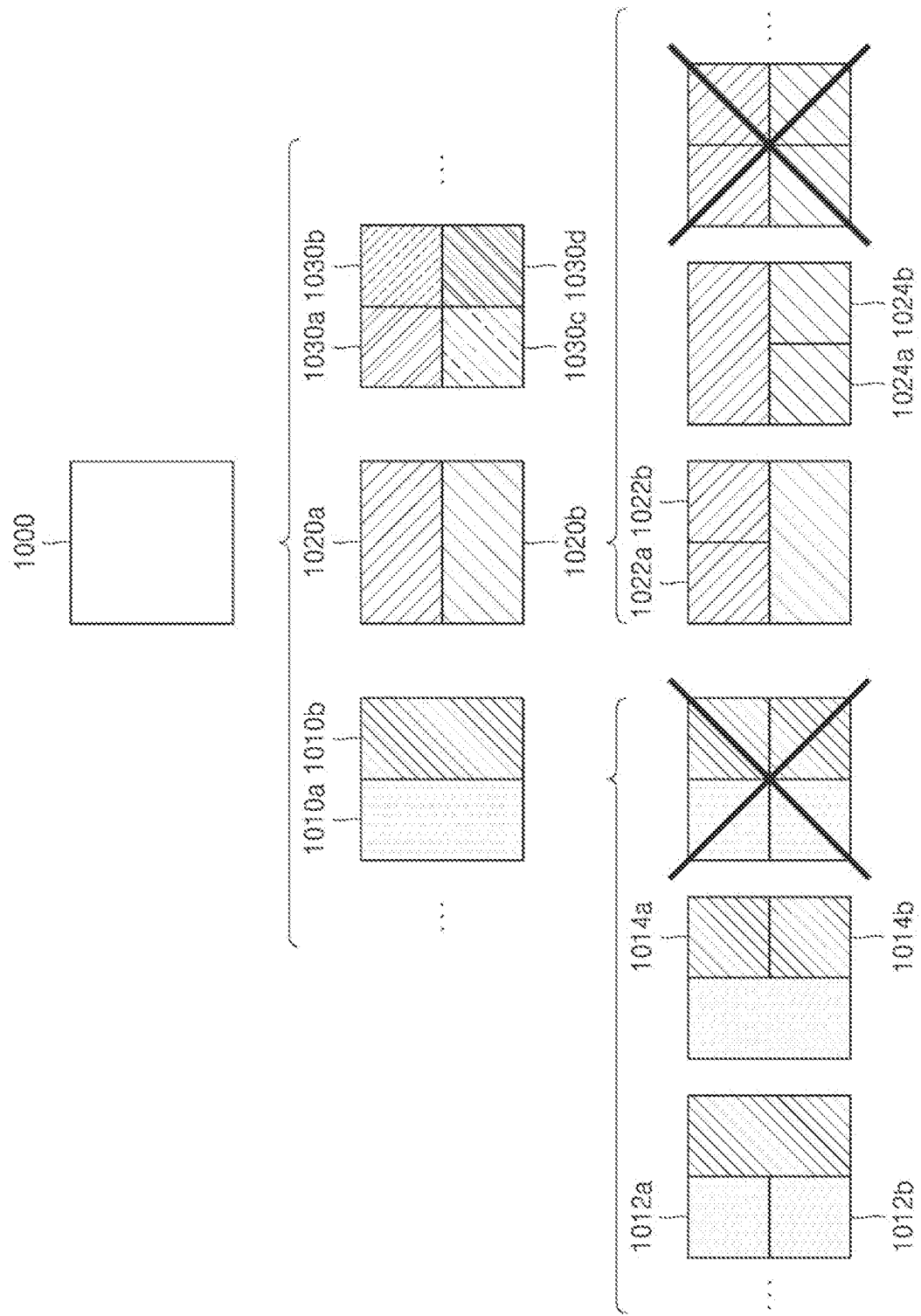
FIG. 13 illustrates that a shape into which a second coding unit that is splittable is restricted when the second coding unit having a non-square shape, which is determined when the image decoding apparatus splits a first coding unit, satisfies a predefined condition, according to an embodiment.

FIG. 13 illustrates that a shape into which a second coding unit is splittable is restricted when the second coding unit having a non-square shape, which is determined as the image decoding apparatus 100 splits a first coding unit 1000, satisfies a predefined condition, according to an embodiment.

According to an embodiment, the image decoding apparatus 100 may determine to split the square first coding unit 1000 into non-square second coding units 1010a and 1010b or 1020a and 1020b, based on at least one of block shape information and split shape mode information which is obtained by the obtainer 105. The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on at least one of block shape information and split shape mode information about each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on at least one of the block shape information and the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the aforementioned reason, the image decoding apparatus 100 may restrict the other second coding unit (e.g., the lower second coding unit 1020b) to not be split in a vertical direction in which the upper second coding unit 1020a is split.

Figure 14:
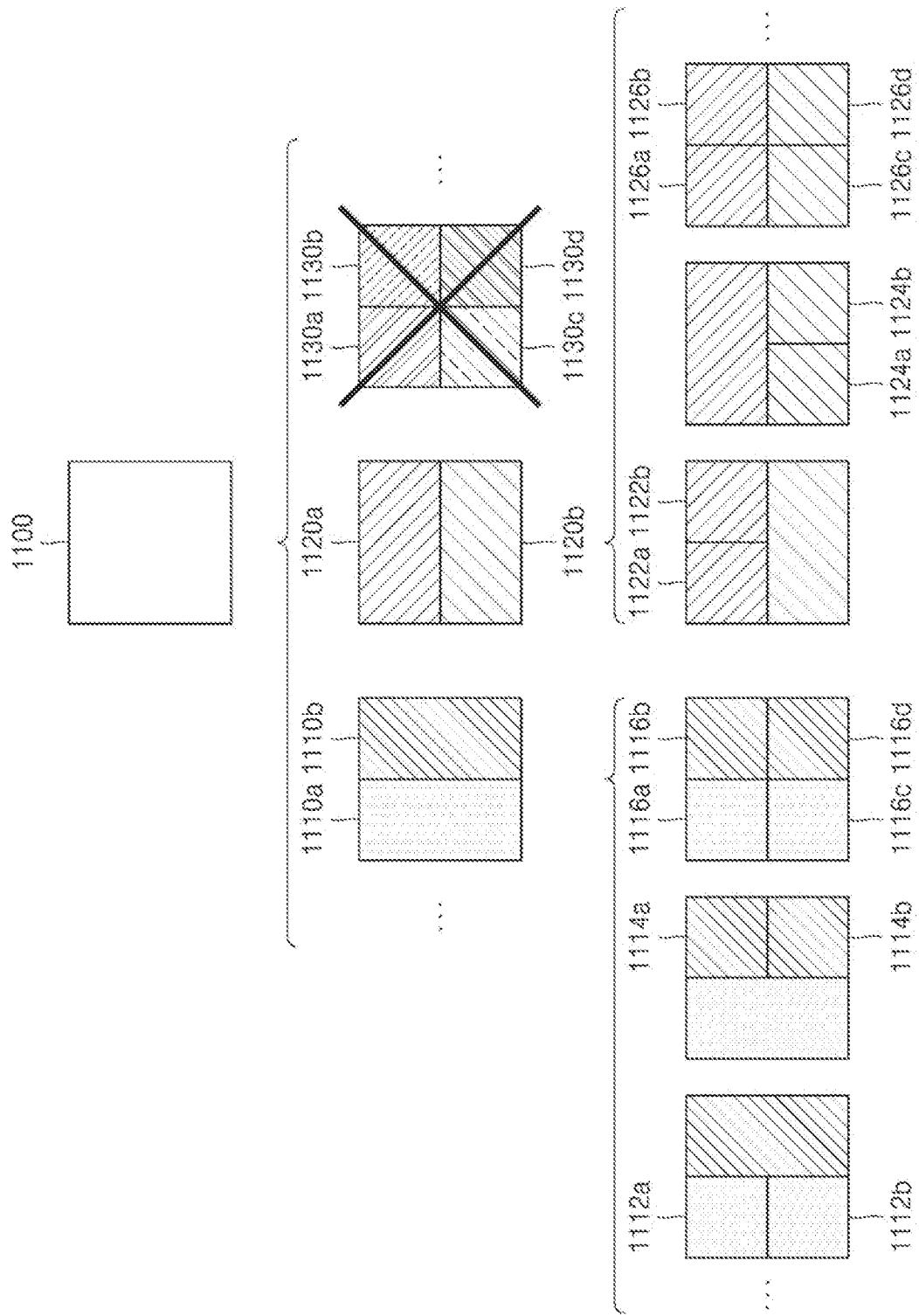
FIG. 14 illustrates a process, performed by the image decoding apparatus, of splitting a square coding unit when split shape mode information indicates that the square coding unit is to not be split into four square coding units, according to an embodiment.

FIG. 14 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predefined order, and this splitting method may correspond to a method of splitting the first coding unit 1100, based on at least one of the block shape information and the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both the left second coding unit 1110a and the right second coding unit 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper second coding unit 1120a and the lower second coding unit 1120b in a vertical direction. In this case, coding units having the same shape as the four square second coding units 1130a, 1130b, 1130c, and 1130d split from the first coding unit 1100 may be determined.

Figure 15:
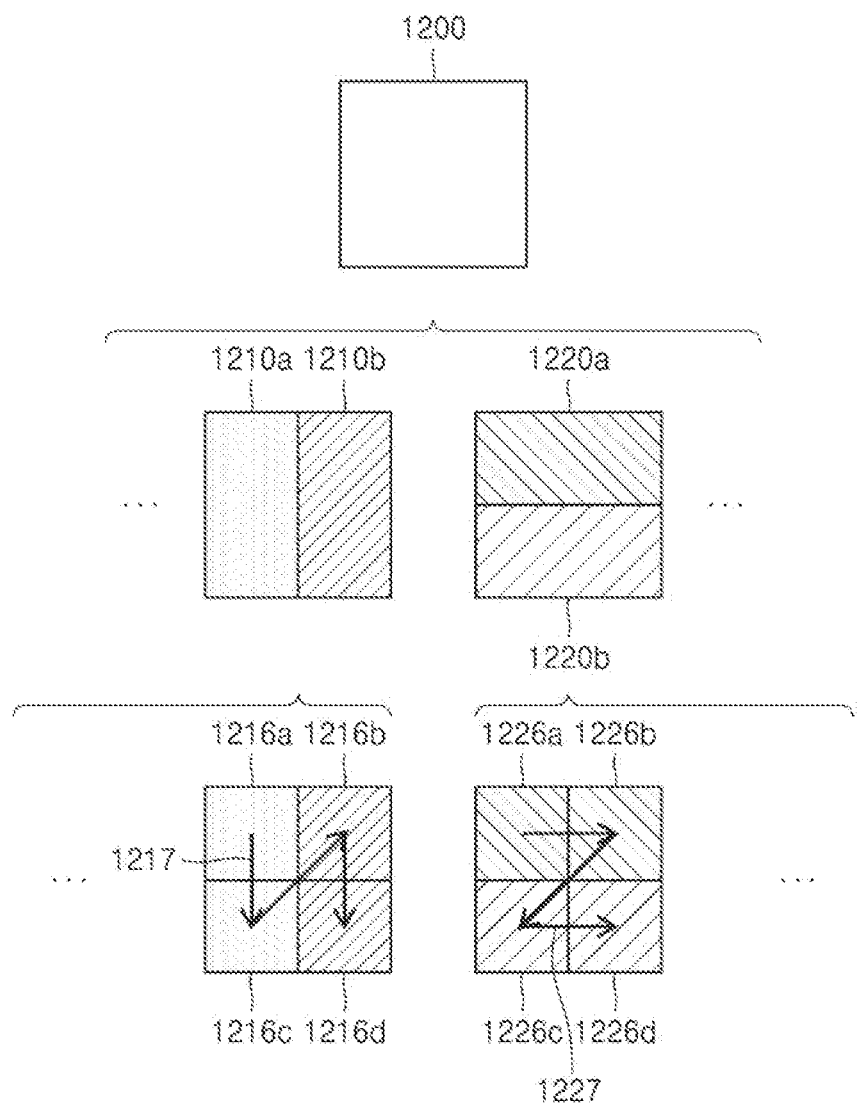
FIG. 15 illustrates that a processing order between a plurality of coding units may be changed depending on a process of splitting a coding unit, according to an embodiment.

FIG. 15 illustrates that a processing order between a plurality of coding units may be changed depending on a process of splitting a coding unit, according to an embodiment.

According to an embodiment, the image decoding apparatus 100 may split a first coding unit 1200, based on at least one of block shape information and split shape mode information. When the block shape information indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 15, the non-square second coding units 1210a and 1210b or 1220a and 1220b determined by splitting the first coding unit 1200 in only a horizontal direction or vertical direction may be independently split based on at least one of block shape information and split shape mode information about each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a and 1210b or 1220a and 1220b is described above with reference to FIG. 13, and thus detailed descriptions thereof are not provided herein.

According to an embodiment, the image decoding apparatus 100 may process coding units in a predefined order. An operation of processing coding units in a predefined order is described above with reference to FIG. 10, and thus detailed descriptions thereof are not provided herein. Referring to FIG. 15, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 15, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. Accordingly, by recursively splitting a coding unit in different manners based on at least one of block shape information and split shape mode information, the image decoding apparatus 100 may process a plurality of coding units in different orders even when the coding units are eventually determined to have the same shape.

Figure 16:
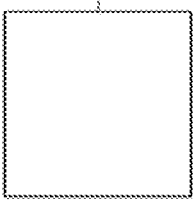
FIG. 16 illustrates a process of determining a depth of a coding unit when a shape and size of the coding unit change, when the coding unit is recursively split such that a plurality of coding units are determined, according to an embodiment.

FIG. 16 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predefined criterion. For example, the predefined criterion may be the length of a long side of the coding unit. When the length of a long side of a coding unit before being split is 2n times (n>0) the length of a long side (n) of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 16, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than its height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 17:
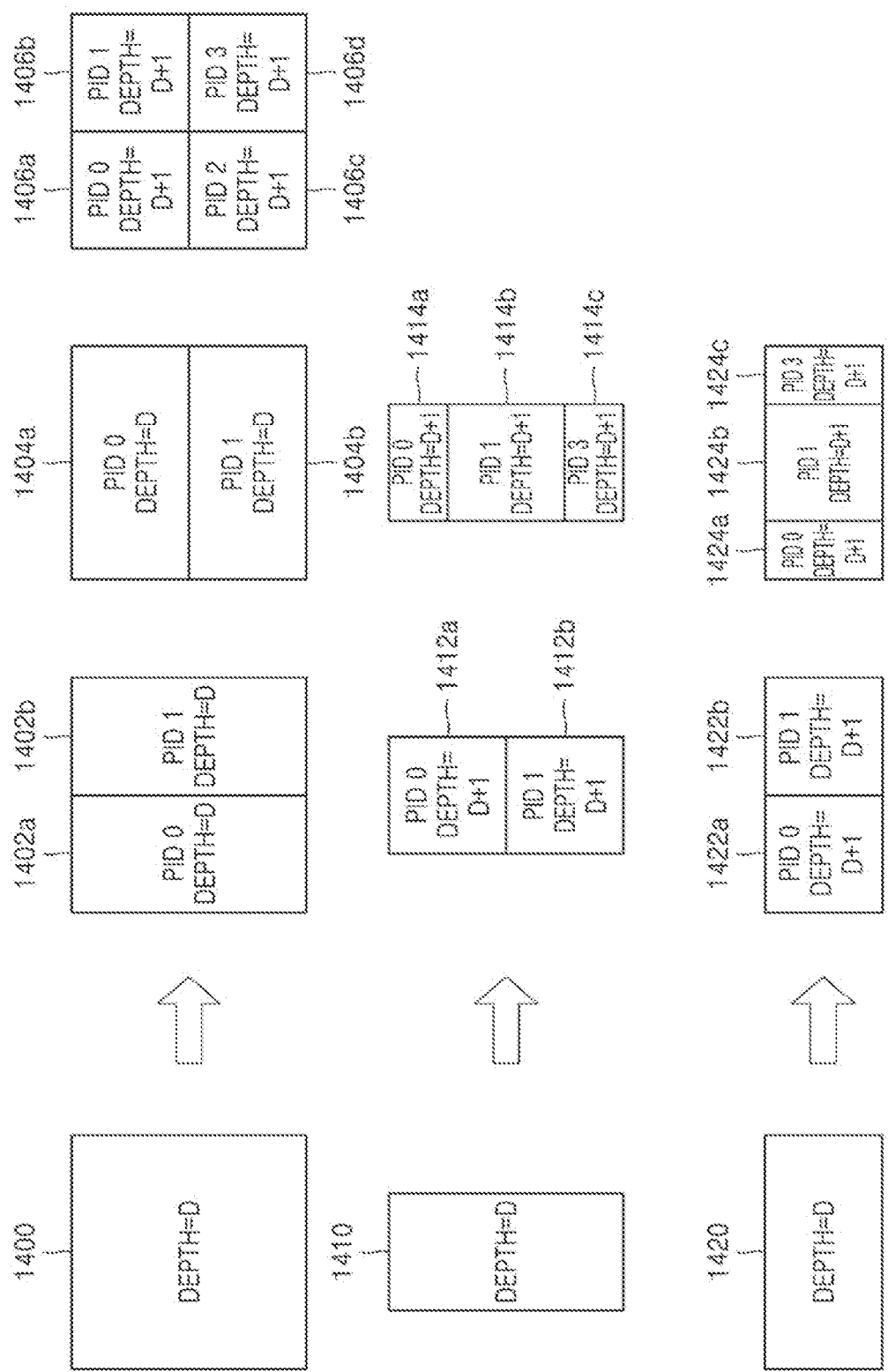
FIG. 17 illustrates depths that are determinable based on shapes and sizes of coding units, and part indexes (PIDs) that are for distinguishing the coding units, according to an embodiment.

FIG. 17 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 17, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than its width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than its height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than its width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than its height, by using the aforementioned method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 17, a coding unit 1414*b* of a center location among an odd number of split coding units 1414*a*, 1414*b*, and 1414*c* may have a width being equal to that of the other coding units 1414*a* and 1414*c* and a height being twice that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a particular splitting method, based on PID values for identifying a plurality of coding units determined by splitting a current coding unit. Referring to FIG. 17, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than its width. The image decoding apparatus 100 may use PIDs indicating respective coding units so as to identify the respective coding units. According to an embodiment, the PID may be obtained from a sample at a predefined location of each coding unit (e.g., an upper left sample).

According to an embodiment, the image decoding apparatus 100 may determine a coding unit at a predefined location from among the split coding units, by using the PIDs for distinguishing the coding units. According to an embodiment, when the split shape mode information of the first coding unit 1410 having a rectangular shape, a height of which is longer than its a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units so as to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 17, the coding unit 1414*b* generated by splitting the first coding unit 1410 may have a width being equal to that of the other coding units 1414*a* and 1414*c* and a height being twice that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predefined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predefined location are not limited to the aforementioned examples, and various PIDs and various locations and sizes of coding units may be used.

According to an embodiment, the image decoding apparatus 100 may use a predefined data unit where a coding unit starts to be recursively split.

Figure 18:
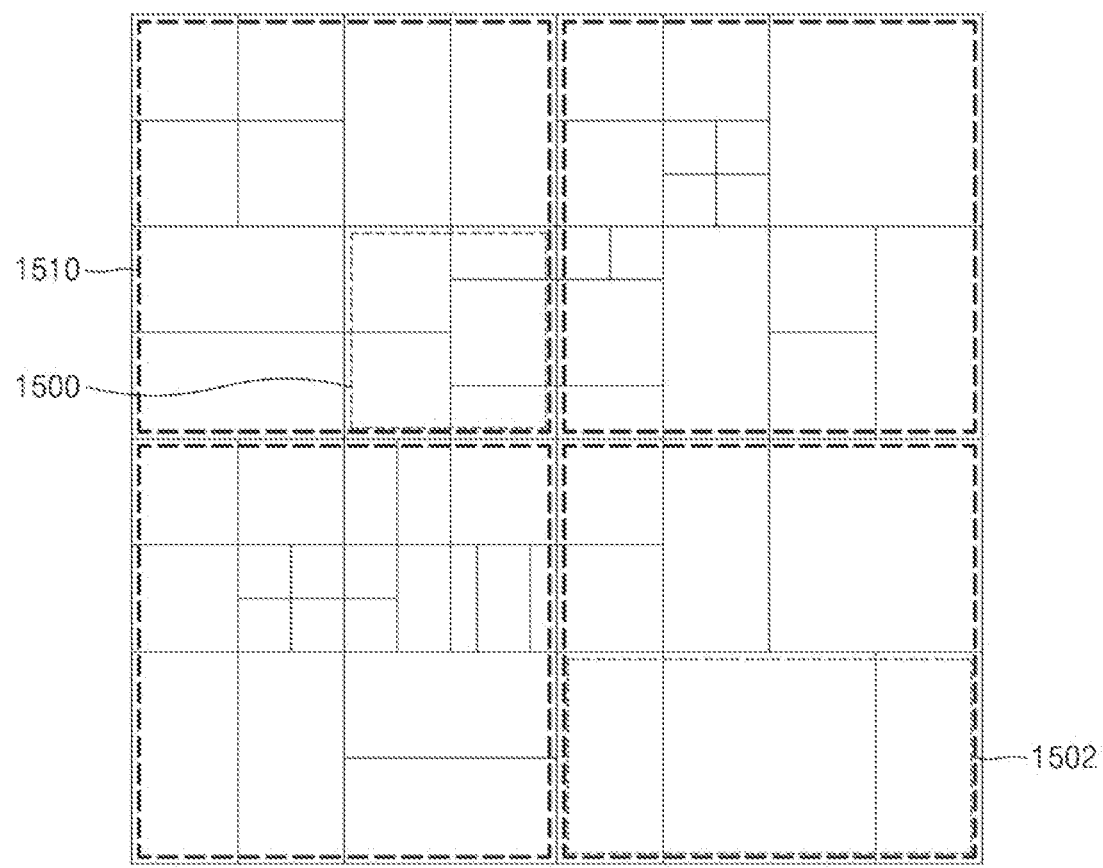
FIG. 18 illustrates that a plurality of coding units are determined based on a plurality of predefined data units included in a picture, according to an embodiment.

FIG. 18 illustrates that a plurality of coding units are determined based on a plurality of predefined data units included in a picture, according to an embodiment.

According to an embodiment, a predefined data unit may be defined as a data unit where a coding unit starts to be recursively split by using at least one of block shape information and split shape mode information. That is, the predefined data unit may correspond to a coding unit of an uppermost depth, which is used to determine a plurality of coding units split from a current picture. In the following descriptions, for convenience of explanation, the predefined data unit is referred to as a reference data unit.

According to an embodiment, the reference data unit may have a predefined size and a predefined shape. According to an embodiment, a reference coding unit may include M×N samples. Herein, M and N may be equal to each other, and may be integers expressed as powers of 2. That is, the reference data unit may have a square or non-square shape, and then may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the split shape mode information with reference to the determined reference data unit.

Referring to FIG. 18, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, largest coding units, or the like).

According to an embodiment, the obtainer 105 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 6, and an operation of splitting the non-square reference coding unit 1502 into one or more coding units has been described above in relation to the operation of splitting the current coding unit 400 or 450 of FIG. 7. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predefined condition. That is, the obtainer 105 may obtain, from the bitstream, only the PID for identifying the size and shape of reference coding units with respect to each slice, each slice segment, or each largest coding unit which is a data unit satisfying a predefined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predefined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 19:
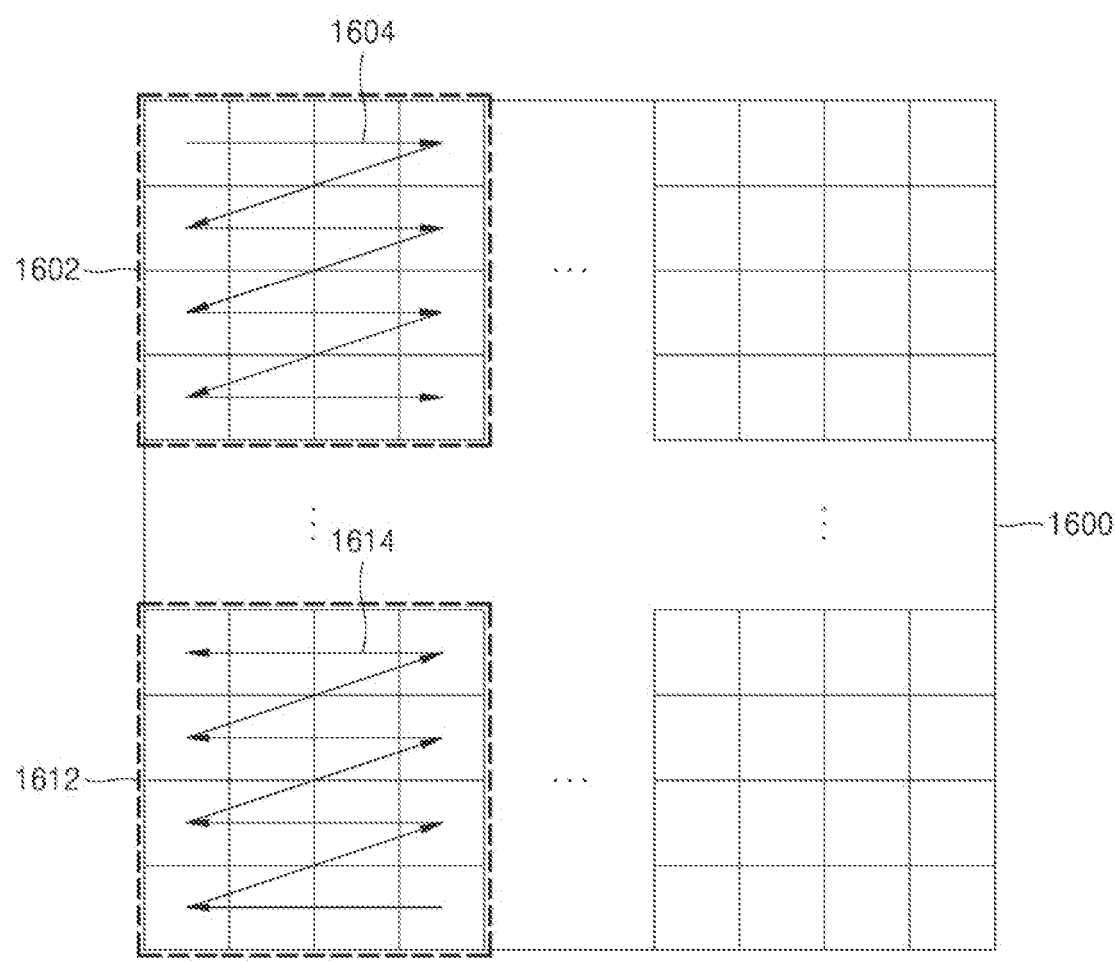
FIG. 19 illustrates a processing block serving as a criterion for determining a determination order of reference coding units included in a picture, according to an embodiment.

FIG. 19 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predefined size of data units, which is indicated by the processing block size information.

According to an embodiment, the obtainer 105 of the image decoding apparatus 100 may obtain the processing block size information from the bitstream according to each particular data unit. For example, the processing block size information may be obtained from the bitstream in a data unit such as an image, sequence, picture, slice, slice segment, or the like. That is, the obtainer 105 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 19, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the obtainer 105 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the obtainer 105 may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 19, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The block shape information or the split shape mode information may be included in the bitstream related to various data units. For example, the image decoding apparatus 100 may use the block shape information or the split shape mode information which is included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Various embodiments have been described above. It will be apparent that those of ordinary skill in the technical art to which the disclosure belongs may readily make various modifications thereto without changing the essential features of the disclosure. Therefore, the disclosed embodiments should be considered in a descriptive sense only and not for purposes of limitation. The scope of the disclosure is defined in the accompanying claims rather than the above detailed description, and it should be noted that all differences falling within the claims and equivalents thereof are included in the scope of the disclosure.

The embodiments of the disclosure may have been described as a program that is executable on a computer, and implemented on a general-purpose digital computer that operates a program using a computer-readable recording medium. The computer-readable recording medium may include a storage medium, such as a magnetic storage medium (for example, ROM, a floppy disk, a hard disk, etc.) and an optical reading medium (for example, CD-ROM, DVD, etc.).

What is claimed is:

1. An image decoding method performed by an apparatus, the method comprising:
   obtaining at least one coding unit including a current coding unit by hierarchically splitting a current image;
   determining a code value for a difference quantization parameter for the current coding unit as a first value, when a first flag indicating whether signaling for the difference quantization parameter is to be enabled indicates that the signaling for the difference quantization parameter is enabled and a second flag indicating whether a predefined signaling scheme of the difference quantization parameter is to be used indicates that the predefined signaling scheme of the difference quantization parameter is used and a split flag indicating whether or not to split the current coding unit indicates that the current coding unit is split and a split type of the current coding unit is a ternary split type and a sum of a value resulting from applying log2 to a width of the current coding unit and a value resulting from applying log2 to a height of the current coding unit is equal to a value resulting from adding 1 to a value resulting from applying log2 to an area of a difference quantization parameter signaling unit;
   obtaining the difference quantization parameter for the current coding unit based on information about a transform unit of the current coding unit, when the code value for the difference quantization parameter for the current coding unit is equal to the first value;
   obtaining a quantization parameter for the current coding unit based on a predicted quantization parameter for the current coding unit and the difference quantization parameter for the current coding unit; and
   obtaining a reconstructed block of the current coding unit, based on the quantization parameter for the current coding unit, wherein the split flag indicates one of a binary split type and the ternary split type when the split flag indicates that the current coding unit is split.

2. The image decoding method of claim 1, further comprising:
   when the first flag indicates that the signaling for the difference quantization parameter is enabled and the second flag indicates that the predefined signaling scheme of the difference quantization parameter is used,
   when the split flag indicates that the current coding unit is not split, and
   when the sum of the value resulting from applying log2 to the width of the current coding unit and the value resulting from applying log2 to the height of the current coding unit is larger than or equal to the value resulting from applying log2 to the area of the difference quantization parameter signaling unit,
   determining the code value for the difference quantization parameter for the current coding unit as a second value; and
   obtaining the difference quantization parameter for the current coding unit based on the information about the transform unit of the current coding unit, when the code value for the difference quantization parameter for the current coding unit is equal to the second value and a value of a coding block flag value of the transform unit of the current coding unit is equal to the second value.

3. An image decoding apparatus comprising:
   at least one processor configured to:
   obtain at least one coding unit including a current coding unit by hierarchically splitting a current image;
   determine a code value for a difference quantization parameter for the current coding unit as a first value, when a first flag indicating whether signaling for the difference quantization parameter is to be enabled indicates that the signaling for the difference quantization parameter is enabled and a second flag indicating whether a predefined signaling scheme of the difference quantization parameter is to be used indicates that the predefined signaling scheme of the difference quantization parameter is used and a split flag indicating whether or not to split the current coding unit indicates that the current coding unit is split and a split type of the current coding unit is a ternary split type and a sum of a value resulting from applying log2 to a width of the current coding unit and a value resulting from applying log2 to a height of the current coding unit is equal to a value resulting from adding 1 to a value resulting from applying log2 to an area of a difference quantization parameter signaling unit;
   obtain the difference quantization parameter for the current coding unit based on information about a transform unit of the current coding unit, when the code value for the difference quantization parameter for the current coding unit is equal to the first value;
   obtain a quantization parameter for the current coding unit based on a predicted quantization parameter for the current coding unit and the difference quantization parameter for the current coding unit; and
   obtain a reconstructed block of the current coding unit, based on the quantization parameter for the current coding unit,
   wherein the split flag indicates one of a binary split type and the ternary split type when the split flag indicates that the current coding unit is split.

4. An image encoding method performed by an apparatus, the method comprising:
   obtaining at least one coding unit including a current coding unit by hierarchically splitting a current image;
   obtaining a difference quantization parameter for the current coding unit, based on a predicted quantization parameter for the current coding unit and a quantization parameter for the current coding unit;
   determining a code value for the difference quantization parameter for the current coding unit as a first value, when a first flag indicating whether signaling for the difference quantization parameter is to be enabled indicates that the signaling for the difference quantization parameter is enabled and a second flag indicating whether a predefined signaling scheme of the difference quantization parameter is to be used indicates that the predefined signaling scheme of the difference quantization parameter is used and a split flag indicating whether or not to split the current coding unit indicates that the current coding unit is split and a split type of the current coding unit is a ternary split type and a sum of a value resulting from applying log2 to a width of the current coding unit and a value resulting from applying log2 to a height of the current coding unit is equal to a value resulting from adding 1 to a value resulting from applying log2 to an area of a difference quantization parameter signaling unit;

obtaining information about a transform unit of the current coding unit based on the difference quantization parameter for the current coding unit, when the code value for the difference quantization parameter for the current coding unit is equal to the first value; and encoding the information about the transform unit of the current coding unit, wherein the split flag indicates one of a binary split type and the ternary split type when the split flag indicates that the current coding unit is split.

5. The image decoding method of claim 1, wherein a value indicating an area of the current coding unit is equal to a predefined multiple of a value indicating the area of the difference quantization parameter signaling unit, and wherein the predefined multiple is two times.

6. The image decoding apparatus of claim 3, wherein the at least one processor is further configured to:

when the first flag indicates that the signaling for the difference quantization parameter is enabled and the second flag indicates that the predefined signaling scheme of the difference quantization parameter is used, when the split flag indicates that the current coding unit is not split, and when the sum of the value resulting from applying log2 to the width of the current coding unit and the value resulting from applying log2 to the height of the current coding unit is larger than or equal to the value resulting from applying log2 to the area of the difference quantization parameter signaling unit, determining the code value for the difference quantization parameter for the current coding unit as a second value; and obtaining the difference quantization parameter for the current coding unit based on the information about the transform unit of the current coding unit, when the code value for the difference quantization parameter for the current coding unit is equal to the second value and a value of a coding block flag value of the transform unit of the current coding unit is equal to the second value.

7. The image decoding apparatus of claim 3, wherein a value indicating an area of the current coding unit is equal to a predefined multiple of a value indicating the area of the difference quantization parameter signaling unit, and wherein the predefined multiple is two times.

8. An image encoding apparatus comprising:
at least one processor configured to:
obtain at least one coding unit including a current coding unit by hierarchically splitting a current image;
obtain a difference quantization parameter for the current coding unit, based on a predicted quantization parameter for the current coding unit and a quantization parameter for the current coding unit;
determine a code value for the difference quantization parameter for the current coding unit as a first value, when a first flag indicating whether signaling for the difference quantization parameter is to be enabled indicates that the signaling for the difference quantization parameter is enabled and a second flag indicating whether a predefined signaling scheme of the difference quantization parameter is to be used indicates that the predefined signaling scheme of the difference quantization parameter is used and a split flag indicating whether or not to split the current coding unit indicates that the current coding unit is split and a split type of the current coding unit is a ternary split type and a sum of a value resulting from applying log2 to a width of the current coding unit and a value resulting from applying log2 to a height of the current coding unit is equal to a value resulting from adding 1 to a value resulting from applying log2 to an area of a difference quantization parameter signaling unit;
obtain information about a transform unit of the current coding unit based on the difference quantization parameter for the current coding unit, when the code value for the difference quantization parameter for the current coding unit is equal to the first value; and
encode the information about the transform unit of the current coding unit,
wherein the split flag indicates one of a binary split type and the ternary split type when the split flag indicates that the current coding unit is split.

9. The image encoding apparatus of claim 8, wherein a value indicating an area of the current coding unit is equal to a predefined multiple of a value indicating the area of the difference quantization parameter signaling unit, and wherein the predefined multiple is two times.

10. The image encoding method of claim 4, wherein a value indicating an area of the current coding unit is equal to a predefined multiple of a value indicating the area of the difference quantization parameter signaling unit, and wherein the predefined multiple is two times.

* * * * *